(12) United States Patent
Yamagishi et al.

(10) Patent No.: US 11,983,962 B2
(45) Date of Patent: May 14, 2024

(54) INFORMATION PROCESSING APPARATUS, AND METHOD

(71) Applicant: SHOSABI INC., Tokyo (JP)

(72) Inventors: Sachiko Yamagishi, Tokyo (JP); Kenjiro Kobayashi, Tokyo (JP)

(73) Assignee: SHOSABI INC., Tokyo (JP)

( * ) Notice: Subject to any disclaimer, the term of this patent is extended or adjusted under 35 U.S.C. 154(b) by 0 days.

(21) Appl. No.: 17/691,285

(22) Filed: Mar. 10, 2022

(65) Prior Publication Data

US 2022/0198835 A1 Jun. 23, 2022

Related U.S. Application Data

(63) Continuation of application No. PCT/JP2021/026675, filed on Jul. 15, 2021.

(30) Foreign Application Priority Data

Aug. 11, 2020 (JP) .................................. 2020-136049
Apr. 2, 2021 (JP) .................................. 2021-063763

(Continued)

(51) Int. Cl.
*G06V 40/20* (2022.01)
*A63B 24/00* (2006.01)
(Continued)

(52) U.S. Cl.
CPC .......... *G06V 40/25* (2022.01); *A63B 24/0062* (2013.01); *A63B 24/0075* (2013.01);
(Continued)

(58) Field of Classification Search
CPC ................ G06V 40/25; A63B 24/0062; A63B 24/0075; A63B 71/0622;
(Continued)

(56) References Cited

U.S. PATENT DOCUMENTS

| 10,583,328 B2 | 3/2020 | Aragones et al. |
| 2011/0035666 A1 | 2/2011 | Geisner et al. |

(Continued)

FOREIGN PATENT DOCUMENTS

| JP | H07-124281 A | 5/1995 |
| JP | 2002-210055 A | 7/2002 |

(Continued)

OTHER PUBLICATIONS

International Search Report dated Oct. 5, 2021, in corresponding to International Application No. PCT/JP2021/026675; 4 pages (with English Translation).

*Primary Examiner* — Xin Sheng
(74) *Attorney, Agent, or Firm* — Maier & Maier, PLLC

(57) ABSTRACT

An information processing apparatus includes a processor and a memory with instructions thereon. The instructions upon execution by the processor, causes the processor to: sequentially sense a movement of a body of a user; present, to the user, an avatar corresponding to the user, rather than a photographed image of an appearance of the user, based on a result of the sensing so that the user perceives a shape of a surface of the body of the user; determine a position of a figure object to be drawn that serves as a guide for movement of the body of the user in association with the avatar based on the result of the sensing; and display the figure object at the determined position.

27 Claims, 54 Drawing Sheets

(30) Foreign Application Priority Data

Apr. 2, 2021 (JP) .................................. 2021-063771
Jun. 8, 2021 (JP) .................................. 2021-096232

(51) Int. Cl.
*A63B 71/06* (2006.01)
*G06T 13/40* (2011.01)
*G06T 13/80* (2011.01)
*G06T 19/20* (2011.01)

(52) U.S. Cl.
CPC .......... *A63B 71/0622* (2013.01); *G06T 13/40* (2013.01); *G06T 13/80* (2013.01); *G06T 19/20* (2013.01); *A63B 2024/0096* (2013.01); *A63B 2071/0647* (2013.01); *A63B 2230/625* (2013.01); *G06T 2210/56* (2013.01); *G06T 2219/2021* (2013.01)

(58) Field of Classification Search
CPC .... A63B 2024/0096; A63B 2071/0647; A63B 2230/625; G06T 13/40; G06T 13/80; G06T 19/20; G06T 2210/56; G06T 2219/2021
See application file for complete search history.

(56) References Cited

U.S. PATENT DOCUMENTS

| | | |
|---|---|---|
| 2014/0370468 A1 | 12/2014 | Kron et al. |
| 2016/0104298 A1 | 4/2016 | Nam |
| 2017/0216670 A1* | 8/2017 | Kuroda .............. A63B 21/4035 |
| 2018/0261120 A1 | 9/2018 | Shiomi |

FOREIGN PATENT DOCUMENTS

| | | | | |
|---|---|---|---|---|
| JP | 2009543611 A | | 12/2009 | |
| JP | 2014502178 A | | 1/2014 | |
| JP | 2016-081504 A | | 5/2015 | |
| JP | 2015-116288 A | | 6/2015 | |
| JP | 2015116288 A | * | 6/2015 | |
| JP | 2017-044561 A | | 3/2017 | |
| JP | 2017-64120 A | | 4/2017 | |
| JP | 2017064120 A | * | 4/2017 | |
| JP | 6647584 B1 | | 2/2020 | |
| WO | 2016059943 A1 | | 4/2016 | |
| WO | 2017094356 A1 | | 6/2017 | |
| WO | WO-2020060666 A1 | * | 3/2020 | ........... A61B 5/1123 |

* cited by examiner

Figure 4

USER INFORMATION DATABASE (281)

| USER ID | USER NAME | SEX | HEIGHT | WEIGHT | AFFILIATION | EVALUATION VALUE | COMPANY LOYALTY POINT |
|---|---|---|---|---|---|---|---|
| #0001 | User_01 | M | 165 | 60 | AA COMPANY, BB SECTION, CC OFFICE | 15 (ROM), 22 (WALKING POSTURE) | 4500 |
| #0002 | User_02 | F | 160 | 55 | AA COMPANY, DD SECTION, EE OFFICE | 20(ROM) | 2000 |
| ... | ... | ... | ... | ... | ... | ... | ... |

MEASUREMENT ITEM INFORMATION (ROM CHECK) (282)

| MEASUREMENT ITEM NO. | MEASURED PART | AUDIO GUIDE | FOOT POSITIONS ON MAT | BODY PART TO BE MEASURED |
|---|---|---|---|---|
| #m_001 | #01 (SCAPULA) | #gd_01 | #Pos_01 | ... |
| #m_002 | #02 (SHOULDER) | #gd_02 | #Pos_02 | ... |
| ... | ... | ... | ... | ... |

MEASUREMENT HISTORY DATABASE (283)

| MEASUREMENT NO. | DATE AND TIME | USER ID | PLACE OF MEASUREMENT | MEASUREMENT DATA | EVALUATION RESULT |
|---|---|---|---|---|---|
| #MM_001 | Date_001 | #0005 | PL_01 | ROM_0044 | RS_007 |
| #MM_002 | Date_002 | #0007 | PL_02 | Training_0066 | RS_008 |
| ... | ... | ... | ... | ... | ... |

FRIEND LIST (284)

| USER 1 | USER 2 | FRIEND REGISTRATION DATE | HISTORY OF MEASUREMENT AT SAME TIMING | HISTORY OF MESSAGE EXCHANGE |
|---|---|---|---|---|
| #0006 | #0015 | JANUARY 11, 2020 | JANUARY 11, 2020, CC OFFICE | JANUARY 17, 2020, "..." |
| #0007 | #0020 | FEBRUARY 22, 2020 | ... | ... |
| ... | ... | ... | ... | ... |

| MEASUREMENT RESULT DATABASE | | | | | | | |
|---|---|---|---|---|---|---|---|
| MEASUREMENT DATA ID | DATE AND TIME | USER ID | ELAPSED TIME FROM START OF MEASUREMENT | MEASUREMENT DATA (POSITION OF HEAD) | MEASUREMENT DATA (POSITION OF RIGHT SHOULDER) | MEASUREMENT DATA (POSITION OF LEFT SHOULDER) | ... |
| Walk_003 | Date_07 | #0011 | T_01 | head(x01, y01, z01) | Rsh(x01, y01, z01) | Lsh(x01, y01, z01) | ... |
| Walk_003 | Date_07 | #0011 | T_02 | Head(x02, y02, z02) | Rsh(x02, y02, z02) | Lsh(x02, y02, z02) | ... |
| ... | ... | ... | ... | ... | ... | ... | ... |

288

| EVALUATION RESULT DATABASE | | | |
|---|---|---|---|
| EVALUATION RESULT ID | MEASUREMENT DATA ID | SUBJECT OF MEASUREMENT | EVALUATION RESULT |
| RS_011 | Walk_011 | WALKING POSTURE | Ev011_stp1 (STEPPING FOOT FORWARD), Ev011_stp2 (SHIFTING WEIGHT TO FRONT FOOT), Ev011_stp3 (COMPLETELY PUTTING WEIGHT ON FRONT FOOT) |
| RS_012 | BL_023 | BALANCE OF TRUNK | Ev012 (MISALIGNMENT OF SHOULDERS, HIPS, AND FEET) |
| ... | ... | ... | ... |

Figure 20

| 282 | | | | |
|---|---|---|---|---|
| MEASUREMENT ITEM INFORMATION (ROM CHECK) | | | | |
| MEASUREMENT ITEM NO. | MEASURED PART | ... | POSSIBLE FUTURE TROUBLE | ASSOCIATED MUSCLE |
| #m_001 | #01 (SCAPULA) | ... | #Pain_01 | #Msl_01 |
| #m_002 | #02 (SHOULDER) | ... | #Pain_02 | #Msl_02 |
| ... | ... | ... | ... | ... |

| 285 | | | | |
|---|---|---|---|---|
| TRAINING ITEM INFORMATION | | | | |
| TRAINING ITEM NO. | CONTENT | ... | TROUBLE TO BE SOLVED | ASSOCIATED MUSCLE |
| #Tr_001 | #MV_001 (MOVIE) | ... | #Pain_21 | #Msl_05 |
| #Tr_002 | #MV_002 (MOVIE) | ... | #Pain_22 | #Msl_06 |
| ... | ... | ... | ... | ... |

| 288 | | | | |
|---|---|---|---|---|
| EVALUATION RESULT DATABASE | | | | |
| EVALUATION RESULT ID | MEASUREMENT DATA ID | SUBJECT OF MEASUREMENT | EVALUATION RESULT | POSSIBLE FUTURE TROUBLE |
| RS_011 | Walk_011 | POSTURE IN WALKING | Ev011_stp1 (STEPPING FOOT FORWARD), Ev011_stp2 (SHIFTING WEIGHT TO FRONT FOOT), Ev011_stp3 (COMPLETELY PUTTING WEIGHT ON FRONT FOOT) | #Pain_31, #Pain_32 |
| RS_012 | BL_023 | BALANCE OF TRUNK | Ev012 (MISALIGNMENT OF SHOULDERS, HIPS, AND FEET) | NONE |
| ... | ... | ... | ... | ... |

Figure 21A

```
┌─────────────────────────────────────────────────────────── 132 ──┐
│                                                          132P91  │
│  HISTORY OF ROM CHECK AND TRAINING            ┌──────────────┐   │
│                                    132P71    │ RESPOND TO    │   │
│                                               │ QUESTIONNAIRE │   │
│   ┌─────────────────────────────────────────────────────────┐    │
│   │                    MEASURE EVERY DAY                    │    │
│   │  132P72                                                 │    │
│   │  ┌───────────────────────────────────────────────────┐  │    │
│   │  │ FOLLOWING ARE POSSIBLE FUTURE TROUBLES OF YOUR    │  │    │
│   │  │ BODY. YOU CAN SEE RECOMMENDED EXERCISE.           │  │    │
│   │  │   132P73         132P74              132P75       │  │    │
│   │  │  ┌─────────┐  ┌─────────────┐  ┌─────────────────┐│  │    │
│   │  │  │STIFF    │  │FLABBY UPPER │  │HUNCHED SHOULDERS││  │    │
│   │  │  │NECK OR  │  │ARM          │  │OR POSTURE WITH  ││  │    │
│   │  │  │SHOULDER │  │             │  │HEAD INCLINED    ││  │    │
│   │  │  │         │  │             │  │FORWARD          ││  │    │
│   │  │  └─────────┘  └─────────────┘  └─────────────────┘│  │    │
│   │  └───────────────────────────────────────────────────┘  │    │
│   │  132P76                        132P78                   │    │
│   │  ┌──────────────────────────┐  ┌──────────────────────┐│    │
│   │  │IF YOU DON'T HAVE MUCH    │  │YOU CAN CUSTOMIZE     ││    │
│   │  │TIME, THIS TRAINING       │  │                      ││    │
│   │  │CAN BE RECOMMENDED.       │  │       132P79         ││    │
│   │  │   132P77                 │  │  ┌────────────────┐  ││    │
│   │  │  ┌────────────────┐      │  │  │   FAVORITE     │  ││    │
│   │  │  │TRAINING FOCUSED│      │  │  └────────────────┘  ││    │
│   │  │  │ON YOUR WEAKNESS│      │  │                      ││    │
│   │  │  └────────────────┘      │  │                      ││    │
│   │  └──────────────────────────┘  └──────────────────────┘│    │
│   └─────────────────────────────────────────────────────────┘    │
└──────────────────────────────────────────────────────────────────┘
```

Figure 21B

```
┌─────────────────────────────────────────────────────── 132 ──────┐
│                                                          132P91  │
│  RECOMMENDED TRAINING                         ┌──────────────┐   │
│                                    132P81    │ RESPOND TO    │   │
│                                               │ QUESTIONNAIRE │   │
│   ┌─────────────────────────────────────────────────────────┐    │
│   │ DO YOU HAVE STIFF NECK OR SHOULDER? YOUR SHOULDERS TEND │    │
│   │ TO BE HUNCHED. EXERCISE EXPECTED TO IMPROVE BLOOD FLOW  │    │
│   │ IN UPPER PART OF BODY AND EXERCISE FOR STRETCHING       │    │
│   │ HAMSTRINGS CAN BE RECOMMENDED.                          │    │
│   │  132P82                                                 │    │
│   │  ┌───────────────────────────────────────────────────┐  │    │
│   │  │ FOLLOWING IS PREDICTION OF POSSIBLE FUTURE        │  │    │
│   │  │ TROUBLES OF YOUR BODY. YOU CAN SEE RECOMMENDED    │  │    │
│   │  │ EXERCISE.                                         │  │    │
│   │  │   132P83        132P84             132P85         │  │    │
│   │  │  ┌─────────┐  ┌─────────────┐  ┌─────────────┐    │  │    │
│   │  │  │TRAINING1│  │ TRAINING 2  │  │ TRAINING 3  │    │  │    │
│   │  │  └─────────┘  └─────────────┘  └─────────────┘    │  │    │
│   │  │   132P86        132P87                            │  │    │
│   │  │  ┌─────────┐  ┌─────────────┐                     │  │    │
│   │  │  │TRAINING4│  │ TRAINING 5  │                     │  │    │
│   │  │  └─────────┘  └─────────────┘                     │  │    │
│   │  └───────────────────────────────────────────────────┘  │    │
│   │  132P88                                                 │    │
│   │  ┌───────────────────────────────────────────────────┐  │    │
│   │  │ IF YOU DON'T HAVE MUCH TIME, THESE CAN BE         │  │    │
│   │  │ RECOMMENDED.                                      │  │    │
│   │  │   132P83        132P84             132P85         │  │    │
│   │  │  ┌─────────┐  ┌─────────────┐  ┌─────────────┐    │  │    │
│   │  │  │TRAINING1│  │ TRAINING 2  │  │ TRAINING 3  │    │  │    │
│   │  │  └─────────┘  └─────────────┘  └─────────────┘    │  │    │
│   │  └───────────────────────────────────────────────────┘  │    │
│   └─────────────────────────────────────────────────────────┘    │
└──────────────────────────────────────────────────────────────────┘
```

| USER QUESTIONNAIRE INFORMATION | | | | | |
|---|---|---|---|---|---|
| QUESTIONNAIRE RESULT NO. | RESPONSE OPTION | ... | CURRENT TROUBLE | POSSIBLE FUTURE TROUBLE | ASSOCIATED MUSCLE |
| #an_001 | Opt_#001 Opt_#002 Opt_#003 | ... | #NPain_01 | #Pain_03 | #Msl_21 |
| #an_002 | ... | ... | #NPain_02 | #Pain_04 | #Msl_22 |
| ... | ... | ... | ... | ... | ... |

288

| EVALUATION RESULT DATABASE | | | | | |
|---|---|---|---|---|---|
| EVALUATION RESULT ID | MEASUREMENT DATA | SUBJECT OF MEASUREMENT | EVALUATION RESULT | CURRENT TROUBLE | POSSIBLE FUTURE TROUBLE |
| RS_011 | #Walk_011 | POSTURE IN WALKING | Ev_011_stp1 (STEPPING FOOT FORWARD), Ev_011_stp2 (SHIFTING WEIGHT TO FRONT FOOT) Ev_011_stp3 (COMPLETELY PUTTING WEIGHT ON FRONT FOOT) | NONE | #Pain_31, #Pain_32 |
| RS_012 | #BL_023 | BALANCE OF TRUNK | Ev_012 (MISALIGNMENT OF SHOULDERS, HIPS, AND FEET) | NONE | NONE |
| RS_013 | #an_001 | CONDITION OF HIPS | Ev_013(LOWER BACK PAIN) | #NPain_02 | #Pain_04 |
| ... | ... | | ... | ... | ... |

TRAINEE INFORMATION DATABASE

| TRAINEE ID | NAME | AGE | SEX | WEIGHT | BODY FAT PERCENTAGE | PURPOSE | IDEAL FIGURE | DISPLAY ON SCREEN | PHYSICAL FITNESS LEVEL | ... | REMARKS |
|---|---|---|---|---|---|---|---|---|---|---|---|
| U001 | MORI | 20 | F | 50kg | 25% | TO GET IN SHAPE | NOT SPECIFIED | AVATAR | 5 | ... | NONE |
| U002 | SATO | 35 | M | 90kg | 35% | TO LOSE WEIGHT | ○○ | PHOTOGRAPHED IMAGE | 2 | ... | NONE |
| ... | ... | ... | ... | ... | ... | ... | ... | ... | ... | ... | ... |

2602

TRAINER INFORMATION DATABASE

| TRAINER ID | NAME | SEX | YEARS OF EXPERIENCE | SPECIALTY | REQUIRED PHYSICAL FITNESS LEVEL | LESSON TYPE | ... | REMARKS |
|---|---|---|---|---|---|---|---|---|
| T001 | TANAKA | F | 5 YEARS | ·YOGA<br>·EXERCISE | 3 OR HIGHER | ·PRIVATE<br>·GROUP | ... | XXX GRAND PRIX WINNER |
| T002 | SAITO | M | 5 YEARS | ·STRENGTH TRAINING<br>·EXERCISE | 5 OR HIGHER | ·PRIVATE | ... | THIRD PLACE IN BODYBUILDING CHAMPIONSHIP |
| T003 | KATO | M | 10 YEARS | ·ALL | 1 OR HIGHER | ·PRIVATE<br>·GROUP | ... | YYY WINNER |
| ... | ... | ... | ... | ... | ... | ... | ... | ... |

2603

TRAINING HISTORY DATABASE

| TRAINING ID | DATE AND TIME | MEETING ID | TRAINEE ID | TRAINER ID | SENSING RESULT | DETAILS OF INSTRUCTION | ASSESSMENT OF TRAINER | MATCH-MAKING ID |
|---|---|---|---|---|---|---|---|---|
| OT003 | Date003 | MTG003 | U010, U015 | T020 | DT_U010, DT_U015 | AVC_020 | 5 | MC_005 |
| ... | ... | ... | ... | ... | ... | ... | ... | ... |

INFORMATION PROCESSING APPARATUS, AND METHOD

CROSS-REFERENCE TO RELATED APPLICATIONS

This application is a Continuation application of No. PCT/JP2021/026675, filed on Jul. 15, 2021, and the PCT application is based upon and claims the benefit of priority from Japanese Patent Application No. 2020-136049, filed on Aug. 11, 2020, Japanese Patent Application No. 2021-063763, filed on Apr. 2, 2021, Japanese Patent Application No. 2021-063771, filed on Apr. 2, 2021, and Japanese Patent Application No. 2021-096232, filed on Jun. 8, 2021, the entire contents of which are incorporated herein by reference.

TECHNICAL FIELD

The present disclosure relates to an information processing apparatus, and a method.

BACKGROUND ART

There are known techniques for taking a video of a user moving with a camera and evaluating the movement of the user based on the taken video.

In Japanese Patent Laid-Open No. 2016-81504, there is described a technique relating to an apparatus for judging the pros and cons of rank promotion by recognizing the form of a martial art based on the skeleton of the human body with a depth camera and automatically evaluating the movement of the user.

BRIEF DESCRIPTION OF DRAWINGS

FIG. 4 is a diagram showing data structures of a user information database 281, a measurement item information 282, a measurement history database 283 and a friend list 284 stored in the server 20.

FIG. 13 is a diagram showing data structures of a measurement result database 287 and an evaluation result database 288 stored in the server 20 according to the second embodiment.

FIG. 20 is a diagram showing data structures of various data stored in the server 20 in the third embodiment.

FIG. 21A shows example screens in a situation where the terminal apparatus 10 presents a possible future trouble of the body of the user and proposes an exercise regimen corresponding to the trouble based on the measurement result and evaluation result of the movement of the body of the user.

FIG. 21B shows example screens in a situation where the terminal apparatus 10 presents a possible future trouble of the body of the user and proposes an exercise regimen corresponding to the trouble based on the measurement result and evaluation result of the movement of the body of the user.

FIG. 23 is a diagram showing data structures of various data stored in the server 20 in an example modification of the fourth embodiment.

FIG. 26 is a diagram showing data structures of a trainee information database 2601, a trainer information database 2602, and a training history database 2603 stored in the server 20 in a fifth embodiment.

DESCRIPTION OF EMBODIMENTS

Figure 1:
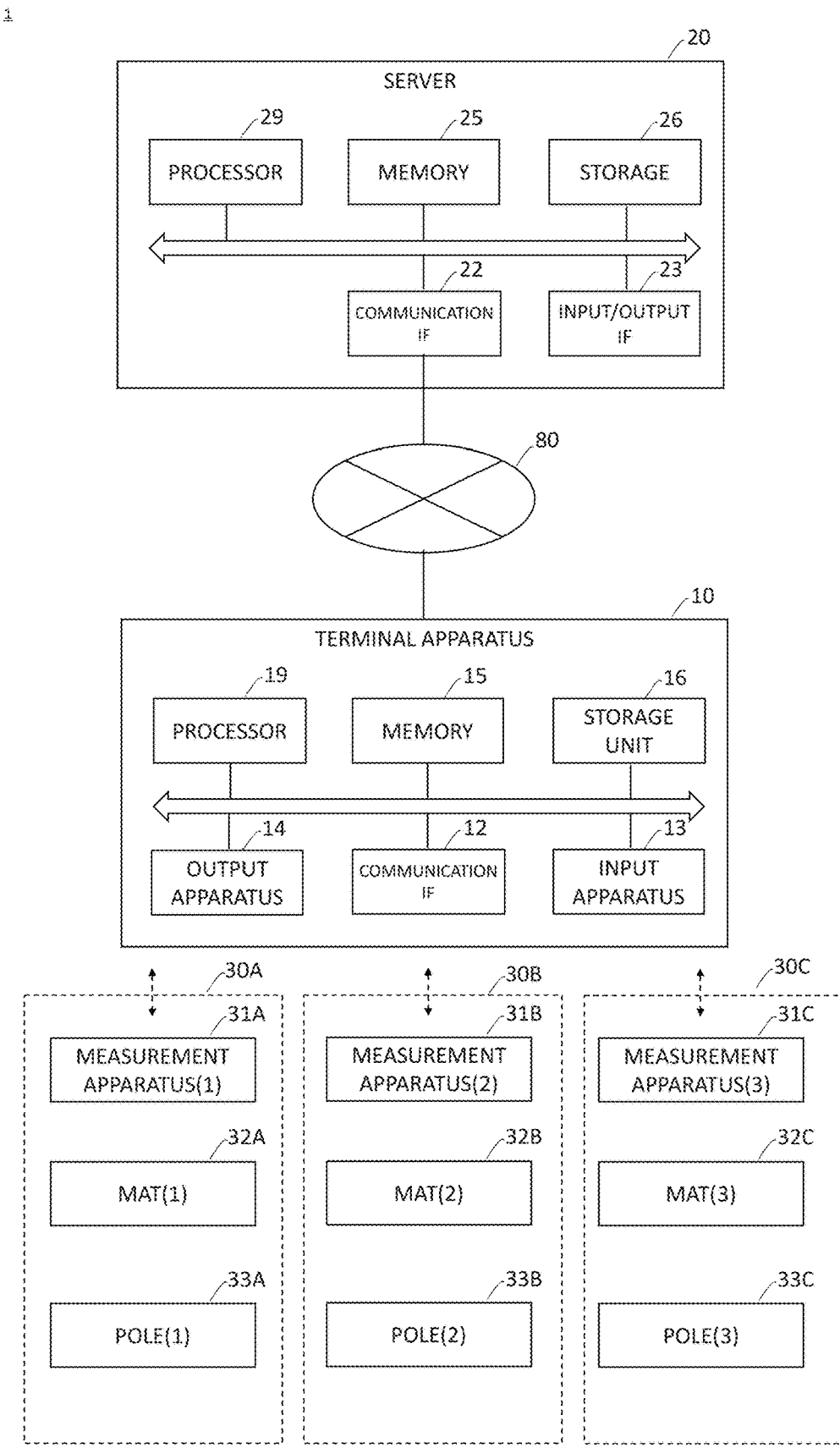
FIG. 1 is a diagram showing a configuration of the whole of a measurement system 1.

In the following, embodiments of the present disclosure will be described with reference to the drawings. In the following description, the same components are denoted by the same reference symbols. The same components have the same names and same functions. Therefore, detailed description thereof will not be repeated.

According to an embodiment, an information processing apparatus is provided. The apparatus comprises a processor and a memory with instructions thereon. The instructions upon execution by the processor, causes the processor to: sequentially sense a movement of a body of a user; present, to the user, an avatar corresponding to the user, rather than a photographed image of an appearance of the user, based on a result of the sensing so that the user perceives a shape of a surface of the body of the user; determine a position of a figure object to be drawn that serves as a guide for movement of the body of the user in association with the avatar based on the result of the sensing; and display the figure object at the determined position.

First Embodiment

<Overview>

In the embodiment described below, a measurement system 1 will be described which evaluates the flexibility of the body of a user by measuring the balance of the body of the user or a movement of the body of the user, and provides an exercise regimen for the user to achieve a good posture (such as a good walking posture).

If the walking posture of a user is not good, the user may make an unnecessary movement while walking, so that the user may unnecessarily consume his or her energy and easily get tired. If the user achieves a good walking posture, the user can make functional movements and as a result can walk with less effort. In view of this, the measurement system 1 (1) measures the movement of the user while walking to evaluate the walking posture (whether the user is properly walking in a well-balanced manner or not), (2) measures the flexibility of a joint of the user to perform the range of motion (ROM) check that evaluates the joint range of motion, and (3) evaluates the condition of the muscles of the user and provides a training regimen.

When the user is walking in a well-balanced manner (for example, the movement of the body of the user is not off-balance to the left or right or the movement of the muscles while walking is ideal), the user is making functional movements. The functional movement means that the user is using his or her muscles for walking without unnecessarily consuming energy. That is, when the user uses his or her muscles to provide propulsion for walking, the movement of the muscles efficiently provides the propulsion. As a result, the user can give an impression that the user is walking in a beautiful posture. In order for the user to achieve such a well-balanced waking posture, it is useful to evaluate the joint range of motion. The measurement system 1 evaluates the joint range of motion and provides the user with the evaluation result of the joint range of motion and a strength training regimen for achieving a good walking posture based on the evaluation result of the joint range of motion.

As described above, the measurement system 1 measures (checks) the movement of the body of the user and provides a body exercise for the user.

The measurement system 1 can be installed in an office of a business company, a commercial facility, a shop space, a studio, or an ordinary household, for example. A business company may introduce the measurement system 1 in order to improve the health of the employees, for example. A shop in a commercial facility may use the measurement system 1 to provide health care services to customers.

<1. Diagram Showing Configuration of Whole of System>

FIG. 1 is a diagram showing a configuration of the whole of the measurement system 1.

As shown in FIG. 1, the measurement system 1 includes a plurality of measurement units including various sensors that measure a movement of the body of a user (in the example shown, measurement units 30A, 30B, and 30C are shown. In the following, the measurement unit may be referred to also as a measurement unit 30), a terminal apparatus 10 that controls the operation of the measurement units (in the example shown, a terminal apparatus 10 is shown. In the following, the terminal apparatus may be referred to also as a terminal apparatus 10A, a terminal apparatus 10B or the like when there are terminal apparatuses of a plurality of users. The same holds true for a component (such as a processor) of the terminal apparatus), and a server 20 that stores measurement results of movements of the body of the user.

The measurement unit 30 is connected wirelessly or by wire to the terminal apparatus 10. As shown in the drawing, a plurality of measurement units 30 may be connected to one terminal apparatus 10, or a terminal apparatus 10 may be connected to each of a plurality of measurement units 30 (that is, one terminal apparatus 10 may be prepared for each measurement unit 30 for user measurement).

The measurement unit 30 includes a measurement apparatus (in the example shown, measurement apparatuses 31A, 31B, and 31C are shown. These may be generically referred to as a measurement apparatus 31), a mat (in the example shown, mats 32A, 32B, and 32C are shown. These may be generically referred to as a mat 32), and a pole (in the example shown, poles 33A, 33B, and 33C are shown. These may be generically referred to as a pole 33).

The measurement apparatus 31 is intended to measure a movement of the body of a user. For example, the measurement apparatus 31 detects the distance and direction to a measurement target with an RGB-D camera (a depth sensor). The measurement apparatus 31 may further have a microphone array or the like to detect a voice of a user or the direction from which the voice comes, for example. For example, the measurement apparatus 31 may be a device capable of detecting a gesture of a user or receiving an operation of a user through voice recognition, such as Kinect (registered trademark). The measurement apparatus 31 detects the body of a user, thereby detecting the position of the user and the positions of joints of the body of the user. In this way, the measurement apparatus 31 sets virtual bones that virtually connect joints of the user, thereby measuring the movement of the body of the user. The measurement apparatus 31 may be other terminals than Kinect (registered trademark), such as a smartphone. For example, when a smartphone is provided with a depth camera, point cloud data representing the body of the user can be obtained with the smartphone.

The measurement apparatus 31 need not have a function of measuring distance and may obtain the distance to a subject (the distance to a joint of the subject, for example) based on a taken image by locating the subject based on the taken image and using a leaned model that estimates the distance between the subject and the camera. Even when the measurement apparatus 31 cannot measure distance (such as when the measurement apparatus 31 is an RGB camera), the measurement apparatus 31 may locate parts of the subject based on the taken image and estimate the skeleton (bones). A plurality of cameras may be provided as the measurement apparatus 31, and the distance to the subject may be estimated from images taken from different viewpoints.

The mat 32 provides a guide for the foot positions of the user for measurement of the movement of the body of the user. The mat 32 is disposed in a predetermined positional relationship to the measurement apparatus 31. That is, the mat 32 is disposed within a range where the measurement apparatus 31 can measure the movement of the body of the user. As described later, the mat 32 includes a plurality of marks as a guide for the foot positions of the user. The user adjusts the foot positions or makes a movement of stepping forward by watching the marks.

The pole 33 is used with the mat 32 to measure the movement of the body of the user, such as a movement of the user twisting his or her body. The pole 33 is disposed on the mat 32 in a position associated with the guide marks for the foot positions of the user. With both the feet in contact with the mat 32 (that is, with the foot positions kept unchanged), the user makes a movement of twisting his or her body to touch any of a pair of poles placed on either side of the mat 32. Therefore, the pole 33 is used as a target point to which the arms are moved in order for the user to make the body twisting movement. The pole 33 may be set at an appropriate height for the user so that the user can grasp the pole 33 with his or her hands when twisting his or her body.

A combination of the measurement apparatus 31, the mat 32, and the pole 33 of the measurement unit 30 has been described above. The following description will be made on the premise that one user uses one measurement unit 30. However, one measurement apparatus 31 may measure movements of the bodies of a plurality of users. That is, a plurality of users may take exercise within the measurement range of one measurement apparatus 31.

The terminal apparatus 10 and the server 20 are connected to and communicate with each other via a network 80. In this embodiment, each apparatus (the terminal apparatus, the server or the like) can also be regarded as an information processing apparatus. That is, each unit of apparatus can be regarded as one "information processing apparatus", and the measurement system 1 can be formed as a set of a plurality of apparatuses. A plurality of required functions of the measurement system 1 according to this embodiment can be appropriately assigned to one or more pieces of hardware in view of the processing capability of each piece of hardware and/or the required specifications of the measurement system 1.

The terminal apparatus 10 is an apparatus operated by a user. The terminal apparatus 10 may be a desktop personal computer (PC) or a laptop PC, for example. Alternatively, the terminal apparatus 10 may be implemented as a portable terminal or the like that supports a mobile communication system, such as a smartphone or a tablet. As shown as the terminal apparatus 10 in FIG. 1, the terminal apparatus 10 includes a communication interface (IF) 12, an input apparatus 13, an output apparatus 14, a memory 15, a storage unit 16, and a processor 19. The server 20 includes a communication IF 22, an input/output IF 23, a memory 25, a storage 26, and a processor 29.

The terminal apparatus 10 is communicatively connected to the server 20 via the network 80. The terminal apparatus 10 supports a communication standard, such as 5G or Long Term Evolution (LTE), and a wireless local area network (LAN) standard, such as Institute of Electrical and Electronics Engineers (IEEE) 802.11, and is connected to the network 80 by communicating with communication equipment.

The communication IF 12 is an interface for inputting and outputting a signal that allows the terminal apparatus 10 to communicate with an external apparatus. The input apparatus 13 is an input apparatus (such as a touch panel, a touch pad, a pointing device such as a mouse, or a keyboard) that receives an input operation by the user. The output apparatus 14 is an output apparatus (such as a display or a speaker) that presents information to the user. The memory 15 temporarily stores a program and data or the like processed by a program or the like, and is a volatile memory, such as a dynamic random access memory (DRAM). The storage unit 16 is a storage apparatus for retaining data, and is a flash memory or a hard disc drive (HDD), for example. The processor 19 is hardware for executing an instruction set described in a program, and is formed by an arithmetic apparatus, a register, and a peripheral circuit, for example.

As shown in the drawing, the terminal apparatus 10 connects to the measurement unit 30 by wire or wirelessly. By the measurement unit 30 measuring the movement of the body of the user, the flexibility and the joint range of motion of the body of the user can be evaluated.

The server 20 manages user information. As the user information, the server 20 manages a parameter (such as height) or the like that is referred to when measuring the movement of the body of a user.

The server 20 performs processing for promoting relations between users. Specifically, the server 20 performs a match-making between users to help a plurality of users take exercise for health and measure the movements of their bodies. The server 20 is also responsible for message exchange between users, for example.

The server 20 may manage virtual loyalty points of a user. For example, suppose that a business company has a loyalty point system, and the employees can use their loyalty points as virtual currency in the company. As with the virtual currency, the loyalty point can be used for a purchase in the company (such as payment at vending machines or the like in the company) or transferred to another employee. For example, the server 20 may award the corresponding points to a user when the user performs measurements with the measurement system 1, may award the corresponding points to a user when the user performs measurements with the measurement system 1 together with another user (such as when the user performs a measurement at the same place, or at the same place at the same time, as another user), or may award the corresponding points to a user when the evaluation result of a joint range of motion exceeds a predetermined value.

The communication IF 22 is an interface for inputting and outputting a signal that allows the server 20 to communicate with an external apparatus. The input/output IF 23 serves as an interface to an input apparatus that receives an input operation by the user or an output apparatus that presents information to the user. The memory 25 temporarily stores a program and data or the like processed by a program or the like, and is a volatile memory, such as a dynamic random access memory (DRAM). The storage 26 is a storage apparatus for retaining data, and is a flash memory or a hard disc drive (HDD), for example. The processor 29 is hardware for executing an instruction set described in a program, and is formed by an arithmetic apparatus, a register, and a peripheral circuit, for example.

<1.1 Configuration of Terminal Apparatus 10>

Figure 2:
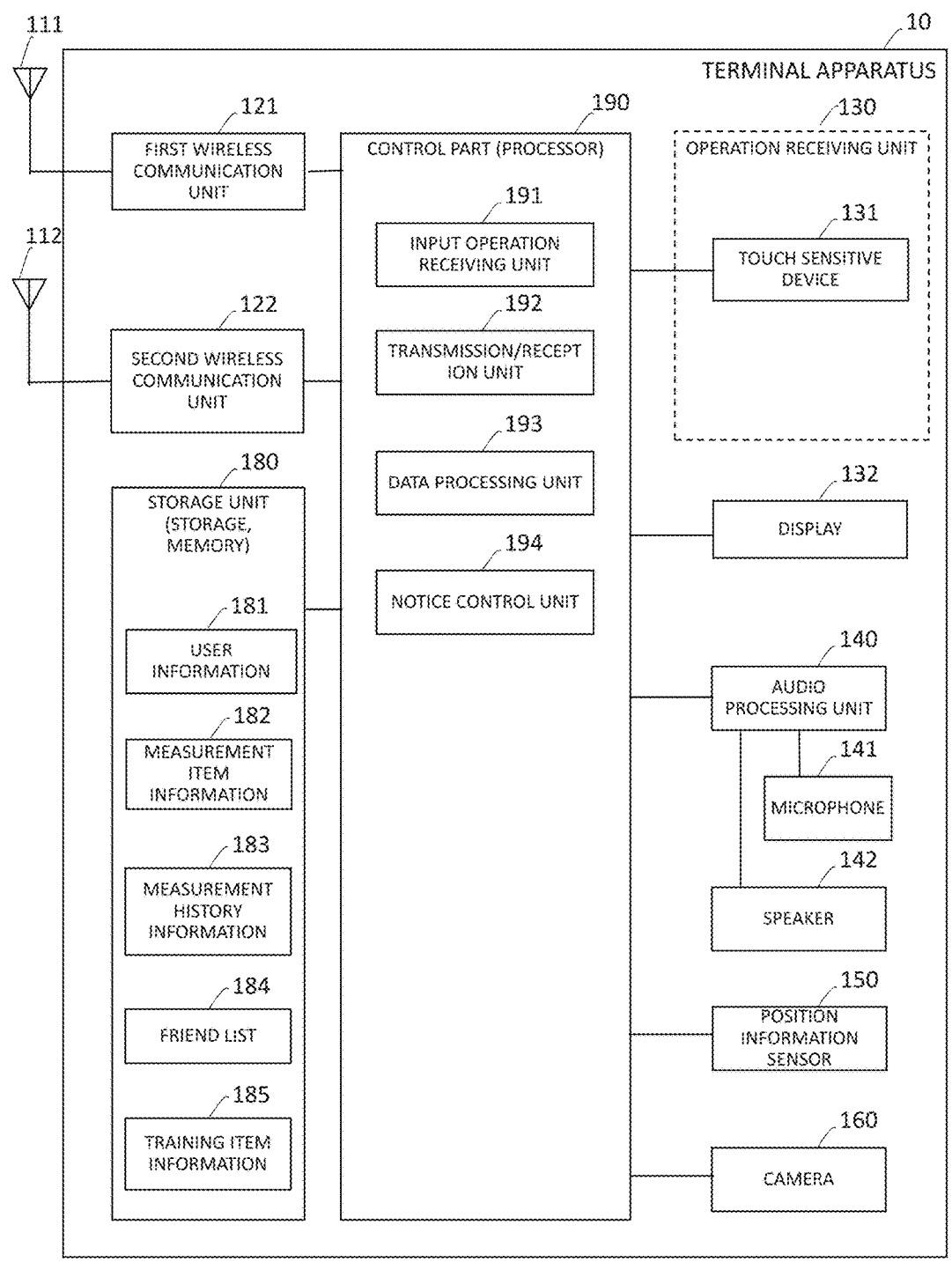
FIG. 2 is a block diagram showing a terminal apparatus 10 forming the measurement system 1 according to the first embodiment.

FIG. 2 is a block diagram showing the terminal apparatus 10 forming the measurement system 1 according to the first embodiment. As shown in FIG. 2, the terminal apparatus 10 includes a plurality of antennas (an antenna 111 and an antenna 112), wireless communication units (a first wireless communication unit 121 and a second wireless communication unit 122) associated with the antennas, an operation receiving unit 130 (which includes a touch sensitive device 131, and may further include various pointing devices, such as a touch pad, or include a keyboard or a gesture detection apparatus), a display 132, an audio processing unit 140, a microphone 141, a speaker 142, a position information sensor 150, a camera 160, a storage unit 180, and a control unit 190. The terminal apparatus 10 further has a function or component that is not specifically shown in FIG. 2 (such as a battery for holding electric power or a power supply circuit that controls the supply of electric power from the battery to each circuit). As shown in FIG. 2, the blocks included in the terminal apparatus 10 are electrically connected to each other by a bus or the like.

The antenna 111 radiates a signal emitted by the terminal apparatus 10 in the form of a radio wave. The antenna 111 also receives a radio wave in the air and provides the received signal to the first wireless communication unit 121.

The antenna 112 radiates a signal emitted by the terminal apparatus 10 in the form of a radio wave. The antenna 112 also receives a radio wave in the air and provides the received signal to the second wireless communication unit 122.

The first wireless communication unit 121 performs modulation and demodulation processing for transmitting and receiving a signal via the antenna 111 to allow the terminal apparatus 10 to communicate with other wireless equipment. The second wireless communication unit 122 performs modulation and demodulation processing for transmitting and receiving a signal via the antenna 112 to allow the terminal apparatus 10 to communicate with other wireless equipment. The first wireless communication unit 121 and the second wireless communication unit 122 are communication modules including a tuner, a received signal strength indicator (RSSI) calculation circuit, a cyclic redundancy check (CRC) calculation circuit, and a high-frequency circuit, for example. The first wireless communication unit 121 and the second wireless communication unit 122 performs modulation and demodulation or frequency conversion of a radio signal transmitted and received by the terminal apparatus 10, and provides the received signal to the control unit 190.

The operation receiving unit 130 has a mechanism for receiving an input operation by the user. Specifically, the operation receiving unit 130 includes the touch sensitive device 131 or the like as the pointing device. The touch sensitive device 131 receives an input operation by the user of the terminal apparatus 10. For example, the touch sensitive device 131 uses a capacitance-type touch panel to detect a user touch point on the touch panel. The touch sensitive device 131 outputs a signal indicating the user touch point detected by the touch panel to the control unit 190 as an input operation. The terminal apparatus 10 may receive an input operation by the user by communicating with the measurement apparatus 31 and receiving the measurement result from the measurement apparatus 31. For example, when the measurement apparatus 31 obtains point cloud data, the terminal apparatus 10 receives a gesture of the user as an input by detecting the body of the user and joints forming the body of the user based on the point cloud data and recognizing the gesture based on the detection result. The gesture of the user that can be input may be a movement of the body of the user, such as a movement of a hand or a movement of the head. For example, the operation receiving unit 130 may detect a predetermined shape of the body of the user (such as a "T" shape with the arms stretched out horizontally) or a predetermined shape of a hand of the user.

The display 132 displays data, such as an image, a video, or a text, under the control of the control unit 190. The display 132 is implemented by a liquid crystal display (LCD) or an organic electro-luminescence (EL) display, for example. The output apparatus (the display 132 and the speaker 142) may be implemented as a device separate from the terminal apparatus 10.

The audio processing unit 140 performs modulation and demodulation of an audio signal. The audio processing unit 140 modulates a signal provided from the microphone 141 and provides the modulated signal to the control unit 190. The audio processing unit 140 also provides the audio signal to the speaker 142. The audio processing unit 140 is implemented by a processor for audio processing, for example. The microphone 141 receives an audio input and provides an audio signal corresponding to the audio input to the audio processing unit 140. The speaker 142 converts the audio signal provided by the audio processing unit 140 into a sound and outputs the sound to the outside of the terminal apparatus 10.

The position information sensor 150 is a sensor that detects the position of the terminal apparatus 10, and is a global positioning system (GPS) module, for example. The GPS module is a receiving apparatus used in the satellite positioning system. In the satellite positioning system, the GPS module receives signals from at least three or four satellites, and detects the current position of the terminal apparatus 10 in which the GPS module is incorporated based on the received signals. For example, when the measurement system 1 records the place where the user has performed measurements, the detection result of the position information sensor 150 (such as latitude and longitude information, information on a facility identified from the latitude and longitude information and map information, or information on a business entity associated with the facility) may be associated with the measurement result and retained in the server 20. That is, the terminal apparatus 10 may determine the place where the user has performed measurements based on the detection result of the position information sensor 150, rather than relying on the operation of the user inputting the place.

The camera 160 is a device that receives light at a light-receiving element and outputs the received light as a taken image. The camera 160 is a depth camera capable of detecting the distance from the camera 160 to the subject. In this embodiment, the measurement apparatus 31 may be implemented by the camera 160 of the terminal apparatus 10. That is, the terminal apparatus 10 and the measurement apparatus 31 does not have to be implemented as separate apparatuses, and the terminal apparatus 10 may have the functionality of the measurement apparatus 31.

The storage unit 180 is formed by a flash memory, for example, and stores data and a program to be used by the terminal apparatus 10. In a situation, the storage unit 180 stores user information 181, measurement item information 182, measurement history information 183, a friend list 184, and training item information 185. Although these will be described in detail later, these are summarized as follows. The terminal apparatus 10 may obtain these pieces of information from various databases of the server 20 described later.

The user information 181 is information on a user of the measurement system 1. The user information includes information for identifying the user, the name of the user, an affiliation of the user, or information on the body of the user (such as height, weight, or age).

The measurement item information 182 is information on measurement items in the case of performing ROM check. The measurement item information 182 includes information on an audio guide to be output to the user for a measurement item.

The measurement history information 183 indicates a history of measurement results of a movement of the body of the user.

The friend list 184 indicates information on a user registered as a friend by the user. Users who have registered each other as friends may be able to transmit and receive messages.

The training item information 185 includes information on a training item in the case of providing a muscle training regimen to the user. For example, the training item information 185 includes the name of the training and information on video and audio serving as a guide for the user to take exercise. The terminal apparatus 10 measures, with the measurement apparatus 31, the user taking exercise according to the video and audio serving as a guide, and sequentially displays the measurement result on the display 132. The terminal apparatus 10 may display for comparison the ideal movement of the body and the measurement result (movements of joints) of the user taking exercise on the display 132 so as to facilitate the user to move his or her body in an ideal way.

The control unit 190 controls an operation of the terminal apparatus 10 by reading in a program stored in the storage unit 180 and executing an instruction included in the program. The control unit 190 is an application processor, for example. The control unit 190 operates according to the program to serve functions as an input operation receiving unit 191, a transmission/reception unit 192, a data processing unit 193, and a notice control unit 194.

The input operation receiving unit 191 performs processing of receiving an input operation of the user on the input apparatus such as the touch sensitive device 131. The input operation receiving unit 191 determines the type of the operation by the user, such as whether the operation is a flick operation, a tap operation or a drag (swipe) operation, based on information on the coordinates of the point where the user has touched the touch sensitive device 131 with a finger or the like.

The transmission/reception unit 192 performs processing for the terminal apparatus 10 to transmit or receive data to or from an external apparatus, such as the server 20 or the measurement unit 30, according to a communication protocol.

The data processing unit 193 performs processing of performing a calculation on input data received by the terminal apparatus 10 according to a program and outputting the calculation result to a memory or the like.

The notice control unit 194 performs processing of making the display 132 display an image or processing of making the speaker 142 output audio. For example, the notice control unit 194 outputs an audio guide when performing ROM check, and presents an audio guide and video showing an exemplary movement of the body when providing a training regimen for exercise.

<1.2 Functional Configuration of Server 20>

Figure 3:
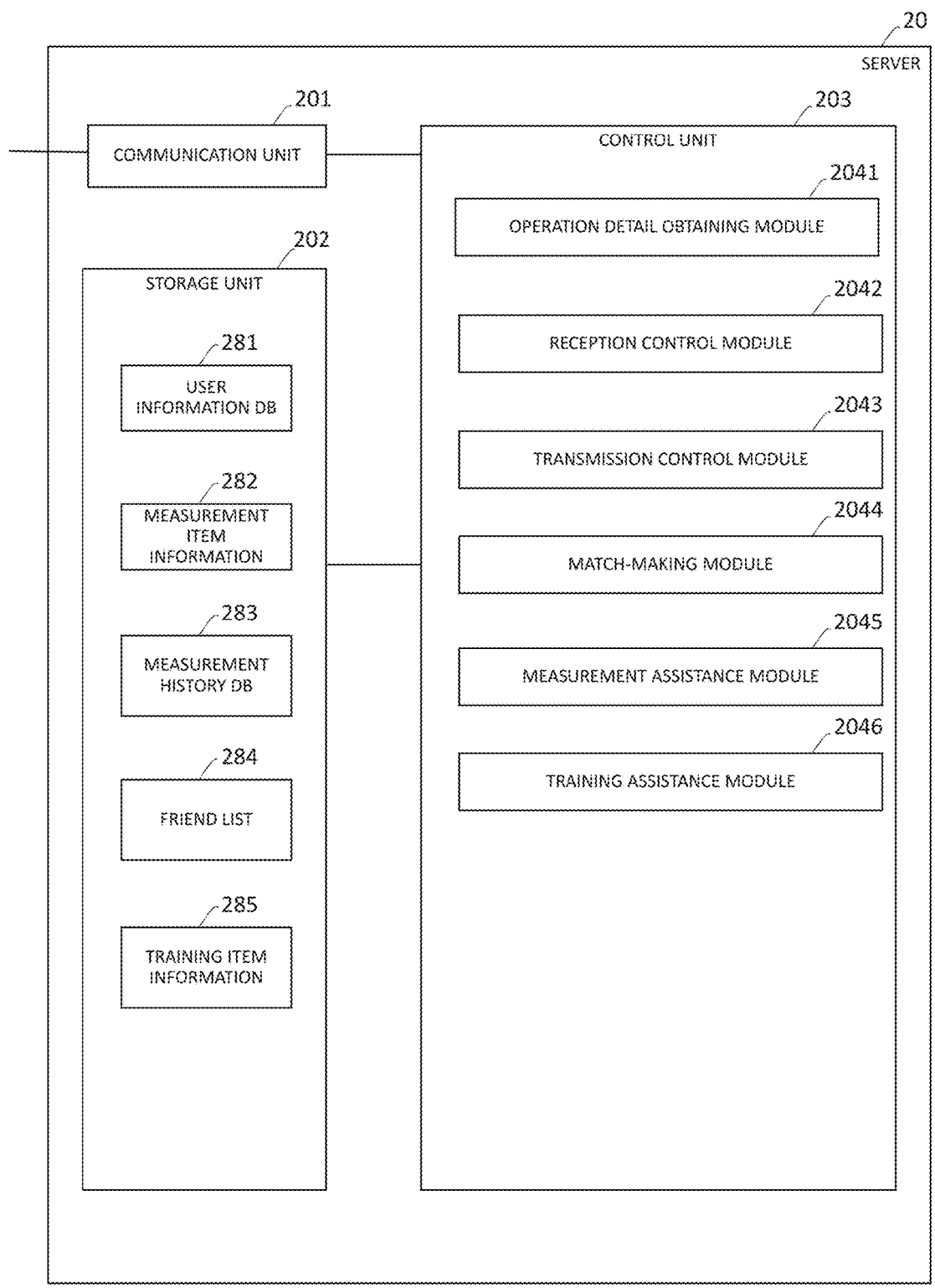
FIG. 3 is a diagram showing a functional configuration of a server 20.

FIG. 3 is a diagram showing a functional configuration of the server 20. As shown in FIG. 3, the server 20 serves functions as a communication unit 201, a storage unit 202, and a control unit 203.

The communication unit 201 performs processing for the server 20 to communicate with an external apparatus, such as the terminal apparatus 10.

The storage unit 202 stores data and a program to be used by the server 20. The storage unit 202 stores a user information database 281, measurement item information 282, a measurement history database 283, and a friend list 284, for example.

The user information database 281 indicates information on the user who performs measurements with the measurement system 1. The user information database 281 will be described in detail later.

The measurement item information 282 indicates information on each of a plurality of measurement items. The measurement item information 282 will be described in detail later.

The measurement history database 283 indicates a history of measurements performed by the user. The measurement history database 283 will be described in detail later.

The friend list 284 is a database for retaining information on a user registered as a friend by the user.

Training item information 285 includes information on a training item in the case of providing a training regimen for exercise to the user. The training regimen includes information on a plurality of training items, depending on the load on the body of the user or the part of the body to be worked on.

The control unit 203 serves functions of various modules by the processor of the server 20 performing processing according to a program.

An operation detail obtaining module 2041 obtains details of the operation by the user. For example, the operation detail obtaining module 2041 receives an operation for the user to obtain a past measurement result from the measurement unit 30 and a past evaluation result of the movement of the body of the user, an operation for transmitting and receiving a message to or from another user, or an operation for applying for participation in a measurement with the measurement unit 30, for example.

A reception control module 2042 controls processing of the server 20 receiving a signal from an external apparatus according to a communication protocol.

A transmission control module 2043 controls processing of the server 20 transmitting a signal to an external apparatus according to a communication protocol.

A match-making module 2044 makes a match between users. For example, the match-making module 2044 may detect that a plurality of users has performed measurements with the measurement system 1 at the same measurement site, make a match between the users, and prompt the users to register each other as friends. The match-making module 2044 may extract users having similar histories of measurements with the measurement system 1 and make a match between the users, or extract users having similar results of the ROM check with the measurement unit 30 and make a match between the users. By making a match between a plurality of users and prompting the users to register each other as friends, the plurality of users can be prompted to have a training for getting a good posture together. Therefore, the measurement system 1 can assist the users to continue measurements.

A measurement assistance module 2045 assists the progress of the processing of the measurement unit 30 measuring the movement of the body of the user. The measurement assistance module 2045 reads measurement items indicated by the measurement item information 282 and sequentially outputs an audio guide or the like for the measurement of the measurement items to the user. For example, the server 20 may transmit measurement items to the terminal apparatus 10 to make the terminal apparatus 10 sequentially measure the movement of the body of the user according to the measurement items.

A training assistance module 2046 assists the progress of the processing of providing a training regimen through video and audio to the user. The training assistance module 2046 reads training items indicated by the training item information 285 and sequentially outputs an audio guide, a video guide or the like for training according to the training items.

<2. Data Structure>

FIG. 4 is a diagram showing data structures of the user information database 281, the measurement item information 282, the measurement history database 283 and the friend list 284 stored in the server 20.

As shown in FIG. 4, each record of the user information database 281 includes an item "user identification information (user ID)", an item "user name", an item "sex", an item "height", an item "weight", an item "affiliation", an item "evaluation value", and an item "company loyalty point", for example.

The item "user identification information (user ID)" is information for identifying the user.

The item "user name" is the name set by the user.

The item "sex" indicates the sex of the user. For example, the user may select his or her sex when registering user information to start using the measurement system 1.

The item "height" indicates the height of the user, which is information to be referred to when measuring the movement of the body of the user.

The item "weight" is information on the weight of the user. If the weight information is not referred to when measuring the movement of the body of the user, for example, the item "weight" may contain no data.

The item "affiliation" is information on the affiliation of the user who belongs to an organization, for example. The item "affiliation" includes information on a company name, an organization name, or a business office name, for example. The item "affiliation" may include information on the address of the office where the user works.

The item "evaluation value" includes information on an evaluation value based on the measurement result of the ROM check of the user with the measurement system 1 or an evaluation value based on the measurement result of the posture of the user walking. If the terminal apparatus 10 classifies the results of ROM check of the user based on the measurement result with the measurement unit 30, the evaluation value includes information on the result of the classification.

The item "company loyalty point" indicates the amount of points of the user when the business company to which the user belongs has a virtual loyalty point system.

Each record of the measurement item information 282 includes an item "measurement item number (measurement item No.)", an item "measured part", an item "audio guide", an item "foot positions on mat", and an item "body part to be measured".

The item "measurement item number (measurement item No.)" is information for identifying the measurement item.

The item "measured part" indicates the part of the body to be measured. For example, parts for which the joint range of motion is evaluated are as follows.

(i) Measurement of Upper Limb

Scapula: the movements include flexion, extension, elevation, and depression.

Shoulder: the movements include flexion, extension, abduction, adduction, external rotation, and internal rotation.

Elbow: the movements include flexion and extension.

Forearm: the movements include pronation and supination.

Wrist: the movements include flexion, extension, radial flexion, and ulnar flexion.

(ii) Measurement of Fingers

Thumb: the movements include radial abduction, ulnar adduction, palmar abduction, palmar adduction, flexion, and extension.

Fingers: the movements include flexion, extension, abduction, and adduction.

(iii) Measurement of Lower Limb

Hip: the movements include flexion, extension, abduction, adduction, external rotation, and internal rotation.

Knee: the movements include flexion and extension.

Ankle: the movements include flexion and extension.

Foot: the movements include eversion, inversion, abduction, and adduction.

Big toe: the movements include flexion and extension.

Toes: the movements include flexion and extension.

(iv) Measurement of Trunk

Cervical spines: the movements include flexion, extension, rotations (left rotation and right rotation), and lateral flexions (left flexion and right flexion).

Thoracic and lumbar spines: the movements include flexion, extension, rotations (left rotation and right rotation), and lateral flexions (left flexion and right flexion).

The item "audio guide" indicates details of the audio presented to the user when performing the measurement indicated by the measurement item. The audio guide includes audio for the case where the user does not put his or her feet at prescribed positions on the mat 32 (such as "put your feet at the prescribed positions on the mat"), audio for prompting the user to move his or her body after the terminal apparatus 10 detects that the user has put his or her feet at the prescribed positions on the mat 32 for measurement (such as "twist your body with your feet kept at the prescribed positions on the mat"), and audio for the case where measurement data on the movement of the body of the user has been obtained based on the measurement result from the measurement apparatus 31 (such as "the measurement is normally made").

The item "foot positions on mat" includes information on where the user should put his or her feet on the mat 32 for measurement (the positions at which the user should put his or her feet on the mat 32). For example, the terminal apparatus 10 detects whether the user has put his or her feet at the prescribed positions on the mat or not based on the information of the item "foot positions on mat". Based on the detection, the terminal apparatus 10 outputs to the user audio indicating details of the movement of the body to be measured.

The item "body part to be measured" indicates the part of the body of the user that is to be measured for the measurement item.

Each record of the measurement history database 283 includes an item "measurement number (measurement No.)", an item "date and time", an item "user identification information (ID)", an item "place of measurement", an item "measurement data", and an item "evaluation result". The server 20 receives the measurement result of the measurement of the movement of the body of the user from the terminal apparatus 10. The server 20 updates the records in the measurement history database 283 based on the information received from the terminal apparatus 10.

The item "measurement number (measurement No.)" indicates a measurement result of measurement of the movement of the body of the user with the measurement unit 30.

The item "data and time" indicates the timing when the user performed measurements with the measurement unit 30.

The item "user identification information (ID)" is information for identifying the user who has measured the movement of the body with the measurement unit 30.

The item "place of measurement" indicates the place where the user performed measurements with the measurement unit 30. When the server 20 receives the measurement result from the terminal apparatus 10, the server 20 may refer to information on the user associated with the measurement result, and determine the place where the user performed the measurement based on the information (user information database 281) associated with the user. For example, based on the information on the affiliation of the user indicated in the user information database 281, the server 20 may regard the information on the place of the affiliation as the place where the user performed the measurement with the measurement unit 30. Alternatively, when the terminal apparatus 10 obtains position information with the position information sensor 150, for example, the place of the terminal apparatus 10 may be regarded as the place where the user performed the measurement with the measurement unit 30.

The item "measurement data" indicates the measurement result of the movement of the body of the user measured with the measurement unit 30. For example, when the movement of the body of the user is measured as time-series point cloud data, the time-series point cloud data may be regarded as the measurement result for the item "measurement data". Alternatively, for the body of the user measured by the measurement apparatus 31, the terminal apparatus 10 may determine the positions of joints of the user based on the measurement result, and the server 20 may retain the movements of the joints as the measurement result of the movement of the body of the user. For example, the terminal apparatus 10 may measure temporal movements of joints of the user by detecting certain parts of the body, such as a shoulder or an elbow, based on a taken image of the body of the user.

The item "evaluation result" is an evaluation result that indicates the level of the movement of the body of the user based on the measurement result indicated by the item "measurement data". When the terminal apparatus 10 retains time-series data on the movement of a joint of the user as the item "measurement data", for example, the terminal apparatus 10 evaluates the movement of the body of the user by comparing the movement with the reference data on the movement of the body. For example, if the terminal apparatus 10 retains data on ranking of quality of the movement of the body of the user as reference data, the terminal apparatus 10 can determine the reference data on the movement closest to the measurement result of the movement of the body of the user.

Each record of the friend list 284 includes an item "user 1), an item "user 2", an item "friend registration date", an item "history of measurement at same timing", and an item "history of message exchange", for example.

The item "user 1" indicates one of the users who have registered each other as friends.

The item "user 2" indicates the other of the users who have registered each other as friends.

The item "friend registration date" indicates the date and time when the users registered each other as friends.

The item "history of measurement at same timing" indicates a history of measurements performed by the users registered as friends at the same place and/or at the same timing. For example, when the measurement unit 30 is disposed in the office space or the like of a business office, a plurality of users can be regarded as having performed measurements at the same timing if the users have performed measurements in a certain time period. The item "history of measurement at same timing" may include information on the places where a plurality of users performed measurements. For example, by referring to the friend list 284, the server 20 can determine the frequency at which a plurality of users performs measurements of the movement of the body with the measurement unit 30 and conducts a training according to a training regimen.

The item "history of message exchange" indicates a history of messages transmitted and received between the users registered as friends.

<3. Configuration of Measurement Unit 30>

Figure 5:
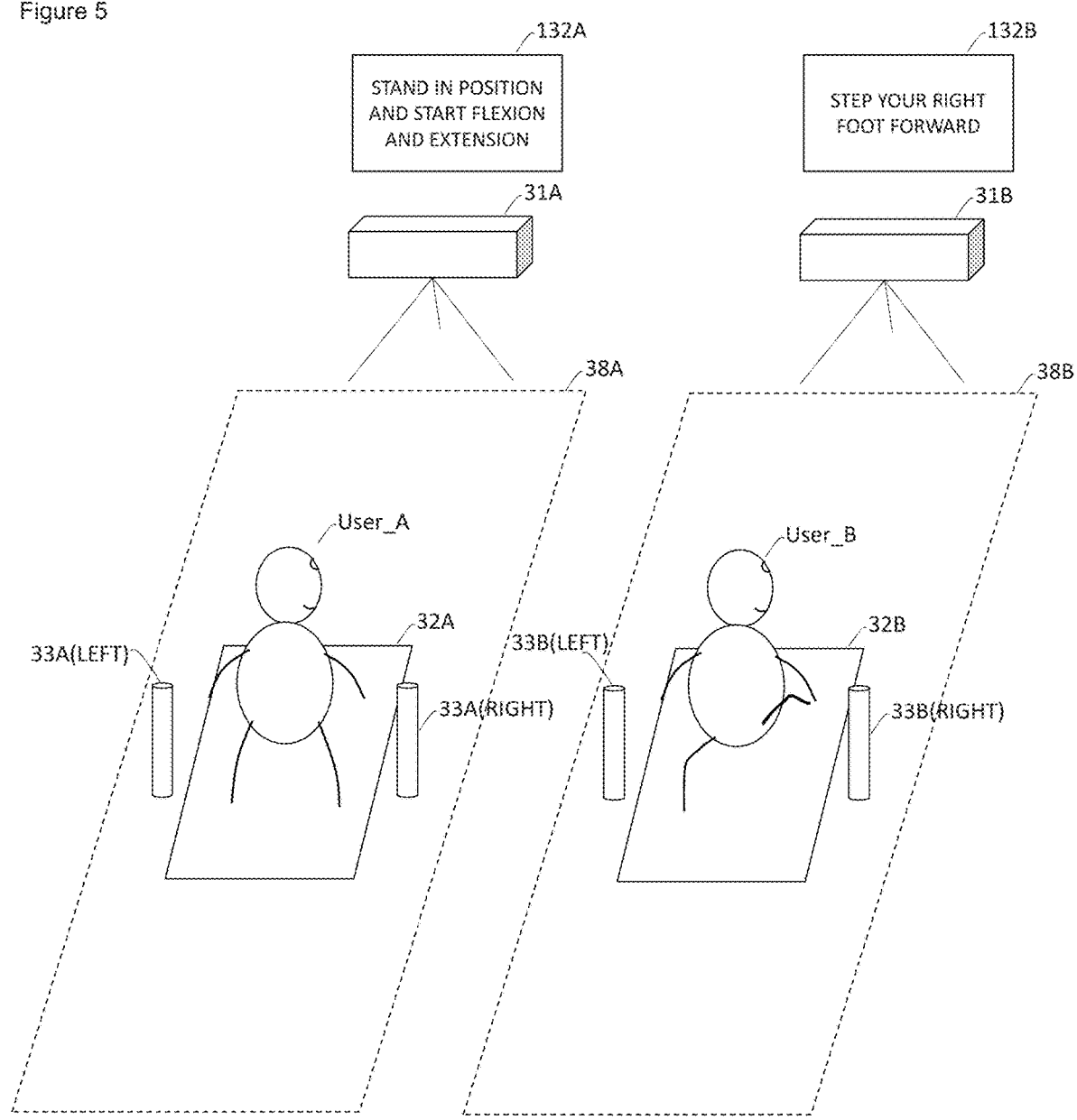
FIG. 5 shows a situation where users measure movements of their bodies.

FIG. 5 shows a situation where users measure the movement of the body. FIG. 5 shows an example where a plurality of measurement units 30 is installed, and a plurality of users performs measurements. In the example shown, one terminal apparatus 10 is connected to the plurality of measurement units 30.

The measurement apparatus 31A measures the movement of the body of a first user User_A in a detection range 38A, in which the measurement apparatus 31A can sense the body of the user. In the detection range 38A, the mat 32A is arranged in a predetermined positional relationship to the measurement apparatus 31A. Here, the position of the mat 32A may be a position at a certain distance (such as several meters or so) from the front of the measurement apparatus 31A, for example. The mat 32A is preferably arranged with respect to the measurement apparatus 31A in such a manner that the measurement apparatus 31A can measure the movement of the entire body of the first user User_A when the user is on the mat 32A. The poles 33A are arranged on the left and right sides of the mat 32A. For example, when there are marks indicating prescribed positions (which may be referred to also as home positions) for the feet of the user on the mat 32A, the pair of poles 33A may be arranged outside of the mat 32A with respect to the marks. The poles 33A are installed as a target to be grasped by the user when the user makes a movement of twisting the upper limb on the mat 32A with the feet kept at the prescribed positions. With the poles 33A, when the user makes a movement of twisting the upper body, the user naturally reaches toward the pole 33A, so that the form of the movement of the upper body can be stabilized to some extent even when an increased number of measurements are performed. That is, variations of the time-series measurement result of the movement of the body of the user can be reduced.

The measurement apparatus 31B measures the movement of the body of a second user User_B in a detection range 38B, in which the measurement apparatus 31B can sense the body of the user. In the detection range 38B, the mat 32B is arranged in a predetermined positional relationship to the measurement apparatus 31B. Here, the position of the mat 32B may be a position at a certain distance (such as several meters or so) from the front of the measurement apparatus 31B, for example. The mat 32B is preferably arranged with respect to the measurement apparatus 31B in such a manner that the measurement apparatus 31B can measure the movement of the entire body of the second user User_B when the user is on the mat 32B. The poles 33B are arranged on the left and right sides of the mat 32B.

The first user User_A moves his or her body while watching video and audio displayed on the display 132A and checking the foot positions with respect to the marks on the mat 32A. Similarly, the second user User_B moves his or her body according to a video displayed on the display 132B and audio guide. In this way, the measurement apparatuses 31A and 31B can measure the movements of the bodies of the first user User_A and the second user User_B, respectively.

In the example shown, the first user User_A is about to start flexion and extension with the feet placed at the home positions on the mat 32A in accordance with the output of the display 132A. The second user User_B is making a movement of stepping the right foot forward in accordance with the output of the display 132B.

Figure 6:
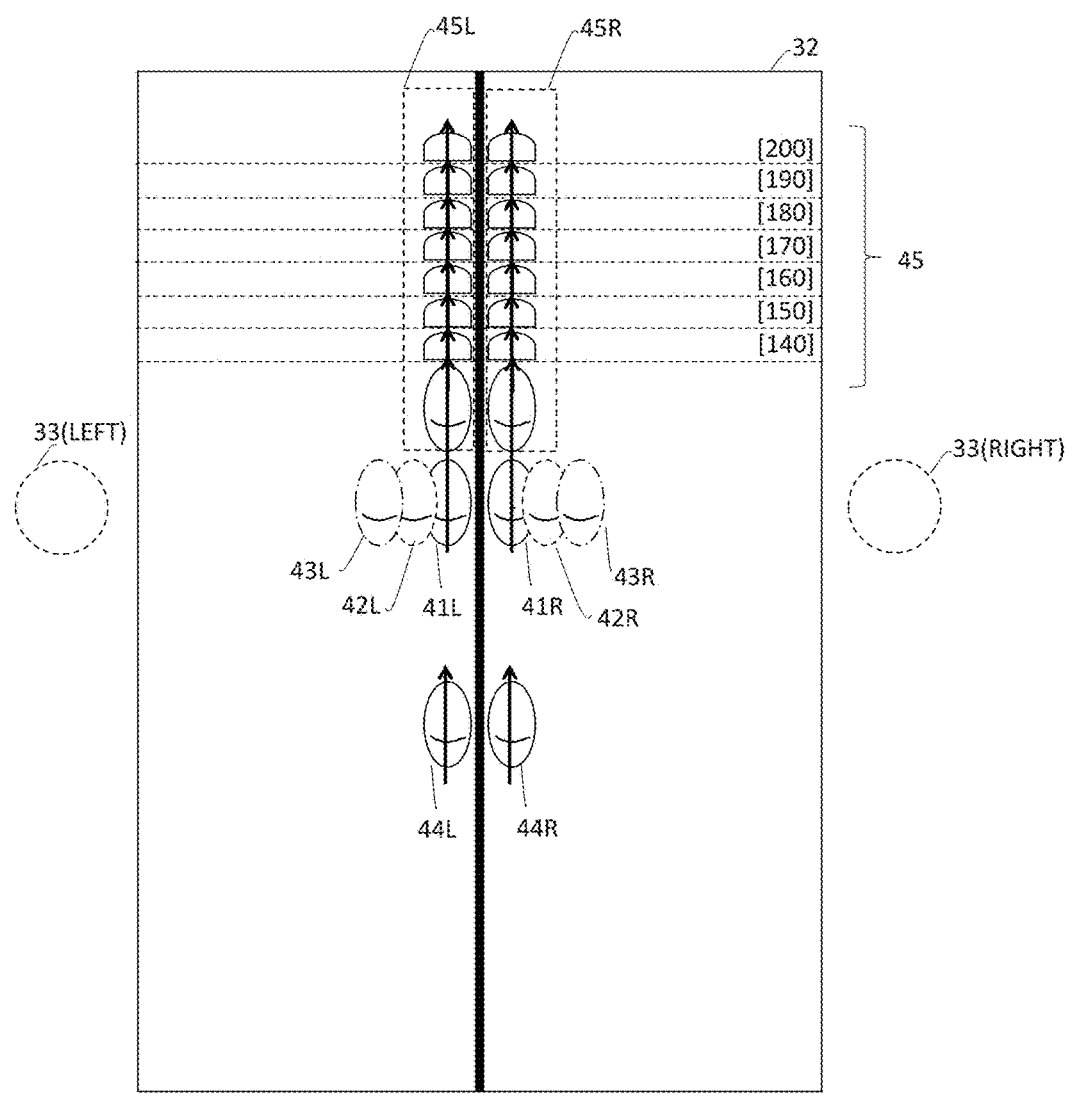
FIG. 6 is a diagram showing details of a mat 32.

FIG. 6 is a diagram showing details of the mat 32. As shown in the drawing, a plurality of marks is arranged which serves as targets on which the right and left feet of the user should be placed.

For example, at target positions for the feet of the user for a plurality of measurement items, a plurality of marks for the right foot, such as marks of a first home position 41R, a second home position 42R, and a third home position 43R, are indicated.

A plurality of marks for the left foot, such as marks of a first home position 41L, a second home position 42L, and a third home position 43L, are also indicated.

In the following description, the home positions 41R and 41L may be generically referred to as a home position 41 or the like. Similarly, the home positions 42R and 42L may be generically referred to as a home position 42, and the home positions 43R and 43L may be generically referred to as a home position 43.

For each measurement item (measurement item information 282), the distance between the left and right feet of the user is prescribed, and the terminal apparatus 10 guides the user to perform a predetermined body movement. For example, information on the relevant home positions may be provided by the audio guide associated with the measurement of the measurement item.

When performing a measurement of a measurement item, the terminal apparatus 10 determines whether or not the user is using the predetermined home positions based on the measurement result from the measurement apparatus 31. For example, when the terminal apparatus 10 discriminates the marks of the home positions on the mat 32 based on the sensing result from the measurement apparatus 31, the terminal apparatus 10 may be able to determine the marks on which the feet of the user are resting based on the detection result of the ankles or the like of the user. When performing a measurement of a measurement item, if the user puts his or her feet at different positions than the intended home positions, the user can be notified by an audio guide, a video guide or the like to put his or her feet at the proper positions.

As a measurement item, the terminal apparatus 10 includes that the terminal apparatus 10 measures, with the measurement unit 30, the movements of joints of the user making a movement of stepping a foot forward. With this measurement item, the terminal apparatus 10 can evaluate the balance of the body of the user making a movement of stepping a foot forward as a way of moving the body, for example.

The mat 32 includes a group of target marks 45R for the right foot for a case where a measurement item involves a movement of stepping a foot forward. The mat 32 also includes a group of target marks 45L for the left foot.

These groups of marks 45R and 45L may be generically referred to as a group of marks 45.

The group of marks 45 includes target marks for a plurality of step positions for users of different heights. In the example shown, marks are arranged in steps of 10 cm in the range of the height of the user from 140 cm to 200 cm. The mark has a shape similar to the toe part of the foot so that the user can easily recognize that the mark indicates the target position to which the user should step a foot forward. The user put his or her feet at the home positions 41R and 41L or marks 44R and 44L (which may be generically referred to as a mark 44) as initial positions, and then makes a movement of stepping his or her feet forward one by one to the target marks, which depend on his or her height. The terminal apparatus 10 measures, with the measurement unit 30, the movement of the body (movements of joints) of the user stepping his or her feet forward. When measuring the movement of the user stepping his or her feet forward, the terminal apparatus 10 may guide the user by specifying the home positions 41, 42 or 43 or the marks 44 as the initial foot positions according to the desired distance for which the user steps his or her feet forward.

In the example shown, the positions of the poles 33 are also shown. For example, the poles 33 (right and left poles) may be arranged in line with the home positions 41, 42, and 43. For example, the user makes a movement of twisting the upper limb and tries grasping the poles 33 with his or her feet kept at any of the home positions 41, 42 and 43.

As shown in the drawing, arrow marks may be arranged along with the group of marks 45R and 45L. In the example shown, the arrow marks are overlaid on the marks for different user heights of the group of marks 45R and 45L. This can remind the user to make a movement of stepping his or her feet forward and may be able to reduce the possibility that the user get confused about how to move his or her body for measurement when the user sees the mat 32.

As shown in the drawing, as for the size of the marks, since the marks are targets on which the user put his or her feet, the length of the marks in the longitudinal direction (the direction in which the user steps his or her feet forward) in the example shown may be on the order of a common foot size (approximately 22 cm to 28 cm). As for the shape of the marks, the marks may have the shape of a footstep or a shape similar to a footstep so that the user can easily recognize that the user should put his or her feet on the marks.

<4. Operation>

In the following, a measurement process in which the terminal apparatus 10 measures the movement of the body of the user will be described.

Figure 7:
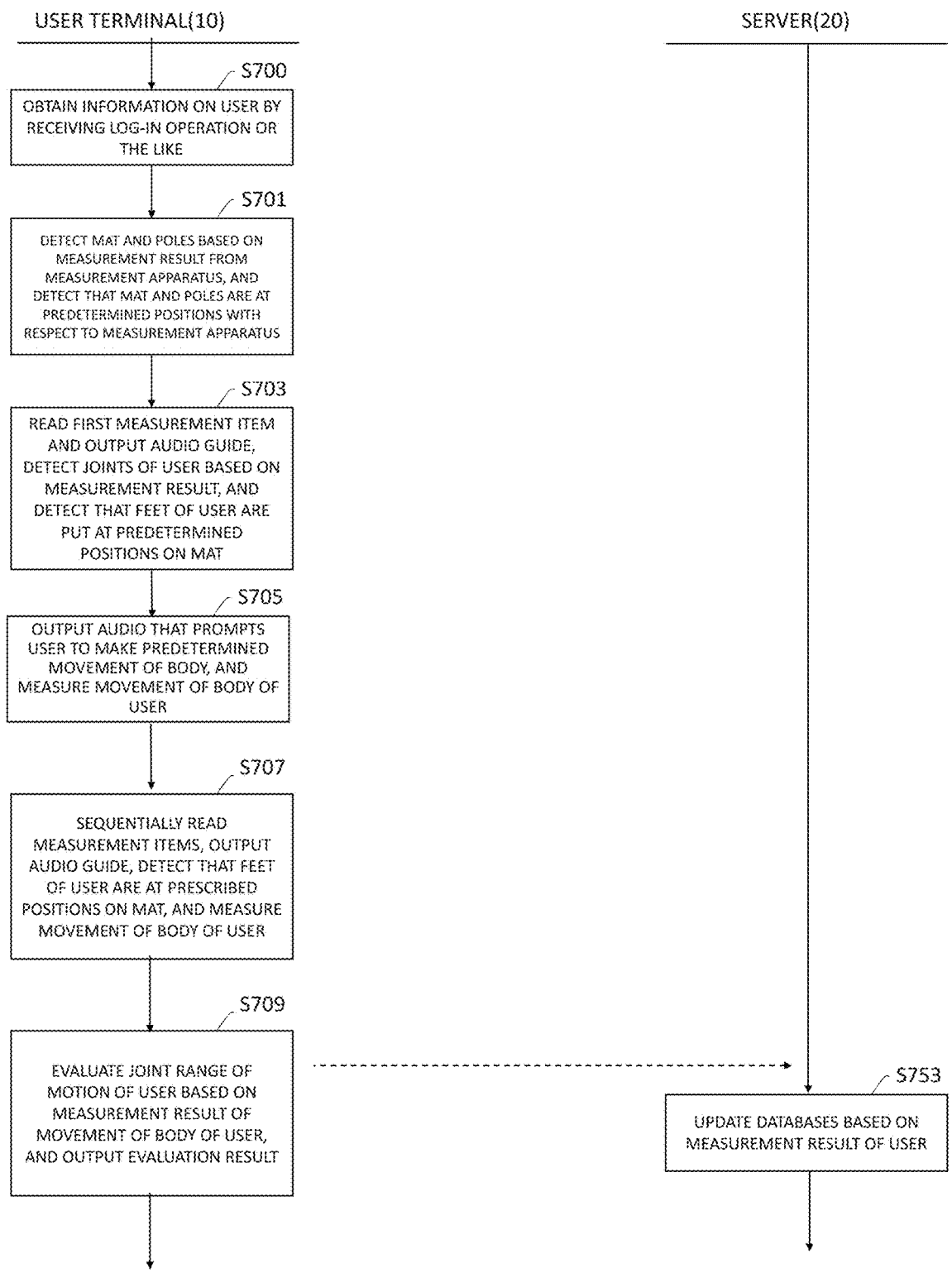
FIG. 7 is a flowchart showing a process in which the terminal apparatus 10 performs a ROM check and updates a measurement history.

FIG. 7 is a flowchart showing a process in which the terminal apparatus 10 performs a ROM check and updates a measurement history.

In step S700, the control unit 190 of the terminal apparatus 10 displays a log-in screen for a user who is going to perform measurements on the display 132, and receives a log-in operation from the user. For example, the terminal apparatus 10 authenticates the user and obtain information on the user by reading information from a recording medium, such as an IC card, of the user or reading a two-dimensional code displayed on a communication terminal of the user. For example, the terminal apparatus 10 communicates with the server 20 to obtain, as the information on the user, information on the height or the like of the user (user information database 281), a past measurement history (measurement history database 283), or information on another user registered as a friend of the user (friend list 284). The terminal apparatus 10 also obtains information on a measurement item (measurement item information 282) from the server 20, and stores the information as the measurement item information 182.

In step S701, the terminal apparatus 10 detects that the mat 32 and the poles 33 are installed in the measurement range of the measurement apparatus 31 based on the measurement result from the measurement apparatus 31. For example, the terminal apparatus 10 detects the mat 32 and the poles 33 through image recognition of a two-dimensional image obtained from the measurement result from the measurement apparatus 31. The terminal apparatus 10 detects that the mat 32 and the poles 33 are located at predetermined positions with respect to the measurement apparatus 31. That is, the terminal apparatus 10 detects that the mat 32 and the poles 33 are located at positions suitable for measurement, and the user is located at a position where the user can easily recognize the audio and video of the guide.

In step S703, the terminal apparatus 10 refers to the measurement item information 182 and performs processing of sequentially performing measurements of measurement items. The terminal apparatus 10 reads a first measurement item and outputs information serving as a guide for measurement in the form of audio or video (such as foot positions of the user on the mat 32). The terminal apparatus 10 detects joints of the user based on the measurement result from the measurement apparatus 31, and detects that the feet of the user are put at predetermined positions (prescribed positions for the measurement item).

In step S705, the terminal apparatus 10 outputs audio that prompts the user to make a predetermined movement of the body. The terminal apparatus 10 detects the movement of the body of the user with the measurement apparatus 31, thereby measuring the movement of the body of the user.

In step S707, the terminal apparatus 10 sequentially reads the measurement items from the measurement item information 182, outputs an audio guide, detects that the feet of the user are at the prescribed positions on the mat 32, and measures the movement of the body of the user.

In step S709, when the measurements of the measurement items are completed, the terminal apparatus 10 evaluates the joint range of motion of the user based on the measurement result of the movement of the body of the user. Specifically, the terminal apparatus 10 determines the positions of joints of the user based on the measurement result from the measurement apparatus 31, and evaluates the range of motion of the part of the body to be measured based on the time-series data on the positions of the joints (the movements of the positions of the joints that change with time). The terminal apparatus 10 outputs the evaluation result of the joint range of motion through the display 132 or the like, and transmits the evaluation result to the server 20.

In step S753, the server 20 receives the result of the ROM check of the user from the terminal apparatus 10, and updates the databases (the measurement history database 283 and the user information database 281) based on the measurement result of the user.

Next, processing performed by each apparatus when measuring the movement of the user stepping his or her feet forward as a measurement item will be described.

Figure 8:
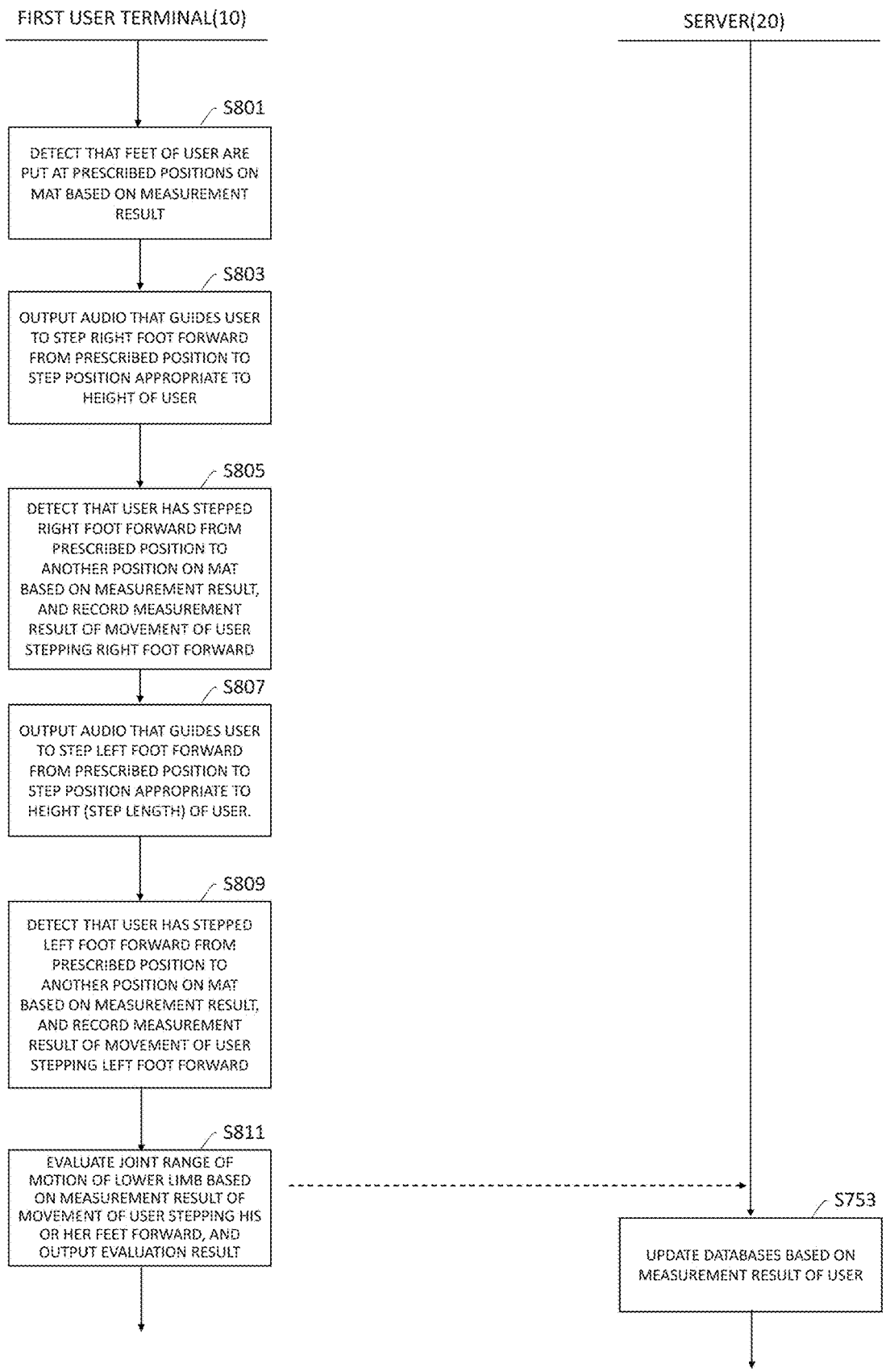
FIG. 8 is a flowchart showing a process in which the terminal apparatus 10 evaluates a joint range of motion by measuring the movement of the user stepping his or her feet forward.

FIG. 8 is a flowchart showing a process in which the terminal apparatus 10 evaluates the joint range of motion by measuring the movement of the user stepping his or her feet forward.

In step S801, the terminal apparatus 10 detects that the feet of the user are put at the prescribed positions (the item "foot positions on mat" in the measurement item information 282) on the mat 32 based on the measurement result from the measurement apparatus 31. If the feet of the user are not put at the prescribed positions, the terminal apparatus 10 may guide the user to put his or her feet at the prescribed positions.

In step S803, the terminal apparatus 10 outputs audio or video that guides the user to step the right foot from the prescribed position to the step position appropriate to the height of the user.

In step S805, the terminal apparatus 10 detects that the user has stepped the right foot from the prescribed position to another position on the mat based on the measurement result from the measurement apparatus 31, and records the measurement result of the movement of the user stepping the right foot forward. When the user has stepped the right foot to a different position than the target position, the terminal apparatus 10 may guide the user to step the right foot to the target position again, in order to redo the measurement.

In step S807, the terminal apparatus 10 outputs audio that guides the user to step the left foot from the prescribed position to the step position appropriate to the height (step length) of the user.

In step S809, the terminal apparatus 10 detects that the user has stepped the left foot from the prescribed position to another position on the mat based on the measurement result from the measurement apparatus 31, and records the measurement result of the movement of the user stepping the left foot forward.

In step S811, the terminal apparatus 10 evaluates the joint range of motion of the lower limb based on the measurement result of the movement of the user stepping his or her feet forward on the mat 32, outputs the evaluation result through the display 132 or the like, and transmits the evaluation result to the server 20.

Next, processing performed by each apparatus when measuring the movement of the user twisting the upper part of the body will be described.

Figure 9:
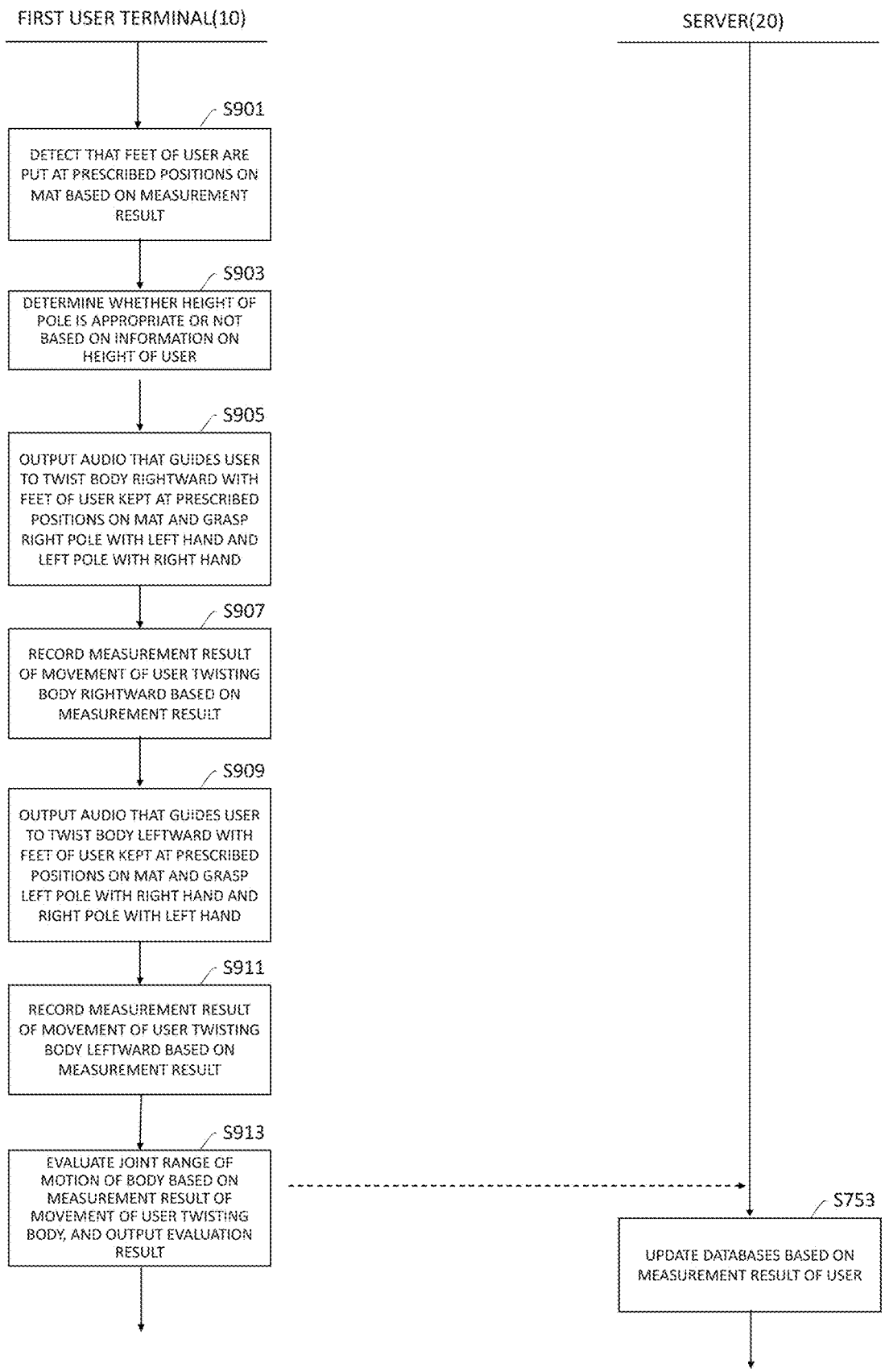
FIG. 9 is a flowchart showing a process in which the terminal apparatus 10 evaluates a joint range of motion by measuring the movement of the user twisting the upper part of the body.

FIG. 9 is a flowchart showing a process in which the terminal apparatus 10 evaluates the joint range of motion by measuring the movement of the user twisting the upper part of the body.

In step S901, the terminal apparatus detects that the feet of the user are put at the prescribed positions on the mat based on the measurement result from the measurement apparatus 31.

In step S903, the terminal apparatus 10 determines whether the height of the pole 33 is appropriate or not based on the information on the height of the user. For example, the terminal apparatus 10 stores information on the heights of users and information on the heights of the pole 33 in association with each other, and determines whether the height of the pole 33 detected from the measurement result from the measurement apparatus 31 is appropriate or not. For example, the appropriate height of the pole 33 may be prescribed depending on the position of the hand of the user standing upright. Here, the position of the hand of the user standing upright can vary with the height of the user. That is, the taller the user is, the higher the position of the hand of the user standing upright can be. The terminal apparatus 10 may detect the position (height from the ground) of the hand of the user in an upright posture based on the measurement result from the measurement apparatus 31, and determine the appropriate height of the pole 33 based on the position of the hand. That is, the height of the pole 33 can be adjusted according to the measurement result of the body of the user by the measurement apparatus 31.

For example, a first position where the pole 33 is in contact with the ground and a second position where the top of the pole 33 is located may be determined based on the measurement result from the measurement apparatus 31, and the height of the pole 33 may be determined based on information on the distances from the position of the measurement apparatus 31 to the first position and the second position concerning the pole 33. Alternatively, when the pole 33 is configured to be expandable, the pole 33 may have a mark indicating the height of the pole 33, and the terminal apparatus 10 may detect the mark indicating the height of the pole 33.

The terminal apparatus 10 may determine whether the position where the pole 33 is installed is appropriate or not. For example, the terminal apparatus 10 may detect a mark indicating a home position or the like on the pole 33 and determine whether the position of the pole 33 is appropriate or not based on the positional relationship between the position of the mark and the position where the pole 33 is in contact with the ground.

In step S905, the terminal apparatus 10 outputs audio or video that guides the user to twist the body rightward with the feet of the user kept at the prescribed positions on the mat and grasp the right pole (the pole 33 arranged on the right side) with the left hand and the left pole (the pole arranged on the left side) with the right hand.

In step S907, the terminal apparatus 10 records the measurement result of the movement of the user twisting the body rightward based on the measurement result from the measurement apparatus 31.

In step S909, the terminal apparatus 10 outputs audio that guides the user to twist the body leftward with the feet of the user kept at the prescribed positions on the mat and grasp the left pole with the right hand and the right pole with the left hand.

In step S911, the terminal apparatus 10 records the measurement result of the movement of the user twisting the body leftward based on the measurement result.

In step S913, the terminal apparatus 10 evaluates the joint ranges of motion of the body based on the measurement result of the movement of the user twisting the body, and outputs the evaluation result. In the evaluation of the joint range of motion, whether or not the user was able to grasp the poles by twisting the upper part of the body can be an evaluation item.

If the height of the poles 33 is set to be approximately equal to the height of the hands of the user standing upright as described above, the user who is making a movement of twisting the upper part of the body tries moving the arms and hands toward the poles 33 that can be seen while turning around. Therefore, the fluctuations of the movement of the user twisting the upper part of the body can be reduced, and time-series measurement result data can be easily compared once the terminal apparatus 10 has accumulated the measurement results.

<5. Example Screens>

FIGS. 10A, 10B, 10C and 10D are diagrams showing examples of details of notifications on the terminal apparatus 10 in a situation where the movement of the body of the user is measured.

Figure 10A:
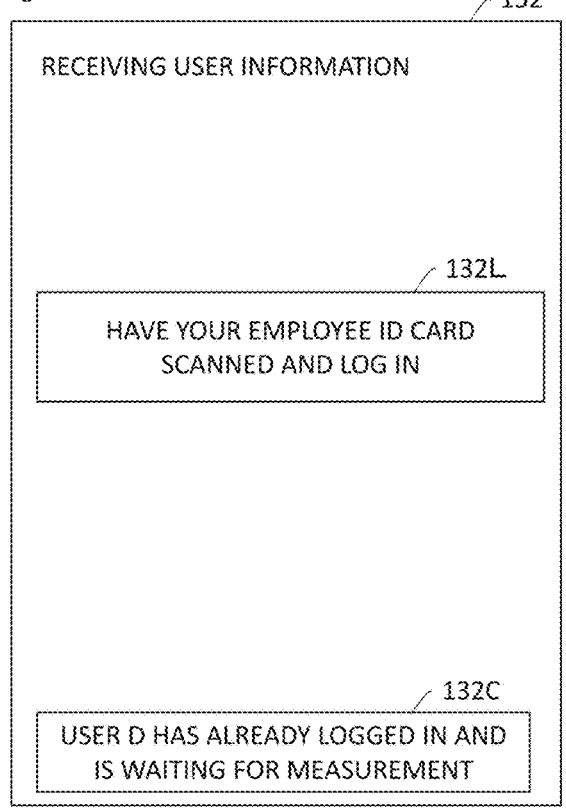
FIG. 10A is a diagram showing examples of details of notifications on the terminal apparatus 10 in a situation where the movement of the body of the user is measured.

The example screen in FIG. 10A relates to a situation where the terminal apparatus 10 receives a log-in operation for measurement from the user. This screen corresponds to the processing in step S700 in FIG. 7. For example, when the measurement unit 30 is installed in an office, a shop space or the like of a business company and is used by a plurality of users, each user is first authenticated.

As shown in FIG. 10A, the terminal apparatus 10 displays a notification part 132L on the display 132. The terminal apparatus 10 displays details of an operation for the user to log in in the notification part 132L. In the example shown, provided that the measurement unit 30 is installed in a business office, that the user can log in by having his or her employee ID card scanned is shown in the notification part 132L. The terminal apparatus 10 displays that another user is going to perform measurements at the same timing in a notification part 132C. When a plurality of measurement units 30 is installed, and a plurality of users performs measurements together, such as in the case of the example shown in FIG. 5, the terminal apparatus 10 displays the current progress of another user who is going to perform measurements in the notification part 132C. In the example in FIG. 10A, the terminal apparatus 10 displays, in the notification part 132C, that the other user who is going to perform measurements at the same timing has already completed the log-in processing.

Figure 10B:
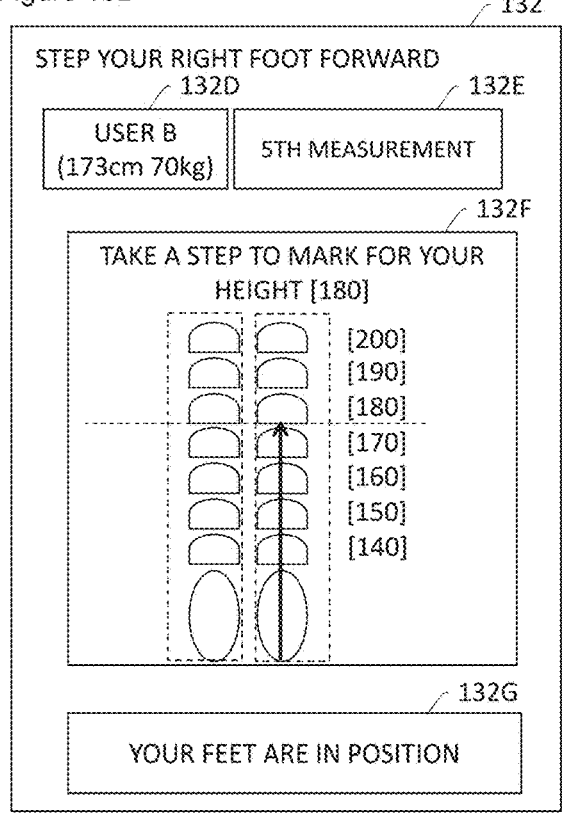
FIG. 10B is a diagram showing examples of details of notifications on the terminal apparatus 10 in a situation where the movement of the body of the user is measured.

The example screen in FIG. 10B relates to a situation where the terminal apparatus 10 measures the movement of the user stepping a foot forward. This screen corresponds to steps S801 to S811 in FIG. 8.

As shown in FIG. 10B, the terminal apparatus 10 displays a notification part 132D, a notification part 132E, a guide output part 132F, and a detection result display part 132G on the display 132.

In the notification part 132D, the terminal apparatus 10 displays information on the user who has logged in (that is, the user performing measurements). This allows the user to easily check that the user performing measurements is not misidentified as another user.

In the notification part 132E, the terminal apparatus 10 displays a history of measurements of the user. Although in the example shown, the number of times of measurements performed in the past by the user with the measurement unit 30 is displayed, the evaluation result of a past measurement may be displayed, for example. This allows the user to easily check that the user has continuously performed measurements, and can motivate the user to continue measurements.

In the guide output part 132F, the terminal apparatus 10 notifies, through video and audio, the user of information on the target marks for the step positions appropriate to the height of the user. This allows the user to easily imagine stepping a foot toward the target mark and easily make the movement to be measured.

In the detection result display part 132G, the terminal apparatus 10 displays a detection result from the measurement apparatus 31. For example, in the detection result display part 132G, the terminal apparatus 10 displays information that the feet of the user are at the prescribed positions for measurement (the feet are put at the home positions). This allows the user to easily recognize that the user is properly following the procedure for measurement, and perform measurements with peace of mind that no measurement error will occur.

Figure 10C:
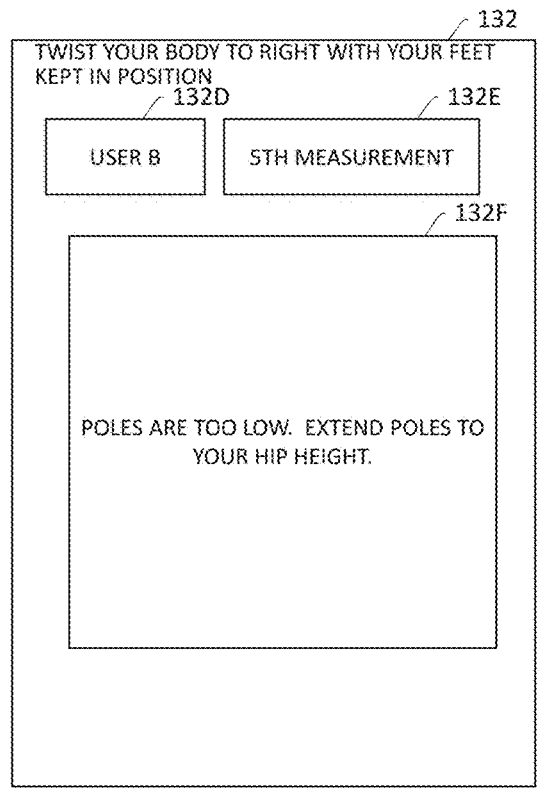
FIG. 10C is a diagram showing examples of details of notifications on the terminal apparatus 10 in a situation where the movement of the body of the user is measured.

The example screen in FIG. 10C relates to a situation where the terminal apparatus 10 measures the movement of the user twisting the upper part of the body.

In the example screen in FIG. 10C, the terminal apparatus 10 has detected that the height of the poles 33 is not appropriate, and is prompting the user to expand the poles 33 to a predetermined height through the display in the guide output part 132F. This screen corresponds to the processing in step S903 in FIG. 9.

Figure 10D:
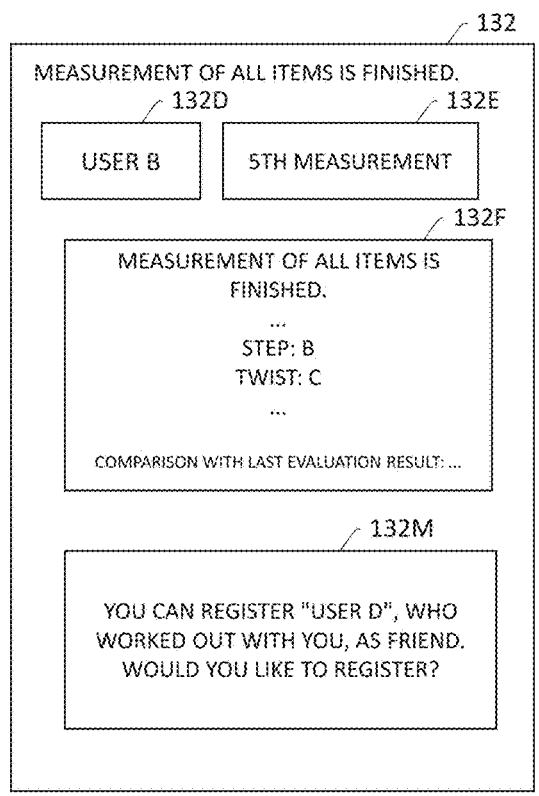
FIG. 10D is a diagram showing examples of details of notifications on the terminal apparatus 10 in a situation where the movement of the body of the user is measured.

The example screen in FIG. 10D relates to a situation where the terminal apparatus 10 notifies the user that the measurements are completed and the evaluation result based on the measurement result and prompts the user to register another user as a friend.

In the example screen in FIG. 10D, the terminal apparatus 10 displays, in the guide output part 132F, that the measurements of all of a plurality of measurement items are completed and a result of evaluation of the movements of the body of the user for the measurement items. The terminal apparatus 10 refers to the history of past measurements of the user and displays a result of comparison with the past measurement result (such as that a joint range of motion has changed compared with the previous measurement) in the guide output part 132F.

Through the display in a notification part 132M, the terminal apparatus 10 prompts the user to register another user as a friend and shows a reason why the other user is recommended as a friend candidate (such as that the user has performed measurements at the same place).

Brief Summary (1) As described above, according to this embodiment, when performing the ROM check, no special physical measurement instrument, such as an angle gauge, need to be applied to the body of the user, so that the user can easily perform measurements by himself or herself by following the guide of the terminal apparatus 10. In addition, by performing measurements according to measurement items, the joint ranges of motion of the lower part and the upper part of the body of the user can be evaluated.

(2) When measuring the movement of the body of the user, the mat 32 and the poles 33 can be used to allow the user to recognize targets of the movement of the body of the user. Therefore, the form of the movement of the body of the user is stabilized, so that measurement results can be accumulated for comparison, and the user can easily check changes of the movement of the body. For example, by using the mat 32, (i) the way of striding, such as the step length of the user stepping a foot forward or the range of movement, can be prescribed, and the user can be prompted to make a prescribed movement for the measurement. When continuously measuring a movement of the body of the user, the comparison of the measurement results at different times can be made easier by prescribing the movement of the user to be measured. That is, by prescribing the movement of the body of the user, the evaluation of how the movement of the body of the user has changed can be made easier. In addition, by using the mat 32, (ii) the foot positions of the user with respect to the measurement apparatus 31 can be prescribed. The terminal apparatus 10 can determine whether or not the mat 32 is arranged at a predetermined position with respect to the measurement apparatus 31 based on the measurement result from the measurement apparatus 31. When measuring the movement of the body of the user on the mat 32, the foot positions of the user are prescribed by marks on the mat 32. As a result, the movement of the body of the user can be made more likely to fall within the measurement range of the measurement apparatus 31. For example, even if the user makes a movement of stretching an arm straight up or to the side, the movement of the body of the user can be prevented from going out of the measurement range of the measurement apparatus 31 if the mat 32 is arranged in advance at a predetermined position with respect to the measurement apparatus 31. In addition, by using the mat 32, (iii) when making the user make a particular movement, measurements can be started after the user has taken a proper posture. For example, the foot positions of the user can be prescribed by home positions, and when making the user make a predetermined movement (such as a movement of squatting down or a movement of raising one foot), measurements can be started from a posture (with a predetermined distance between the feet, for example) suitable for measurement.

These allow the flexibility of joints of the whole body of the user to be easily evaluated.

(3) Furthermore, in the first embodiment, the terminal apparatus 10 may propose an exercise suitable for the user based on the measurement result (such as the result of the ROM check) of the movement of the body of the user. For example, suppose that the terminal apparatus 10 retains exercise regimens (the training item information 185 or 285) in association with the classification result of the evaluation result of the ROM check (the measurement history information 183 or the measurement history database 283). That is, the terminal apparatus 10 retains, in advance, information on training regimens to be proposed in association with the measurement result of the movement of the body of the user or the evaluation result thereof. The terminal apparatus 10 may refer to the measurement history database 283 to determine an exercise regimen to be proposed to the user based on the result of the measurement, such as the ROM check, of the movement of the body of the user or the evaluation result thereof, and present the determined exercise regimen to the user by displaying the exercise regimen on the display 132, for example. For example, the joint ranges of motion of the user can be evaluated based on the result of the ROM check. In the training item information 285 in the server 20, a joint range of motion required for the user to perform an exercise may be prescribed in advance. For example, when the result of the ROM check shows that the range of motion of the hip joint of the user is smaller than a certain value (when the hit joint is stiff), a predetermined training item may be omitted from the exercise proposed to the user (the terminal apparatus 10 may be inhibited from performing processing of displaying the video relating to the training item). Furthermore, an exercise regimen appropriate to the evaluation result of joints of the body of the user may be provided to the user based on the result of the ROM check.

The terminal apparatus 10 measures the movement of the body of the user performing the training indicated by the training item, and determines whether or not the user was able to move his or her body as prescribed for the training. It can be expected that as a result of the user continuing the exercise, the muscle strength of the parts of the body required for keeping a good walking posture will be gradually improved, and the user will become able to make the movement required for the exercise. Then, the terminal apparatus 10 may determine that the user has accomplished the exercise regimen and present another exercise regimen to the user.

Furthermore, an exercise regimen may be proposed to the user based on the history of exercise regimens conducted by another user who is similar to the user in evaluation result of the measurement result of the movement of the body.

(4) In the above description of the first embodiment, an example has been described in which the movement of the body of the user is measured and evaluated with the measurement apparatus 31, the mat 32, and the poles 33 installed in the real world.

As an alternative, an object corresponding to the mat 32 and objects corresponding to the poles 33 may be arranged in a virtual space to measure the movement of the body of the user. For example, the user watches the display 132 or wears a head-mounted display (HMD). The terminal apparatus 10 displays an image of the field of view that depends on the settings of a virtual camera in the virtual space on the display 132 or the HMD. Motion sensors are attached to parts (such as the head, the shoulder, the elbows, the hands, the hips, the knees, and the feet) of the body of the user, and the terminal apparatus 10 tracks the movement of the body of the user. The user moves his or her body while watching the objects arranged in the virtual space. In this way, the movement of the body of the user can be measured and evaluated without the mat 32 and the poles 33 arranged in the real world.

As an alternative to the mat 32 and the poles 33 arranged in the real world, an image corresponding to the mat 32 may be projected onto the floor surface or the like, and images (such as stereoscopic images) corresponding to the poles 33 may be displayed in the real world. For example, in the real world, light may be emitted from a laser, a projector or the like to display a virtual mat 32 and virtual poles 33 that can be visually recognized by the user.

Second Embodiment

The measurement system 1 according to a second embodiment will be described. In the second embodiment described below, the movement of the user walking is measured to evaluate the walking posture and assist the user to acquire a way of walking in a good functional posture based on the evaluation.

Figure 11:
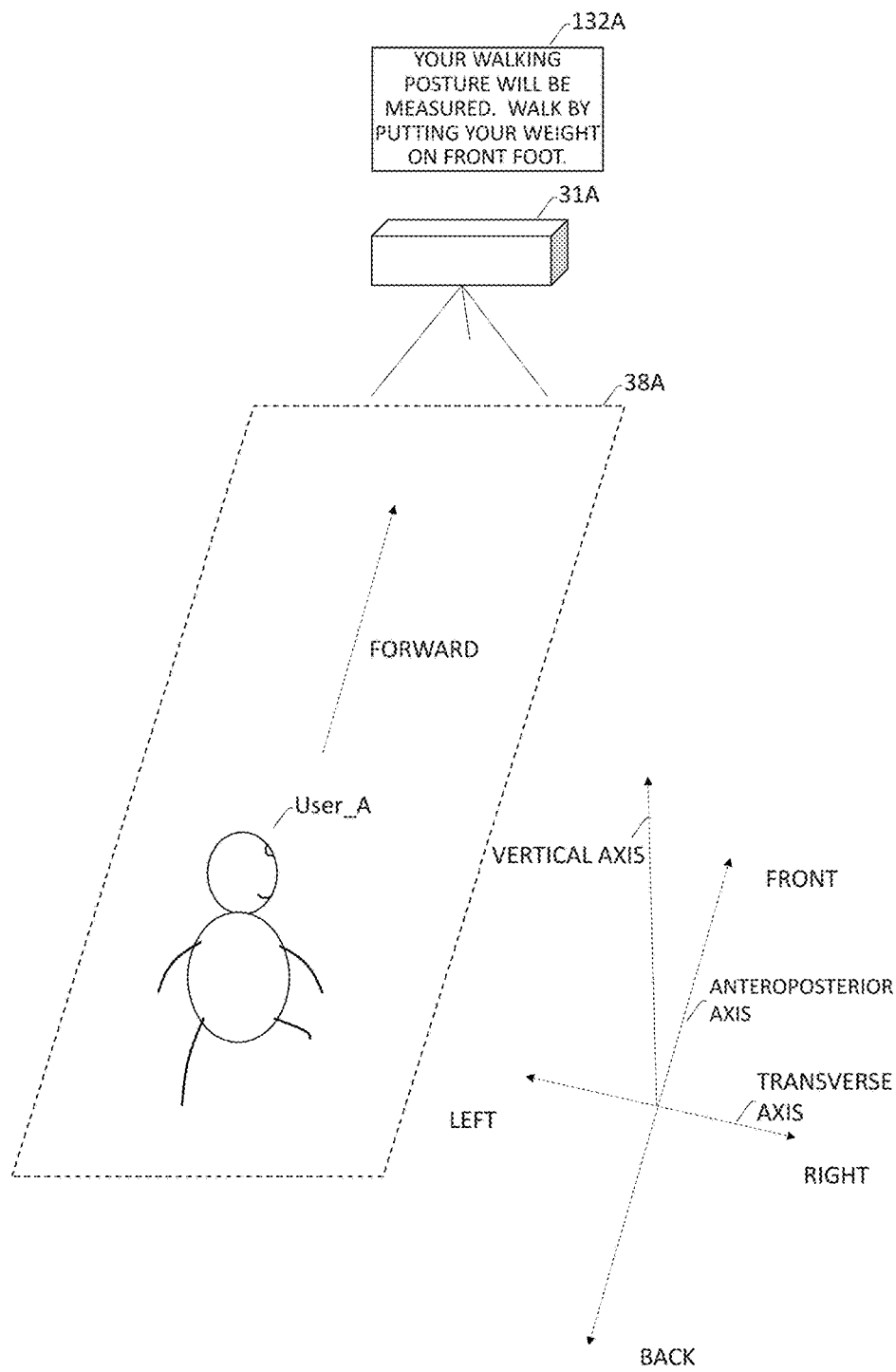
FIG. 11 shows a situation where the measurement system 1 according to a second embodiment measures the movement of the user walking.

FIG. 11 shows a situation where the measurement system 1 according to the second embodiment measures the movement of the user walking.

1. Overview

The measurement apparatus 31A measures a movement of the first user User_A walking from a predetermined position to the measurement apparatus 31A in the detection range 38A. The terminal apparatus 10A notifies the first user User_A that the walking movement of the user is to be measured and of a way of moving the body of the user while walking through the display 132A. As shown in the drawing, through the notification, the terminal apparatus 10A prompts the user to walk by putting his or her weight on his or her front foot in the waking movement.

In the example in FIG. 11, coordinate axes are defined as follows. That is, the direction of walking with respect to the position of the first user User_A is a "forward direction", the direction opposite to the direction of walking is a "rearward direction", and the axis defined by the direction of walking is an "anteroposterior axis". On the surface which the feet touch during walking, the direction perpendicular to the direction of walking with respect to the position of the first user User_A is a "transverse axis", the direction toward the right half of the body of the user is a "rightward direction", and the direction toward the left half of the body of the user is a "leftward direction". The axis extending from the feet to the parietal along the trunk of the first user User_A is a "vertical axis".

Through the display 132A, the terminal apparatus 10A notifies the first user User_A to walk from a starting point at a predetermined distance from the position of the measurement apparatus 31A toward the measurement apparatus 31A. Here, the starting point where the first user User_A starts the walking movement is a position at a distance of several meters or so from the measurement apparatus 31A, for example, and may be set at a position that allows the first user User_A to repeat a plurality of walking cycles (provided that one cycle includes an operation of stepping the right foot forward and an operation of stepping the left foot forward). The measurement apparatus 31A can measure a plurality of walking cycles of the first user User_A. If the first user User_A is not at the starting point when the measurement apparatus 31A starts measuring the walking movement of the user, the terminal apparatus 10A may prompt the first user User_A to move to the starting point through a notification on the display 132A or the like. In response to the first user User_A being at the starting point, the terminal apparatus 10A may notify the first user that measurements of the walking movement will be started (or may prompt the first user User_A to start the walking movement through a notification).

Figure 12:
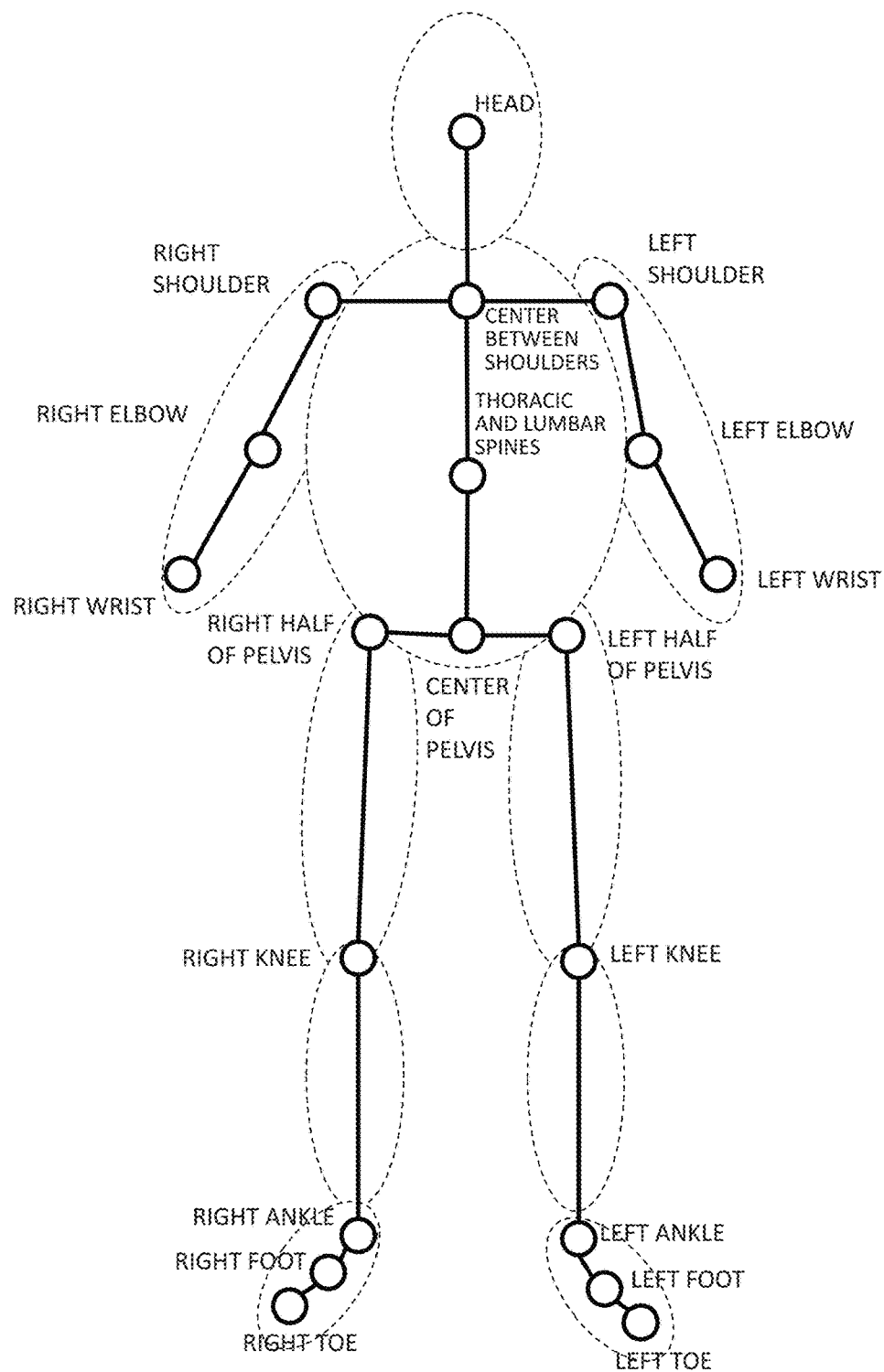
FIG. 12 shows parts of the body of the user identified by the terminal apparatus 10 based on the measurement result from a measurement apparatus 31.

FIG. 12 shows parts of the body of the user identified by the terminal apparatus 10 based on the measurement result from the measurement apparatus 31. As feature points of the body of the user, the terminal apparatus 10 identifies joints of the four limbs, the head, the shoulders, the trunk, the pelvis, the feet, the heels, the toes, ribs, and the anterior superior iliac spines, for example. The terminal apparatus 10 identifies thoracic vertebrae (as the center of the trunk) and the center of the pelvic, for example. For example, the terminal apparatus 10 may prompt the user to make a predetermined pose (such as a pose with the arms thrusted sidewards to form a T shape or a pose with the arms stuck to the trunk), and locate the positions of joints of the user in the measurement result from the measurement apparatus 31 based on the measurement result of the predetermined pose from the measurement apparatus 31.

2. Data Structure

FIG. 13 is a diagram showing data structures of measurement result database 287 and evaluation result database 288 stored in the server 20 according to the second embodiment.

The measurement result database 287 is a database that retains a measurement result of a movement (such as a walking movement or a movement of maintaining the balance of the trunk) of the body of a user measured by the measurement apparatus 31.

each record of the measurement result database 287 includes an item "measurement data ID", an item "date and time", an item "user ID", an item "elapsed time from start of measurement", and an item "measurement data".

The item "measurement data ID" indicates information for identifying measurement data obtained by the measurement apparatus 31. In the second embodiment, the terminal apparatus 10 starts and ends measurements of the movement of the body of the user (such as measurements of the walking cycle), and retains information for identifying each piece of measurement data in association with the measurement data in the server 20.

The item "date and time" indicates the date and time at which the measurement apparatus 31 measured the movement of the body of the user.

The item "user ID" is information for identifying the user the movement of the body of whom is measured by the measurement apparatus 31.

The item "elapsed time from start of measurement" indicates the elapsed time since the measurement of the movement of the body of the user by the measurement apparatus 31 is started.

The item "measurement data" indicates the position of each part (such as the head, the shoulders, and so on) of the body of the user described above with reference to FIG. 12 at the timing indicated by the item "elapsed time from start of measurement". For example, in the item "measurement data", a measurement result of the distance from the position of the measurement apparatus 31 to each part of the body of the user in a coordinate system with respect to the position of the measurement apparatus 31 may be retained.

The evaluation result database 288 is a database that retains an evaluation result of the movement (such as the walking movement) of the body of the user based on the measurement result (measurement result database 287) from the measurement apparatus 31.

Each record of the evaluation result database 288 includes an item "evaluation result ID", an item "measurement data ID", an item "subject of measurement", and an item "evaluation result".

The item "evaluation result ID" is information for identifying an evaluation result of the measurement result of the movement of the body of the user from the measurement apparatus 31.

The item "measurement data ID" is information for identifying a measurement result (measurement result database 287) from the measurement apparatus 31 that is to be evaluated.

The item "subject of measurement" indicates a detail of the movement of the body of the user that is to be measured. For example, the subject of measurement may be the posture of the user in the walking movement or the balance of the trunk of the user.

The item "evaluation result" indicates an evaluation result of the movement of the body of the user based on the measurement result from the measurement apparatus 31. For example, when evaluating the posture of the user in the walking movement, the subject of evaluation may be "a stepping forward of a foot of the user", "whether the user is properly shifting his or her weight onto the front foot", or "whether the user has completely put his or her weight on the front foot", for example. Details will be described later. When evaluating the balance of the trunk of the user, the subject of evaluation may be "whether the positions of the shoulders, the hips, or the feet are misaligned", for example. Details will be described later.

3. Operation

In the following, a process in which the terminal apparatus 10 measures the movement of the body of the user and performs an evaluation based on the measurement result in the second embodiment will be described.

Figure 14:
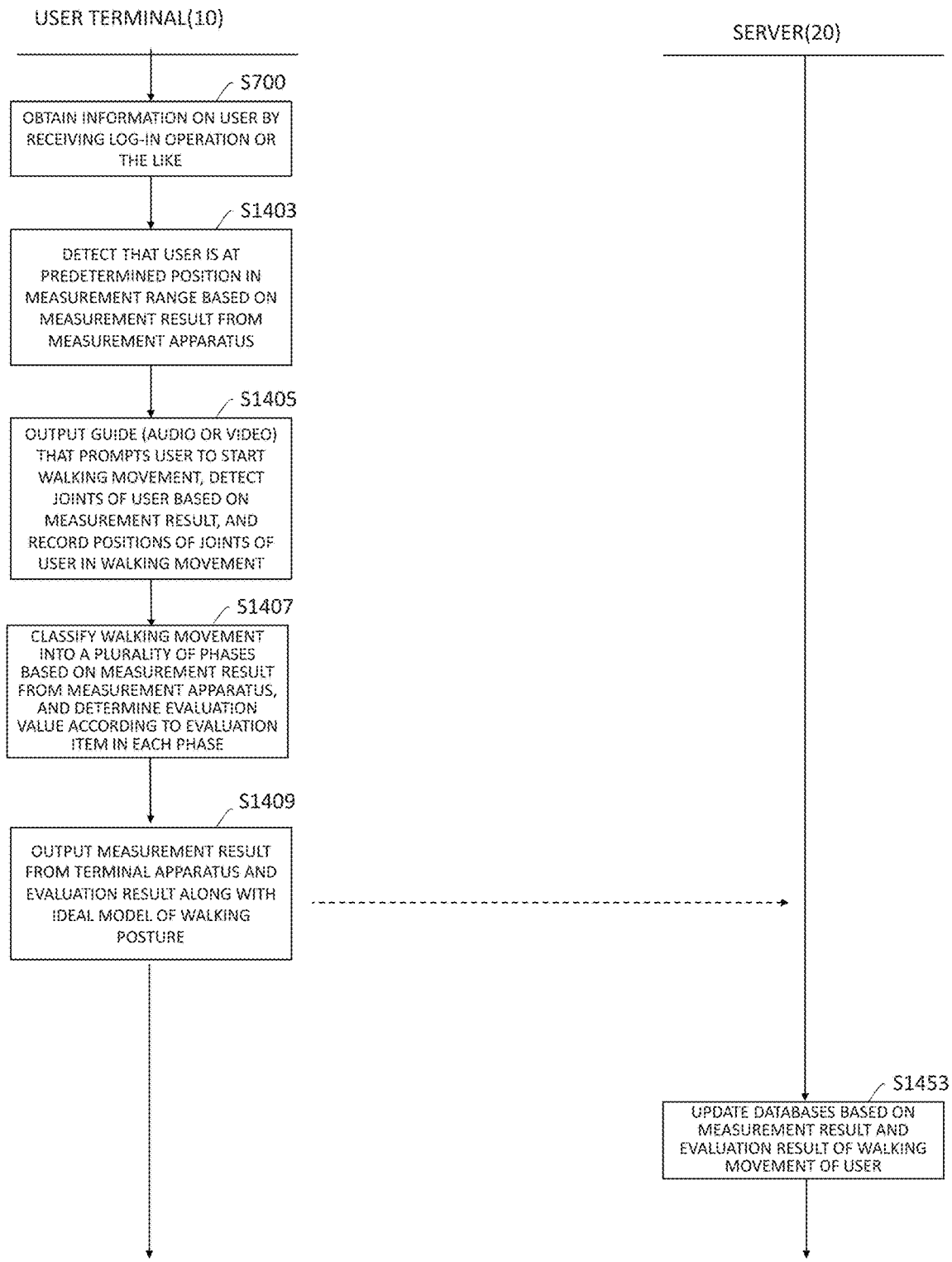
FIG. 14 is a flowchart showing a process in which the terminal apparatus 10 measures and evaluates a walking movement of the user in the second embodiment.

FIG. 14 is a flowchart showing a process in which the terminal apparatus 10 measures and evaluates the walking movement of the user in the second embodiment.

In step S1403, the terminal apparatus 10 detects that the user is at a predetermined position in the measurement range of the measurement apparatus 31 based on the measurement result from the measurement apparatus 31.

In step S1405, the terminal apparatus 10 outputs a guide (audio or video) that prompts the user to start the walking movement. The terminal apparatus 10 detects joints of the user based on the measurement result from the measurement apparatus 31, and records the positions of the joints of the user in the walking movement.

In step S1407, the terminal apparatus 10 classifies a cycle of the walking movement of the user into a plurality of phases based on the measurement result from the measurement apparatus 31. The terminal apparatus 10 determines an evaluation value for the walking movement according to an evaluation item in each phase of the walking movement of the user.

In step S1409, the terminal apparatus 10 outputs the measurement result from the measurement apparatus 31 and the evaluation result of the walking movement through the display 132 or the like along with an ideal model of the walking posture. The terminal apparatus 10 transmits the measurement result and the evaluation result to the server 20.

In step S1453, the server 20 updates the measurement result database 287 and the evaluation result database 288 based on the measurement result and the evaluation result of the walking movement of the user.

4. Example Outputs of Measurement Result and Evaluation Result

Figure 15A:
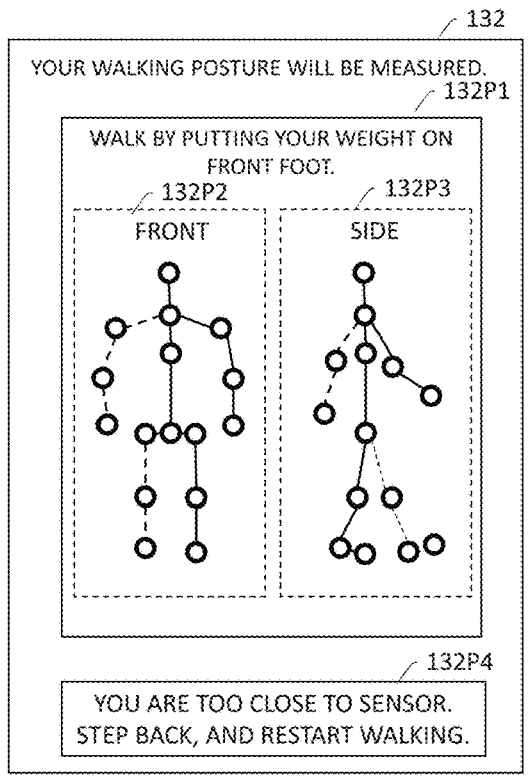
FIG. 15A is a diagram showing example outputs in a case where the terminal apparatus 10 outputs a measurement result of the walking movement of the user and an evaluation result of the walking movement of the user based on the measurement result in the second embodiment.
Figure 15B:
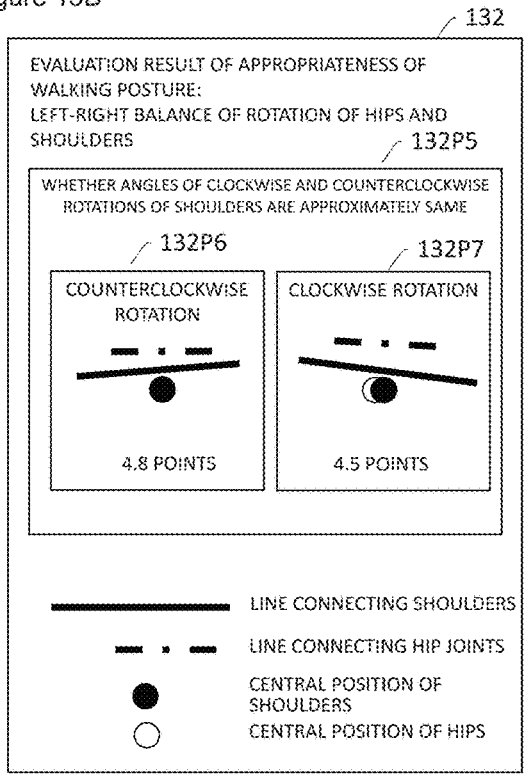
FIG. 15B is a diagram showing example outputs in a case where the terminal apparatus 10 outputs a measurement result of the walking movement of the user and an evaluation result of the walking movement of the user based on the measurement result in the second embodiment.
Figure 15C:
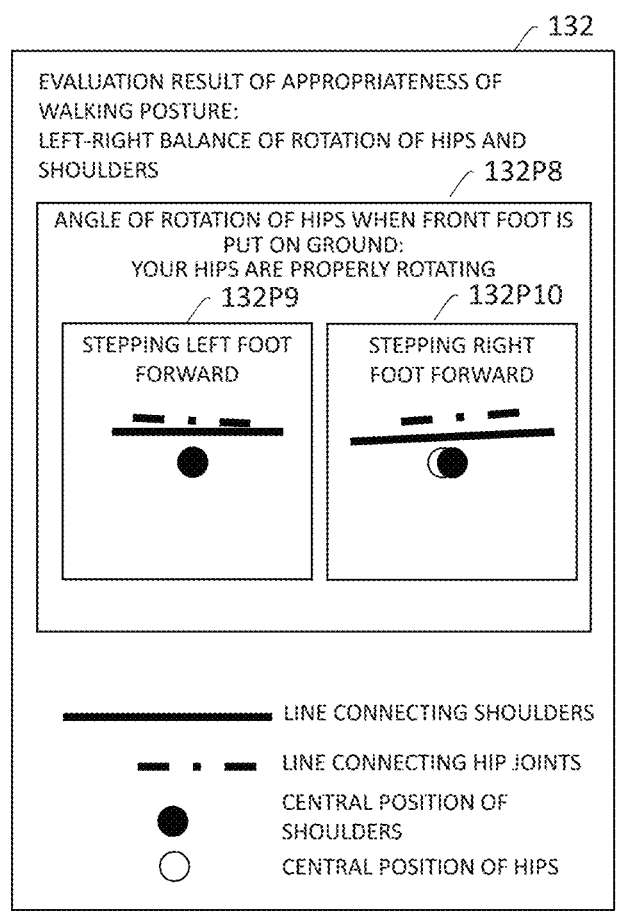
FIG. 15C is a diagram showing example outputs in a case where the terminal apparatus 10 outputs a measurement result of the walking movement of the user and an evaluation result of the walking movement of the user based on the measurement result in the second embodiment.

FIGS. 15A, 15B, and 15C are diagrams showing example outputs in the case where the terminal apparatus 10 outputs a measurement result of the walking movement of the user and an evaluation result of the walking movement of the user based on the measurement result in the second embodiment. In the examples shown, the terminal apparatus 10 displays the measurement result and the evaluation result on the display 132. However, the terminal apparatus 10 may output the measurement result and the evaluation result by printing the results on a paper medium or the like with a printer or the like.

FIG. 15A relates to a situation where the terminal apparatus 10 prompts the user to walk a predetermined number of steps (such as several meters or so) toward the measurement apparatus 31 in order to measure the walking movement of the user. This situation corresponds to the processing in steps S1403 and S1405.

When the user starts the walking movement, the terminal apparatus 10 displays a "notification to prompt the user to walk by putting his or her weight on the front foot" in a display part 132P1 on the display 132. In display parts 132P2 and 132P3, the terminal apparatus 10 displays images indicating the located positions of parts of the body of the user (the parts of the body illustrated in FIG. 12) as measurement results from the measurement apparatus 31. The terminal apparatus 10 displays the measurement result of the body of the user in a more visually intuitive manner for the user by connecting the parts of the body of the user by lines. In the example in FIG. 15A, the parts of the right half of the body of the user are connected by dotted lines, and the parts of the left half are connected by solid lines. This allows the user to easily discriminate between the movements of the right half of the body of the user and the movements of the left half of the body of the user in the measurement result from the measurement apparatus 31.

In the display part 132P2, the terminal apparatus 10 displays a result of location of the parts of the user viewed from the front of the user (along the anteroposterior axis shown in FIG. 11) based on the measurement result from the measurement apparatus 31 as required.

In the display part 132P3, the terminal apparatus 10 displays a result of location of the parts of the user viewed from the side of the user (along the transverse axis shown in FIG. 11) based on the measurement result from the measurement apparatus 31 as required. That is, the terminal apparatus 10 displays measurement results from the measurement apparatus 31 in the display parts 132P2 and 132P3 in real time. Therefore, the user can obtain feedback of the measurement result of the movement of the body of himself or herself in real time.

The terminal apparatus 10 notifies the user to perform the walking movement so as to come closer to the measurement apparatus 31. Here, the terminal apparatus 10 may display the measurement result in the display parts 132P2 and 132P3 as if the movement of the body of the user is measured at a position at a predetermined distance from the body of the user. For example, the terminal apparatus 10 creates a three-dimensional virtual space and arranges objects corresponding to the positions of the parts of the body of the user in the three-dimensional virtual space based on the measurement result from the measurement apparatus 31 (that is, the distances from the position of the measurement apparatus 31 to the positions of the parts of the first user User_A). For example, the terminal apparatus 10 determines the coordinates corresponding to the measurement apparatus 31 in the three-dimensional virtual space, and arranges the object corresponding to each part at coordinates corresponding to the position of the part with respect to the coordinates corresponding to the measurement apparatus 31 based on the measurement result from the measurement apparatus 31. The terminal apparatus 10 retains information on the positions of the objects corresponding to the parts in the three-dimensional virtual space in association with the elapsed time during the measurement by the measurement apparatus 31. This means that the walking movement of the user can be reproduced as trajectories of the parts of the body of the user by reproducing the trajectories of the movements of the objects corresponding to the positions of the parts of the body of the user in the three-dimensional virtual space. The terminal apparatus 10 may set a virtual camera at coordinates in a certain positional relationship to the group of objects corresponding to the positions of the parts of the user (such as a position at a certain distance from a "center between the shoulders" along the anteroposterior axis or a position at a certain distance from the thoracic and lumbar spines along the transverse axis), and move the virtual camera in association with the movements of the objects corresponding to the positions of the parts.

In a display part 132P4, the terminal apparatus 10 notifies of information for properly performing the measurement by the measurement apparatus 31. This corresponds to step S1403 in FIG. 14. For example, when the measurement apparatus 31 measures the walking movement of the user, the terminal apparatus 10 determines whether the position where the user will start walking is at a predetermined position or not and makes a notification to prompt the user to start walking from the predetermined position. As shown in the drawing, when the position where the user will start walking is too close to the measurement apparatus 31, the terminal apparatus 10 makes a notification to prompt the user to start the walking movement from a more rearward position.

FIG. 15B relates to situation where the terminal apparatus 10 outputs a measurement result and an evaluation result of a phase of the plurality of phases of the walking movement of the user. This corresponds to the processing in step S1409.

In FIG. 15B and FIG. 15C, the measurement result of the body of the user is displayed with respect to the vertical axis. As a result, the way of rotation of the body of the user with respect to the vertical axis can be presented to the user.

On the display 132, the terminal apparatus 10 outputs evaluation results of the balance of the rotation of the shoulders and the balance of the rotation of the hips in the walking movement as an evaluation result of the appropriateness of the walking posture of the user. The terminal apparatus 10 divides the walking movement into a plurality of phases, and outputs an evaluation result of the balance of the rotation of the shoulders, the balance of the rotation of the hips or the like for each phase. By presenting measurement results and evaluation results for a plurality of phases of the walking movement to the user in this way, a suggestion that improves the appropriateness of the walking movement of the user can be provided.

In a display part 132P5, the terminal apparatus 10 displays an angle of rotation of the shoulders for each of the counterclockwise rotation and the clockwise rotation in the cycle of the walking movement (provided that one cycle includes an operation of stepping the right foot forward and an operation of stepping the left foot forward).

In a display part 132P6, the terminal apparatus 10 displays a "line connecting the shoulders" defined by the positions of the right shoulder and the left shoulder, a "line connecting the hip joints" defined by the positions of the hip joints, a "central position between the shoulders" that is the center between the position of the right shoulder and the position of the left shoulder, and a "central position of the hips" defined by the positions of the hip joints (such as the positions of the right and left halves of the pelvis). In one cycle of the walking movement, the terminal apparatus 10 evaluates the degree of the counterclockwise rotation of the shoulders (to what extent the shoulders have rotated) about the vertical axis based on the position of the left shoulder (or the positions of both the shoulders) and the positions of the hip joints at the time when the user has stepped the left foot forward. For example, the terminal apparatus 10 draws the "line connecting the shoulders" based on the amount of the counterclockwise rotation of the shoulders with respect to the position of the hips in one cycle. In the display part 132P6, the terminal apparatus 10 displays a score ("4.8 points") as the evaluation result.

In a display part 132P7, the terminal apparatus 10 displays the "line connecting the shoulders", the "line connecting the hip joints", the "central position between the shoulders", and the "central position of the hips". In one cycle of the walking movement, the terminal apparatus 10 evaluates the degree of the clockwise rotation of the shoulders about the vertical axis based on the position of the right shoulder (or the positions of both the shoulders) and the positions of the hip joints at the time when the user has stepped the right foot forward. The terminal apparatus 10 draws the "line connecting the shoulders" based on the amount of the clockwise rotation of the shoulders with respect to the position of the hips in one cycle. In the display part 132P7, the terminal apparatus 10 displays a score ("4.5 points") as the evaluation result, and the score is lower than the score for the counterclockwise rotation.

In the display parts 132P6 and 132P7, the terminal apparatus 10 displays the "central position between the shoulders" and the "central position of the hips" in the movement of stepping the left foot forward and the movement of stepping the right foot forward in one cycle of the walking movement. This allows the user to recognize the way in which the upper part of the body is inclined with respect to the position of the hips in the walking movement. For example, the user can recognize the degree of fluctuation of the upper part of the body with respect to the transverse axis or the degree of fluctuation of the upper part of the body with respect to the anteroposterior axis. In the example shown, as shown in the display part 132P6, in the counterclockwise rotation, the degree of overlapping of the "central position between the shoulders" and the "central position of the hips" is high, and the upper part of the body does not fluctuate. To the contrary, as shown in the display part 132P7, in the clockwise rotation, the degree of overlapping of the "central position between the shoulders" and the "central position of the hips" is relatively low, and the upper part of the body more significantly fluctuates in the lateral direction than in the counterclockwise rotation. Therefore, the score as the evaluation result is lower in the clockwise rotation than in the counterclockwise rotation.

FIG. 15C relates to a situation where the terminal apparatus 10 outputs a measurement result and an evaluation result at the time when the user has put the front foot on the ground in the walking movement, as a phase of the walking movement of the user. This corresponds to step S1409 in FIG. 14.

In a display part 132P8, the terminal apparatus 10 displays a measurement result and an evaluation result of the angle of rotation of the hips at the time when the user has put the front foot on the ground in the walking movement.

In a display part 132P9, the terminal apparatus 10 displays the "line connecting the hip joints" and the like at the time when the user has put the left foot as a front foot on the ground. As shown in the drawing, the "line connecting the hip joints" is oblique, which shows that the user has properly rotated the hips at the time when the user has put the left foot on the ground.

In a display part 132P10, the terminal apparatus 10 displays the "line connecting the hip joints" and the like at the time when the user has put the right foot as a front foot on the ground. As shown in the drawing, the "line connecting the hip joints" is oblique, which shows that the user has properly rotated the hips at the time when the user has put the right foot on the ground.

Figure 16:
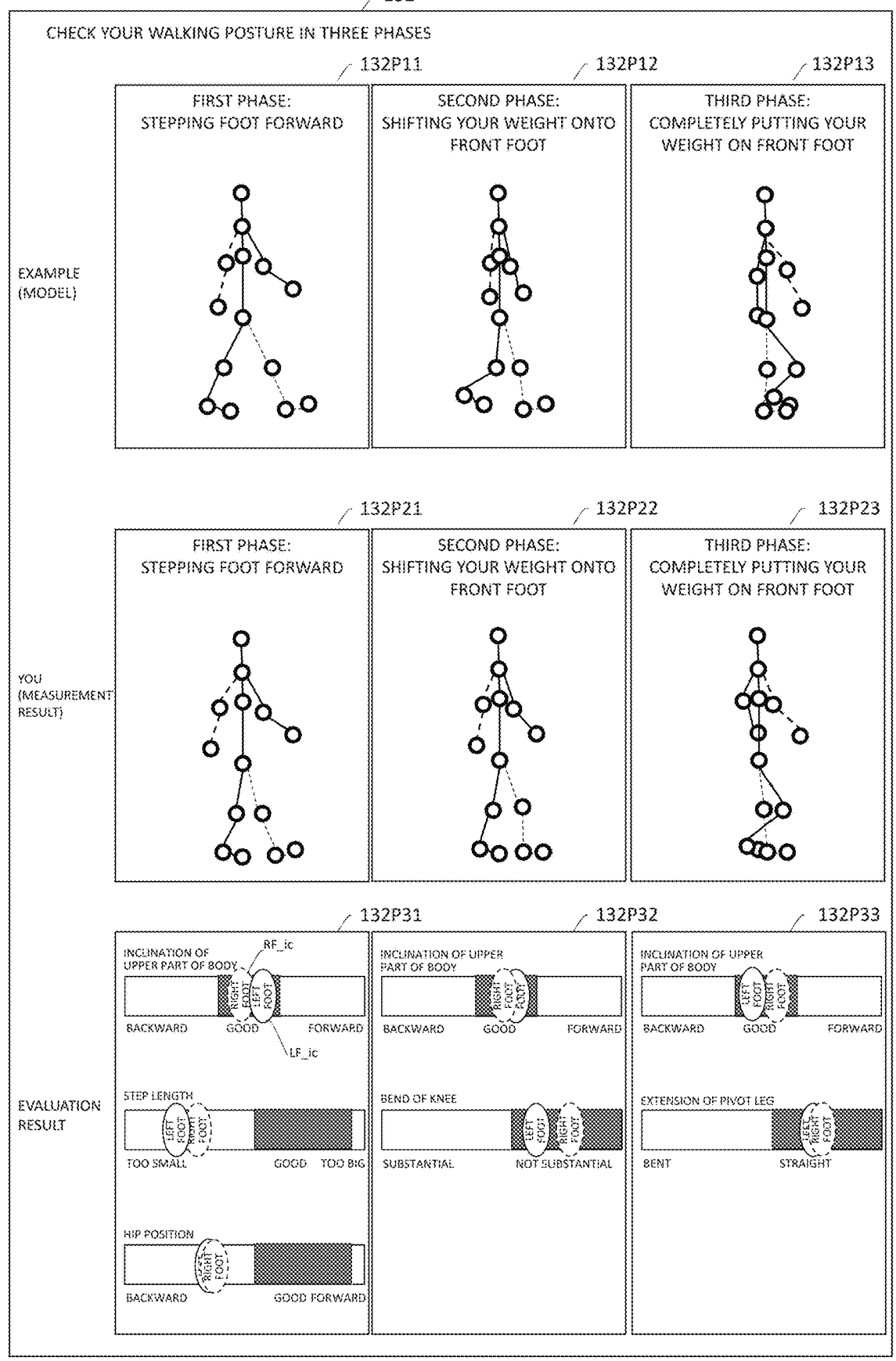
FIG. 16 is a diagram showing an example output in a case where the terminal apparatus 10 outputs a measurement result of the walking movement of the user and an evaluation result of the walking movement of the user based on the measurement result in the second embodiment.

FIG. 16 is a diagram showing an example output in a case where, in the second embodiment, the terminal apparatus 10 outputs a measurement result of the walking movement of the user and an evaluation result of the walking movement of the user based on the measurement result. This corresponds to the processing in steps S1407 and S1409 shown in FIG. 14.

In the example in FIG. 16, the terminal apparatus 10 displays the measurement result and the evaluation result for one cycle of the walking movement of the user in such a manner that the results can be compared with a reference example (a model example or an ideal example) of the good walking posture. In the example output shown in FIG. 16, again, the terminal apparatus 10 may output the results by printing the results on a paper medium with a printer or the like.

On the display 132, the terminal apparatus 10 divides one cycle of the walking movement into a plurality of steps, and displays, for each step, an ideal model of the good walking posture, a measurement result of the walking movement of the user, and an evaluation result of the measurement result.

In the example in FIG. 16, one cycle of the walking movement is divided into a first step of "stepping a foot forward", a second step of "starting to put his or her weight onto the front foot (starting to rest on the front foot)", and a third step of "completely putting his or her weight on the front foot (completely resting on the front foot)".

Items evaluated by the terminal apparatus 10 in the first step, the second step, and the third step include items common to these steps and items that are not common to these steps.

(1) Evaluation Items in the First Step

Inclination of the upper part of the body in the walking movement: whether a part (such as the head or a shoulder) of the upper part of the body is inclined forward or rearward with respect to the position of the hips. For example, whether the angle of inclination of a line defined by the position of the pelvis, the position of the thoracic and lumbar spines, and the position of the center between the shoulders with respect to the vertical axis falls within a certain range or not.

Distance between the feet in the anteroposterior direction when the user steps a foot forward: the degree of distance between the feet in the anteroposterior direction. For example, whether the distance between the ankle of the front foot and the ankle of the back foot is equal to or greater than a certain distance or not.

Position of the hips when the user steps a foot forward: whether the hips are left behind or not when the user steps a foot forward. For example, whether the position of the pelvis is located forward or rearward of the shoulders or the thoracic and lumbar spines.

(2) Evaluation Items in the Second Step

Inclination of the upper part of the body at the time when the user has put the front foot on the ground: whether a part (such as the head or a shoulder) of the upper part of the body is inclined forward or rearward with respect to the position of the hips.

Bending of the knee at the time when the user has put the front foot on the ground: whether a part (such as the ankle, the knee, or the pelvis) associated with the front foot is substantially bent or not substantially bent. For example, the angle formed by the line connecting the ankle and the knee and the line connecting the knee and the pelvis falls within a certain range of angles or not.

(3) Evaluation Items in the Third Step

Inclination of the upper part of the body at the time when the user completely puts his or her weight on the front foot: whether a part (such as the head or a shoulder) of the upper part of the body is inclined forward or rearward with respect to the position of the hips.

Extension of the pivot leg at the time when the user completely puts his or her weight on the front foot: provided that the front foot having landed on the ground after being stepped forward is the pivot foot, whether a part (such as the ankle, the knee, or the pelvis) of the pivot leg is extended or bent when the user puts his or her weight on the pivot foot. For example, the angle formed by the line connecting the ankle and the knee and the line connecting the knee and the pelvis falls within a certain range of angles or not.

Specifically, the terminal apparatus 10 displays an ideal model for the first step in a display part 132P11. In a display part 132P21, the terminal apparatus 10 displays a measurement result of the body of the user in the first step. In a display part 132P31, the terminal apparatus 10 displays an evaluation result of the movement of the body of the user in the first step.

In display parts 132P11, 132P12, and 132P13, the terminal apparatus 10 displays positions of parts (joints) of the body at the time when these evaluation items are appropriate for the good walking posture. For example, in the display part 132P11, positions of parts of the body in the case where the upper part of the body is not inclined, the front foot and the back foot are at a certain distance (that is, the step length is not too small), and the position of the hips is appropriate (that is, the hips are not left behind) are shown.

In the example shown, in the display part 132P31, as evaluation results of the evaluation item "inclination of the upper part of the body", an evaluation result RF_ic of the right foot at the time when the user steps the right foot forward and an evaluation result LF_ic of the left foot at the time when the user steps the left foot forward are displayed and superimposed on a predetermined bar. The predetermined bar is drawn in accordance with the possible range of the evaluation results. The terminal apparatus 10 displays the predetermined bar divided into a region indicating that the evaluation result is good and a region indicating that the evaluation result is not good. In the example shown, the region indicating that the evaluation result is good is highlighted. For the evaluation item "inclination of the upper part of the body", the terminal apparatus 10 displays the evaluation result RF_ic of the right foot and the evaluation result LF is of the left foot in association with each other in the "good" range, which indicates that the upper part of the body is not excessively inclined forward or rearward.

In the display part 132P31, as evaluation results, the terminal apparatus 10 also displays an evaluation result of the right foot and an evaluation result of the left foot for the evaluation items "distance between the feet in the anteroposterior direction" and "position of the hips" in association with a predetermined bar.

In the display part 132P12, the terminal apparatus 10 displays an ideal example for the second step. In a display part 132P22, the terminal apparatus 10 displays a measurement result of the body of the user in the second step. In a display part 132P32, the terminal apparatus 10 displays an evaluation result of the movement of the body of the user in the second step.

In the display part 132P13, the terminal apparatus 10 displays an ideal example for the third step. In a display part 132P23, the terminal apparatus 10 displays a measurement result of the body of the user in the third step. In a display part 132P33, the terminal apparatus 10 displays an evaluation result of the movement of the body of the user in the third step.

Figure 17A:
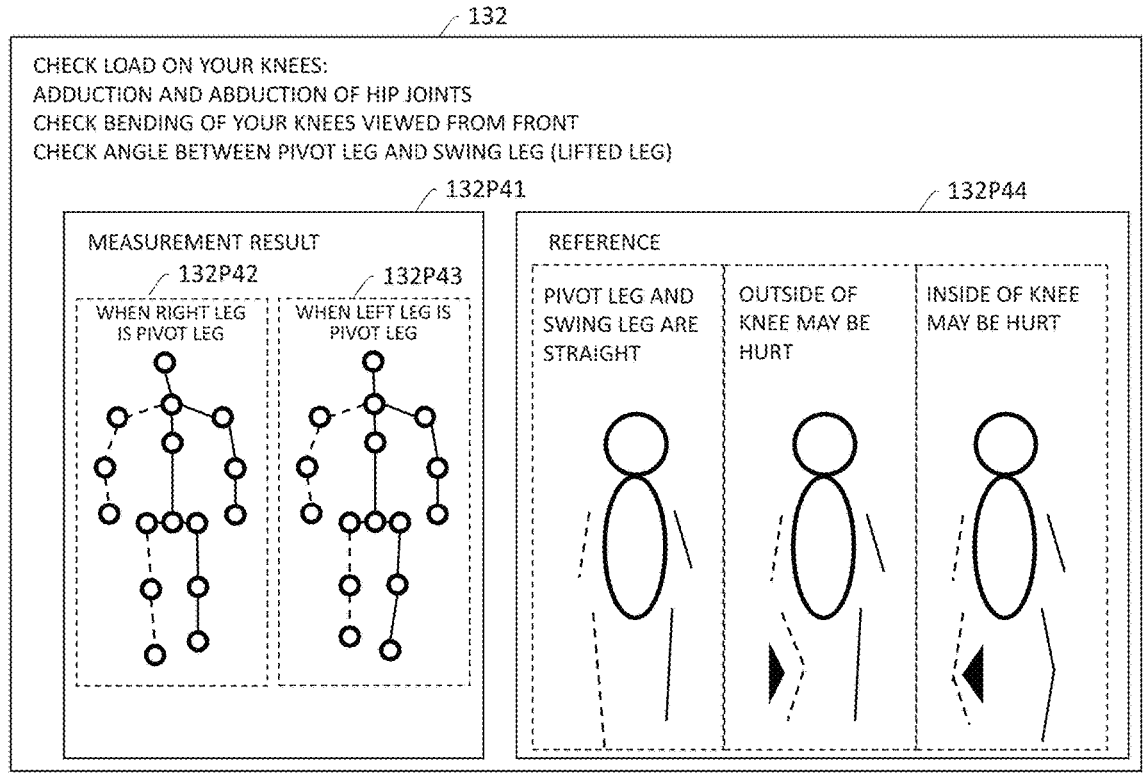
FIG. 17A is a diagram showing examples where the terminal apparatus 10 outputs an evaluation result of the load on the knees in the walking movement of the user. This corresponds to step S1409 in FIG. 14.
Figure 17B:
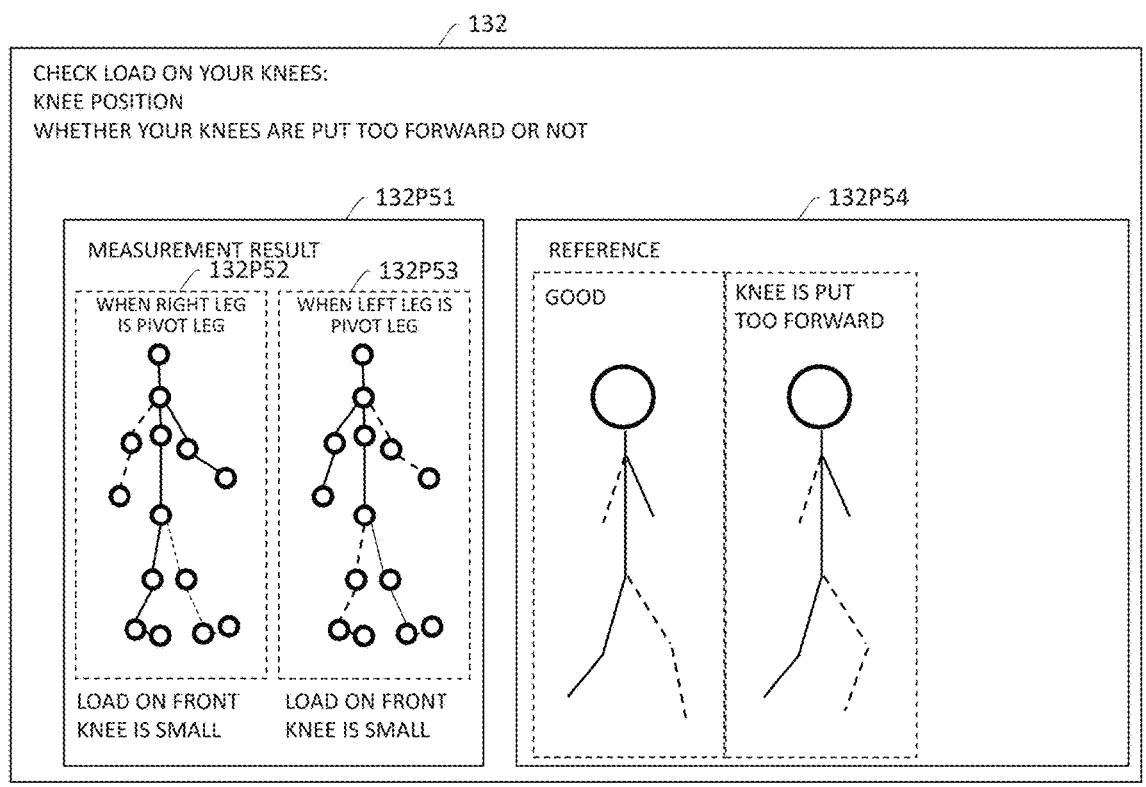
FIG. 17B is a diagram showing examples where the terminal apparatus 10 outputs an evaluation result of the load on the knees in the walking movement of the user. This corresponds to step S1409 in FIG. 14.

FIGS. 17A and 17B are diagrams showing examples where the terminal apparatus 10 outputs an evaluation result of the load on the knees in the walking movement of the user. This corresponds to step S1409 in FIG. 14.

FIG. 17A shows an example where measurement results of adduction and abduction of the hip joints in the walking movement of the user and an evaluation result thereof are output. The terminal apparatus 10 displays the measurement results of the walking movement of the user viewed along the anteroposterior axis (viewed from the front) on the display 132, so that the user can easily check the bending of the knees in the walking movement.

In a display part 132P41, the terminal apparatus 10 displays measurement results of the walking movement. In a display part 132P42, the terminal apparatus 10 displays a measurement result at the time when the user walks by using the right foot as the pivot foot. In a display part 132P43, the terminal apparatus 10 displays a measurement result at the time when the user walks by using the left foot as the pivot foot.

In a display part 132P44, the terminal apparatus 10 displays a preferable type of measurement result ("pivot leg and swing leg are straight") and a type of measurement result with which the user may hurt his or her knee ("outside of knee may be hurt" and "inside of knee may be hurt"), for information for the user. That is, both excessive adduction and excessive abduction in the walking movement may hurt the knees in the walking movement.

In this way, the user can be prompted to avoid a walking movement that may hurt his or her knee, by referring to the output result of the terminal apparatus 10.

FIG. 17B is a diagram showing an example where an evaluation result of whether the knee is forward of the ankle or not in the walking movement of the user. The terminal apparatus 10 displays measurement results of the walking movement of the user viewed along the transverse axis (viewed from the side) on the display 132, so that the user can easily check whether the keens of the user are put too forward in the walking movement.

In a display part 132P51, the terminal apparatus 10 displays measurement results of the walking movement. In a display part 132P52, the terminal apparatus 10 displays a measurement result at the time when the user walks by using the right foot as the pivot foot. In a display part 132P53, the terminal apparatus 10 displays a measurement result at the time when the user walks by using the right foot as the pivot foot. In the display part 132P51, the terminal apparatus 10 displays that "load on front knee is small" as an evaluation result of the walking posture of the user.

In a display part 132P54, the terminal apparatus 10 displays a preferable type of measurement result ("good") and a type of measurement result with which the user may hurt his or her knee ("knee is put too forward"), for information for the user. That is, if the knee is forward of the ankle when the user steps the front foot forward, the knee may be hurt. The terminal apparatus 10 determines whether or not the knee is put too forward when the user steps the front foot forward based on whether or not the angle formed by the line connecting the position of the ankle and the position of the knee and the line connecting the position of the knee and the position of the pelvis is equal to or greater than a predetermined angle (whether the part from the knee to the ankle is put too forward or not).

As described above, the walking movement of the user is evaluated by dividing the walking cycle into a plurality of phases, such as a phase of starting to step the pivot foot forward, a phase of putting the pivot foot on the ground, and a phase of starting to put his or her weight on the pivot foot. In this way, the user is prompted to improve the walking movement by referring to the evaluation result for each phase. In addition, since the user can refer to an ideal example of the movement of the body and compare the measurement result of the movement of the body of the user with the ideal example, the user is prompted to bring his or her walking posture closer to the good walking posture.

Third Embodiment

The measurement system 1 according to the third embodiment will be described. In the third embodiment, a process will be described in which a measurement result of the balance of the trunk of the user is displayed so that the user can achieve a posture in which the trunk is balanced.

<Operation>

In the following, a process in which the terminal apparatus 10 measures the movement of the body of the user and makes an evaluation based on the measurement result in the third embodiment will be described.

Figure 18:
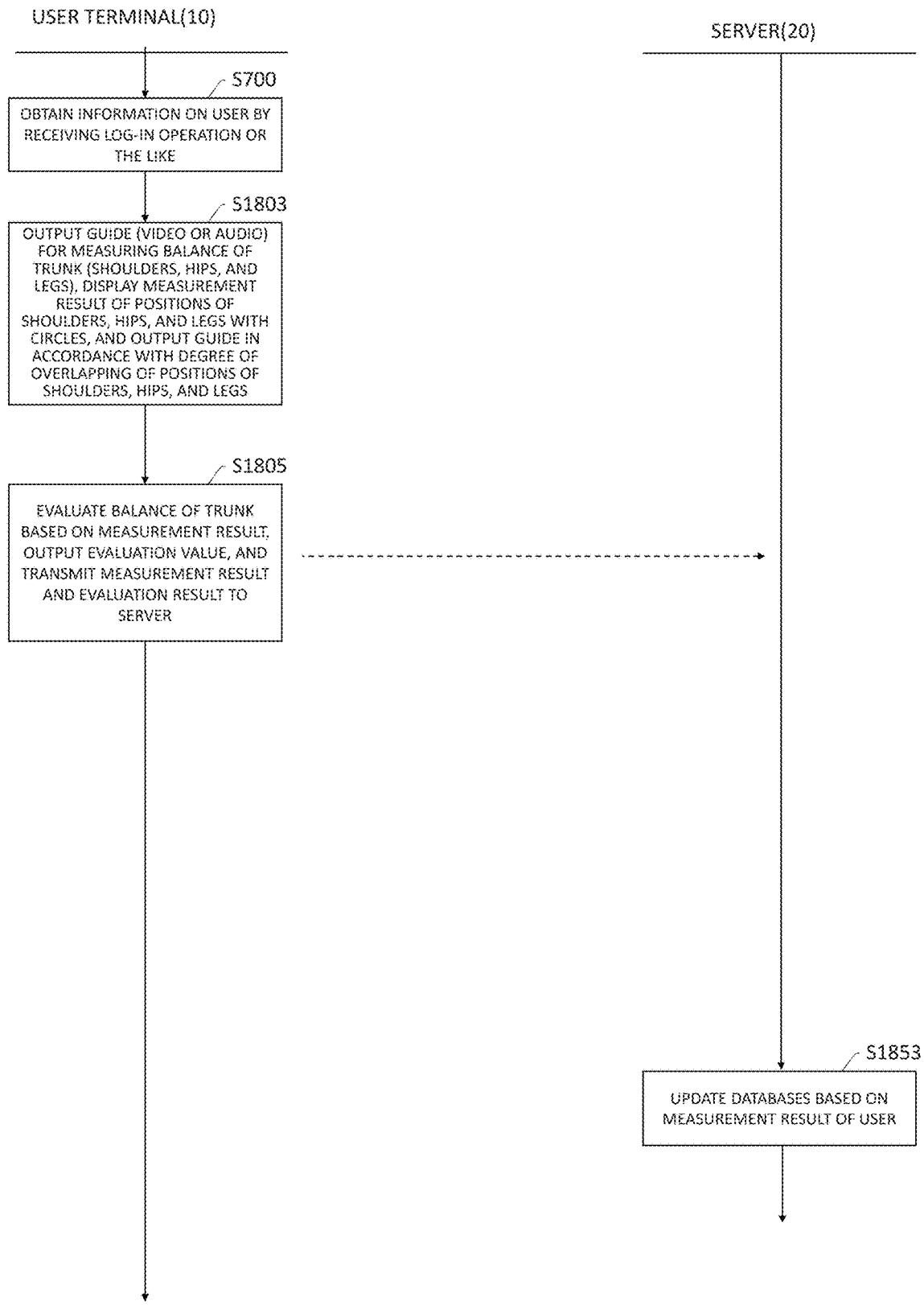
FIG. 18 is a flowchart showing a process in which the terminal apparatus 10 measures and evaluates the balance of the trunk of the user in a third embodiment.

FIG. 18 is a flowchart showing a process which the terminal apparatus 10 measures and evaluates the balance of the trunk of the user in the third embodiment.

In step S1803, the terminal apparatus 10 outputs a guide (video or audio) for measuring the balance of the trunk (the shoulders, the hips, and the legs) of the user based on the measurement result from the measurement apparatus 31. The terminal apparatus 10 displays measurement results of the positions of the shoulders, the hips, and the legs of the user viewed along the vertical axis with circles. The terminal apparatus 10 outputs a guide to prompt the user to balance the trunk in accordance with the degree of overlapping of the positions of the shoulders, the hips, and the legs.

In step S1805, the terminal apparatus 10 evaluates the balance of the trunk of the user based on the measurement result from the measurement apparatus 31, and outputs an evaluation value. The terminal apparatus 10 transmits the measurement result from the measurement apparatus 31 and the evaluation result to the server 20.

In step S1853, the server 20 updates the measurement result database 287 and the evaluation result database 288 based on the measurement result and the evaluation result of the balance of the trunk of the user.

<Example Outputs>

Figure 19A:
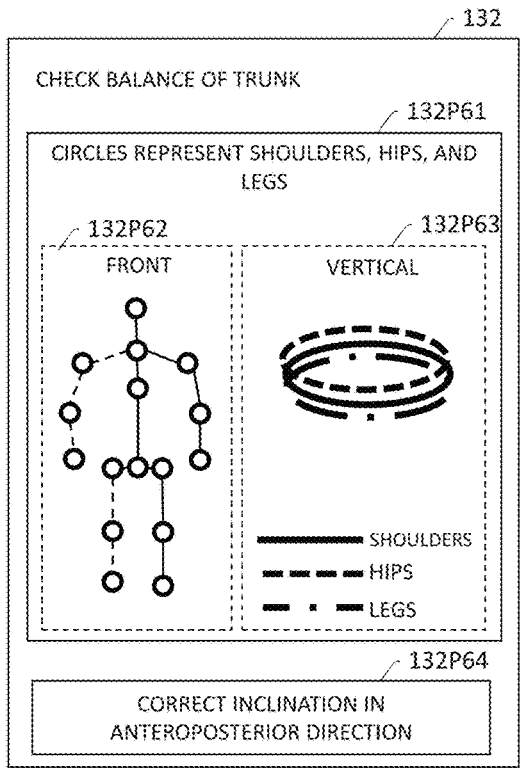
FIG. 19A is a diagram showing examples in which the terminal apparatus 10 outputs a measurement result and an evaluation result of the balance of the trunk of the user in the third embodiment.
Figure 19B:
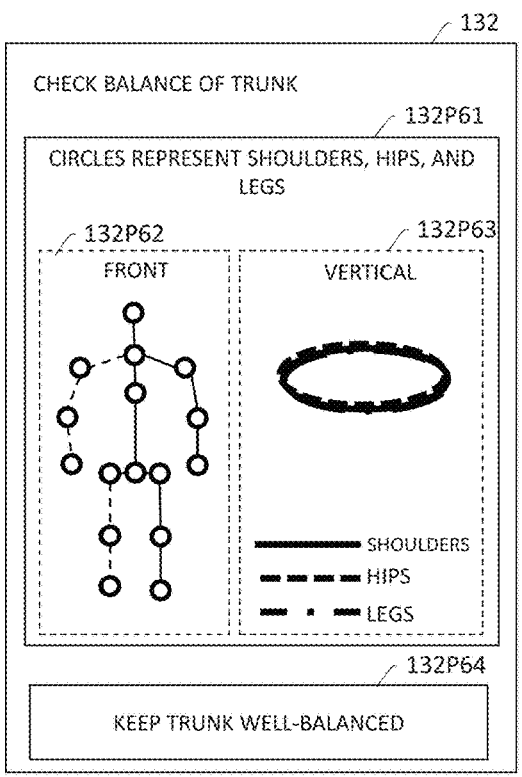
FIG. 19B is a diagram showing examples in which the terminal apparatus 10 outputs a measurement result and an evaluation result of the balance of the trunk of the user in the third embodiment.
Figure 19C:
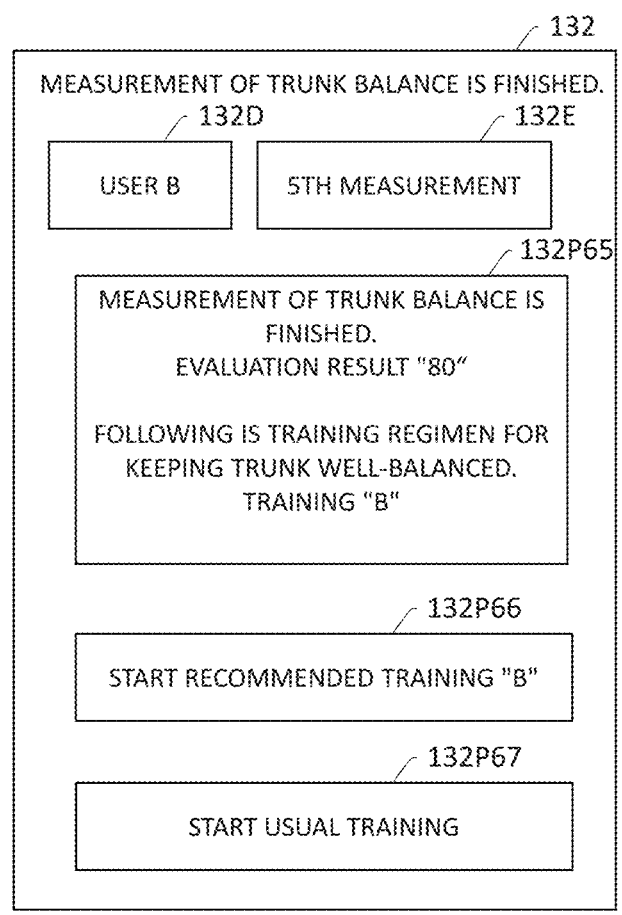
FIG. 19C is a diagram showing examples in which the terminal apparatus 10 outputs a measurement result and an evaluation result of the balance of the trunk of the user in the third embodiment.

FIGS. 19A, 19B, and 19C are diagrams showing examples in which the terminal apparatus 10 outputs a measurement result and an evaluation result of the balance of the trunk of the user in the third embodiment.

FIG. 19A shows an example screen that outputs a measurement result in real time in a situation where the terminal apparatus 10 measures the balance of the trunk of the user with the measurement apparatus 31. This corresponds to the processing in step S1803 in FIG. 18. In the example in FIG. 19A, in a display part 132P61, a circular figure (a perfect circle or an ellipse) corresponding to each of the shoulders, the hips, and the legs of the user is displayed.

In a display part 132P62, the terminal apparatus 10 displays a measurement result of each part of the body of the user viewed along the anteroposterior axis.

In a display part 132P63, the terminal apparatus 10 displays the positions of the parts, such as the shoulders, the hips, and the legs, of the body of the user viewed along the vertical axis based on the measurement result from the measurement apparatus 31. The terminal apparatus 10 displays the measurement result from the measurement apparatus 31 in the display part 132P63 as required. Therefore, if the body of the user fluctuates, the circular figures corresponding to the parts, such as the shoulders, the hips, and the legs, are not aligned and do not overlap with each other. In the example screen in FIG. 19A, the parts of the body of the user are displaced and not aligned along the vertical axis. The user is prompted to move his or her body to balance the trunk by watching the display in the display part 132P63 of the display 132.

In a display part 132P64, the terminal apparatus 10 makes a notification to prompt the user to achieve a posture in which the trunk is balanced. Based on the measurement result from the measurement apparatus 31, the terminal apparatus 10 determines a movement of the body of the user required to balance the parts of the body of the user. In the example shown, the positions of the head and the legs are located rearward of the position of the hip part of the user. That is, the hips of the user stick out forward. In the display part 132P64, the terminal apparatus 10 prompts the user to correct the inclination of the body in the anteroposterior direction. In this way, the user can easily recognize the movement of the body required to achieve a posture in which the trunk is balanced.

FIG. 19B shows an example display of a measurement result in a state where the trunk of the user is balanced. In the display part 132P63, the parts, such as the shoulders, the hips, and the legs, of the user are aligned along the vertical axis, and the trunk is balanced. In the display part 132P64, the terminal apparatus 10 notifies the user that the trunk is balanced.

FIG. 19C shows an example display in a case where the measurement of the balance of the trunk is finished, and an evaluation result is output. This corresponds to the processing in step S1805 in FIG. 18.

In a display part 132P65, the terminal apparatus 10 displays that the measurement of the balance of the trunk is finished, and outputs an evaluation result based on the measurement result.

Based on the evaluation result of the balance of the trunk, the terminal apparatus 10 determines a training regimen for balancing the trunk, as a training regimen to be proposed to the user. In the example shown, in the display part 132P65, the terminal apparatus 10 displays the evaluation result of the balance of the trunk of the user, and a candidate of the training regimen proposed to the user based on the evaluation result. In a display part 132P66, the terminal apparatus 10 receives an operation for starting the training regimen proposed to the user. In response to an input operation by the user in the display part 132P66, the terminal apparatus 10 reads the corresponding training regimen.

In a display part 132P67, the terminal apparatus 10 receives a choice of a training regimen from the user. That is, in the display part 132P67, the terminal apparatus 10 receives an input operation for starting other training than the training regimen proposed to the user by the terminal apparatus 10 based on the evaluation result of the balance of the trunk.

The details of the embodiments described above may be combined with each other.

Fourth Embodiment

In a fourth embodiment, a technique of proposing a training regimen appropriate to the user based on the result of measurement of the movement of the body of the user, such as the ROM check (first embodiment), the check of the walking posture (second embodiment), and the measurement of the balance of the trunk (third embodiment), will be described. By measuring and evaluating the movement of the body of the user as described above, the terminal apparatus 10 can determine a part of the body of the user to be trained, and proposes an appropriate training regimen in accordance with the determination result.

With such a configuration, when adding a content of a training regimen, the content of the training regimen can be associated with a part of the body to which the content is appropriate and a possible trouble of the body of the user that can be solved by the content, so that contents suitable for the measurement result of the movement of the body of the user can be provided to the user. Therefore, contents can be more easily added to the training regimen.

(1) As described above, the terminal apparatus 10 may propose an exercise regimen to the user based on the measurement result and the evaluation result of each step of the walking cycle of the user. For example, the terminal apparatus 10 compares the movement of the body of the user with an ideal example of the movement of the body (as in the example in FIG. 16), and determines a muscle that is desirably improved by the user. For example, if the distance between the feet in the anteroposterior direction is small in the evaluation result of the first step (a movement of stepping a foot forward) in the walking movement of the user, the server 20 determines an exercise regimen that can be expected to increase the step length by referring to the training item information 285. That is, the server 20 may retain exercise regimens to be proposed in association with the evaluation results of evaluation items for each step of the walking movement and evaluation items for the balance of the trunk in advance.

(2) The terminal apparatus 10 may propose a training regimen that can eliminate a left-right difference of the movement of the body of the user to the user. As described above, the terminal apparatus 10 evaluates the left-right balance of the movement of the body of the user by the ROM check and the walking posture check. For example, the terminal apparatus 10 evaluates the left-right balance of the rotational movement about the vertical axis based on the evaluation results of the rotation of the shoulders and the rotation of the hips in the walking movement of the user. The terminal apparatus 10 determines a muscle that causes the left-right asymmetry of the movement of the body of the user. For example, the terminal apparatus 10 retains information on a muscle that causes a left-right difference of the amount of rotation of the shoulders in advance. By retaining items of evaluation in the walking movement and information on muscles that cause left-right differences in association with each other in advance, the terminal apparatus 10 can determine the muscle to be trained in order to eliminate a left-right imbalance.

(3) Based on the evaluation result of the movement of the body of the user, the terminal apparatus 10 may predict a possible future state of the body of the user, and propose a training regimen to the user based on the prediction result.

For example, as predetermined information, the terminal apparatus 10 stores (i) items "stiff neck or shoulder", "flabby upper arm", "hunched shoulders or posture with the head inclined forward", "lower back pain", "swelling of the legs", "arm muscle stiffness" and the like and (ii) information on parts of the body of the user in association with each other. The terminal apparatus 10 also stores information on training regimens to be proposed for training in association with the possible trouble items of the body of the user described above.

The terminal apparatus 10 performs the ROM check and the walking movement check and determines a muscle that is desirably improved based on the measurement result and the evaluation result thereof. For example, in a case that the ROM check shows that twisting of the body is not good, the terminal apparatus 10 retains information on what muscles are associated with the movement in advance. For example, for the ROM check, the terminal apparatus 10 retains information on muscles in association with evaluation items of the range of motion of the shoulders, the hips and the like.

The terminal apparatus 10 determines a possible future trouble by referring to the predetermined information described above by locating a stiff muscle, for example. Based on the determination result, the terminal apparatus 10 determines a training regimen to be proposed to the user so as to solve the possible future trouble of the user.

As described above, evaluation items of the balance of the walking movement and the twisting of the body are associated with information on muscles, and the information on muscles and information on possible trouble items of the body of the user are associated with each other. Therefore, the terminal apparatus 10 can propose a training regimen customized for the user to the user based on the evaluation result of the movement of the body of the user.

<Data Structure in Fourth Embodiment>

FIG. 20 is a diagram showing a data structure of various data stored in the server 20 in the fourth embodiment.

The server 20 retains an item "possible future trouble" and an item "associated muscle" for each measurement item in the measurement item information 282.

The item "possible future trouble" is information (such as a tag "stiff shoulder" or "stiff neck") for identifying a trouble that may occur in the body of the user in future depending on the evaluation result of the measurement result for a measurement item.

The item "associated muscle" is information on a part (muscle) of the body that is desirably trained depending on the evaluation result of the measurement result for a measurement item. In the item "associated muscle", a plurality of pieces of information on a part of the body ranked according to the evaluation result may be retained.

The server 20 retains an item "content", an item "trouble to be solved", and an item "associated muscle" for each training item in the training item information 285.

The item "content" indicates a content (such as a movie, reference motion data for the movement of the body of the user, or audio data) to be presented to the user when performing a training.

The item "trouble to be solved" is information (such as a tag "stiff shoulder" or "stiff neck") for identifying a trouble that may occur in the body of the user in future depending on the evaluation result.

The item "associated muscle" is information on a part (muscle) of the body that is desirably trained depending on the evaluation result for a training item. In the item "associated muscle", a plurality of pieces of information on a part of the body ranked according to the evaluation result may be retained.

The server 20 retains an item "possible future trouble" in the evaluation result database 288. The item "possible future trouble" is information (such as a tag "stiff shoulder" or "stiff neck") for identifying, for an evaluation result, a trouble that may occur in the body of the user in future depending on the evaluation result.

As described above, the server 20 updates the evaluation result database 288 in accordance with the evaluation result of the movement of the body of the user. For example, information on a trouble that may occur in the body of the user in future can be located based on the measurement result (measurement item information 282) of the ROM check. The server 20 locates information on a possible future trouble by referring to the evaluation result database 288, and extracts a training item to be proposed to the user by referring to the training item information 285. When extracting a plurality of training items to be proposed to the user, the server 20 assigns priorities according to a predetermined rule. For example, based on the badness of the evaluation result of the movement of the body of the user, the server 20 may assigns a higher priority to a training item that can solve a trouble corresponding to a bad evaluation result.

<Example Screens in Fourth Embodiment>

FIGS. 21A, and 21B show example screens in a situation where the terminal apparatus 10 presents a possible future trouble of the body of the user and proposes an exercise regimen corresponding to the trouble based on the measurement result and evaluation result of the movement of the body of the user.

In FIG. 21A, the terminal apparatus 10 displays a result of identification of possible troubles of the body of the user based on the measurement result and evaluation result of the movement of the body of the user.

The terminal apparatus 10 prompts the user to perform measurements every day with the terminal apparatus 10 in a display part 132P71, and displays a condition that may occur in the body of the user in future in a display part 132P72. In the example shown, the terminal apparatus 10 displays that a trouble "stiff neck or shoulder" may occur in an operation receiving part 132P73, and displays a training regimen corresponding to the trouble "stiff neck or shoulder" in response to a user input operation in the operation receiving part 132P73. The terminal apparatus 10 also displays that a trouble "flabby upper arm" may occur in an operation receiving part 132P74, and displays a training regimen corresponding to the trouble "flabby upper arm" in response to a user input operation in the operation receiving part 132P74. The terminal apparatus 10 also displays that a trouble "hunched shoulders or posture with the head inclined forward" may occur in an operation receiving part 132P75, and displays a training regimen corresponding to the trouble "hunched shoulders or posture with the head inclined forward" in response to a user input operation in the operation receiving part 132P75.

In a display part 132P76, the terminal apparatus 10 displays an operation receiving part 132P77 for starting less training regimens than those displayed in the display part 132P76 for a user who doesn't have much time, from among the training regimen candidates to be proposed to the user. The terminal apparatus 10 assigns priorities to the training regimen candidates to be proposed to the user according to a predetermined rule and displays the training regimen candidates in the display part 132P76.

In a display part 132P78, the terminal apparatus 10 receives an operation for editing a training regimen to be performed, such as "favorite", from the user.

In response to receiving an input operation in an operation receiving part 132P91, the terminal apparatus 10 presents a questionnaire to the user, and receives a response to the questionnaire. Based on the input result to the questionnaire, the terminal apparatus 10 may determine a trouble of the user, and propose a training regimen corresponding to the determine trouble.

FIG. 21B shows a situation where a recommended training regimen is proposed to the user. In a display part 132P81, the terminal apparatus 10 displays, to the user, information on a part of the body (such as "Do you have a stiff neck or shoulder?") concerning the trouble determined based on the measurement result and evaluation result. In the display part 132P81, the terminal apparatus 10 also displays a cause of the trouble of the body of the user (such as "Your shoulders tend to be hunched.") based on the measurement result and evaluation result. In the display part 132P81, the terminal apparatus 10 also displays a guideline for solving the trouble of the body of the user (such as "guideline expected to improve the blood flow in the upper part of the body" or "guideline for stretching the hamstrings") based on the measurement result and evaluation result, and proposes an exercise corresponding to the guideline.

For example, in response to an input operation in the operation receiving part 132P73, the terminal apparatus 10 displays operation receiving units 132P83 to 132P87 for starting a recommended training in a display part 132P82. In response to an input operation in any of these operation receiving units 132P83 to 132P87, the terminal apparatus 10 may reproduce a movie for starting a training, for example.

In response to an input operation in the operation receiving part 132P77, the terminal apparatus 10 narrows down the number of training regimens to be proposed for a user who doesn't have much time and displays operation receiving units 132P83 to 132P85 in a display part 132P88.

In this way, the user can be prompted to continue training according to the condition of the user.

Example Operation

Operations of the apparatuses in the fourth embodiment described above will be described.

Figure 22:
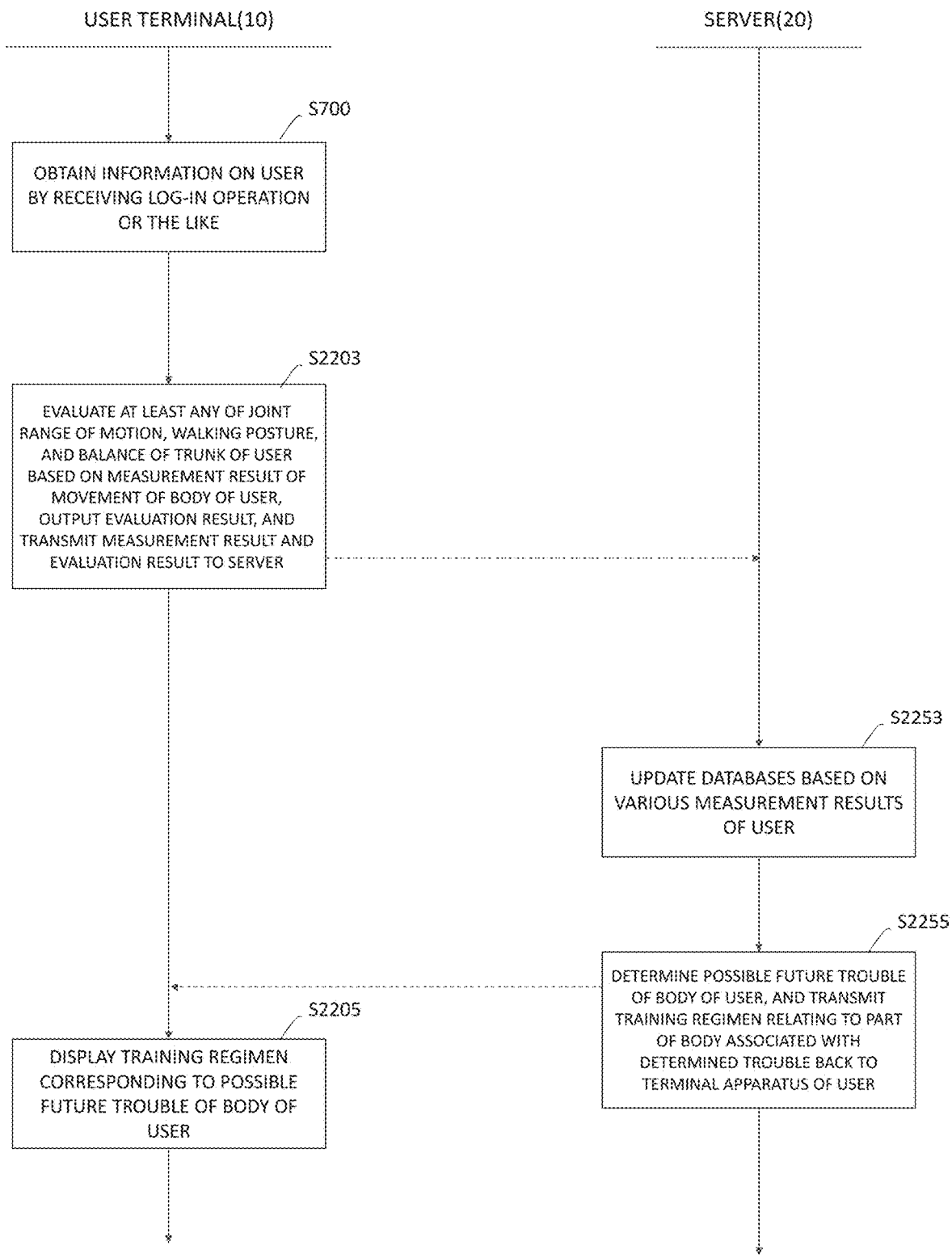
FIG. 22 shows a flow of a process performed by the apparatuses in a fourth embodiment.

FIG. 22 shows a flow of processing performed by the apparatuses in the fourth embodiment.

In step S2203, the terminal apparatus 10 evaluates at least any of the joint range of motion, the walking posture, and the balance of the trunk of the user based on the measurement result of the movement of the body of the user, and outputs the evaluation result. The terminal apparatus 10 transmits the measurement result and the evaluation result to the server 20.

In step S2253, the server 20 updates a database (such as the evaluation result database 288) based on various measurement results of the user, such as the measurement result and the evaluation result received from the terminal apparatus 10.

In step S2255, the server 20 determines a possible future trouble of the body of the user based on the evaluation result database 288 or the like. The server 20 selects a training regimen relating to the part of the body associated with the determined trouble from among a plurality of training regimens based on the training item information 285, and transmits the selected training regimen back to the terminal apparatus 10 of the user.

In step S2205, the terminal apparatus 10 displays the training regimen corresponding to the possible future trouble of the body of the user.

Example Modification

In the fourth embodiment, a question may be presented to the user, and priorities may be assigned to the training regimens proposed to the user according to the response (questionnaire result) input by the user.

In this way, not only does the server 20 propose a training regimen based on the measurement result of the body of the user, but also the server 20 can present a question concerning the body to the user and propose a training regimen based on the response to the question from the user. That is, the server 20 updates the proprieties of the training regimens proposed to the user based on the response to the question. The server 20 presents a training regimen having the highest priority for the user to the user based on not only the evaluation result of the body but also the response to the question from the user. In this way, the server 20 can propose a training regimen that is more appropriate to the condition of the body of the user.

For example, the terminal apparatus 10 can receive information on a muscle of the body of the user that has not been measured yet by the measurement unit 30 of the measurement system 1 (that is, that has not been evaluated based on the measurement result yet) by receiving a questionnaire response concerning the body of the user. The terminal apparatus 10 can also determine a possible future trouble relating to a muscle that has not been evaluated yet by the measurement system 1, based on a questionnaire result input by the user. The terminal apparatus 10 determines a training regimen to be proposed to the user so as to properly cope with a possible future trouble of the body of the user, based on the trouble determined based on the measurement result of the movement of the body and the response to the questionnaire from the user.

<Data Structure in Example Modification>

FIG. 23 is a diagram showing data structures of various data stored in the server 20 in the modification of the fourth embodiment.

The server 20 retains an item "response option", an item "current trouble", an item "possible future trouble", and an item "associated muscle" for each questionnaire result in user questionnaire information 289.

The item "response option" includes information on options for the user of the terminal apparatus 10 to respond to a question (questionnaire) presented to the user. For example, when the question concerns physical complaints of the user, parts that can be involved with physical complaints are presented as options to the user. Then, based on the result input for each option by the user, a trouble of the user relating to a part of the body can be determined.

The item "current trouble" is information (such as a tag "lower back pain" or "knee pain") for identifying, for a questionnaire response, a trouble the user may currently have depending on the evaluation result of the questionnaire response.

The item "possible future trouble" is information (such as a tag "stiff shoulder" or "stiff neck") for identifying, for a questionnaire response, a trouble that may occur in the body of the user in future depending on the evaluation result of the questionnaire response.

The item "associated muscle" is information, for a questionnaire result, on a part (muscle) of the body that is desirably trained depending on the evaluation result of the questionnaire response. In the item "associated muscle", a plurality of pieces of information on a part of the body ranked according to the response may be retained.

The server 20 retains an item "current trouble" in the evaluation result database 288. The item "current trouble" is information (such as a tag "lower back pain" or "knee pain") for identifying, for an evaluation result, a trouble the user may currently have depending on the evaluation result of the questionnaire response.

<Operation in Example Modification>

As described above, the server 20 updates the evaluation result database 288 in accordance with the evaluation result of the movement of the body of the user and the user questionnaire information 289. For example, information on a trouble that may occur in the body of the user in future can be located based on the measurement result (measurement item information 282) of the ROM check. For example, a trouble the user currently has or may have in the near future can be determined based on the questionnaire result concerning the body from the user (user questionnaire information 289). The server 20 locates information on a possible future trouble of the user by referring to the evaluation result database 288, and extracts a training item to be proposed to the user by referring to the training item information 285.

When extracting a plurality of training items to be proposed to the user, the server 20 assigns priorities according to a predetermined rule based on the badness of the evaluation result of the movement of the body of the user. For example, based on the badness of the evaluation result of the movement of the body of the user, the server 20 may assign a higher priority to a training item that can solve a trouble corresponding to a bad evaluation result. The server 20 modifies and sets priorities of the training items to be proposed to the user based on the questionnaire result. For example, based on the badness of the evaluation result of the body relating to the questionnaire response compared with the evaluation result of the ROM check, the server 20 may assign a higher priority to a training item that can solve the trouble of the body of the user determined based on the questionnaire result.

Figure 24:
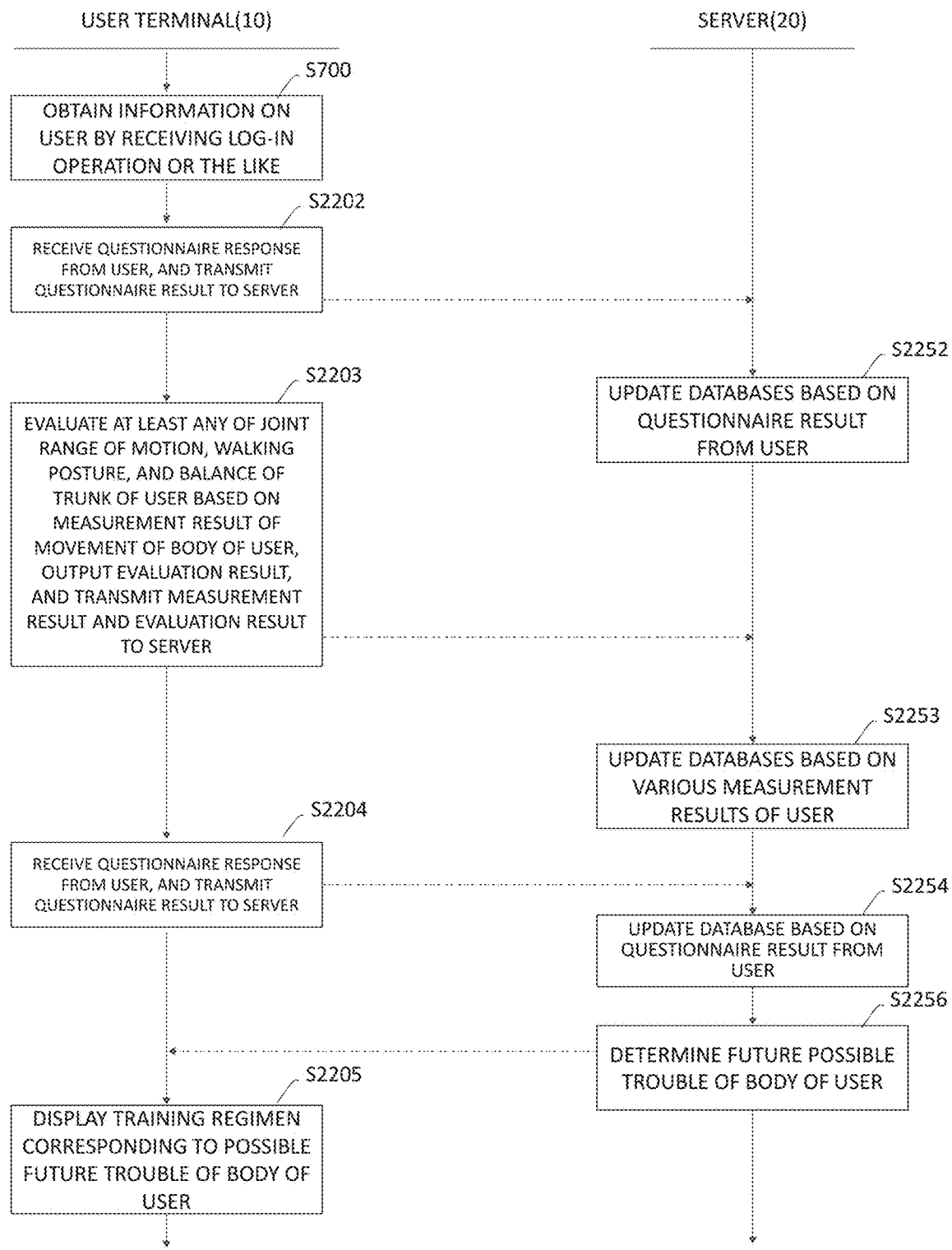
FIG. 24 is a diagram showing a flow of an operation in the example modification of the fourth embodiment.

FIG. 24 is a diagram showing a flow of an operation in the example modification of the fourth embodiment.

As shown in FIG. 24, at any timing, such as in step S2202 or step S2204, the terminal apparatus 10 presents a question (questionnaire) to the user of the terminal apparatus 10.

The processing in step S2202 will be described. The terminal apparatus 10 displays a question on the display 132 in response to the user completing the processing of logging in the measurement system 1 in step S700, for example. The terminal apparatus 10 receives an input of a response to the question from the user. The terminal apparatus 10 transmits the input response to the server 20.

In step S2252, the server 20 updates the user questionnaire information 289 based on the information received from the terminal apparatus 10.

In step S2253, the server 20 updates various databases, such as the measurement result database 287, in response to receiving the measurement result from the measurement unit 30 or the like and the evaluation result based on the measurement result that are transmitted from the terminal apparatus 10 in step S2203.

The processing in step S2204 will be described. The terminal apparatus 10 presents a question to the user (by displaying on the display 132, for example) in response to the measurement of the movement of the body of the user being completed in step S2203. The terminal apparatus 10 transmits an input response to the server 20.

In step S2254, the server 20 updates the user questionnaire information 289 based on the information received from the terminal apparatus 10.

In step S2256, the server 20 determines a current trouble of the user or a future possible trouble of the body of the user based on the user questionnaire information 289, the evaluation result database 288 or the like. The server 20 selects a training regimen corresponding to the determined trouble from among a plurality of training regimens based on the training item information 285, and transmits the selected training regimen back to the terminal apparatus of the user. For example, the server 20 determines a trouble of the user based on the user response to a question (user questionnaire information 289), and determines a training regimen to be proposed to the user according to the determined trouble (training item information 285). The server 20 also determines a training regimen to be proposed to the user based on the evaluation result database 288, as described above. The server 20 transmits one or more training regimens determined in this way back to the terminal apparatus 10. In this processing, the server 20 may assign priorities to a plurality of determined training regimens according to a predetermined rule, and transmit a training regimen back to the terminal apparatus 10 according to the priority.

<Example Screen 1 in Fourth Embodiment>

Figure 25A:
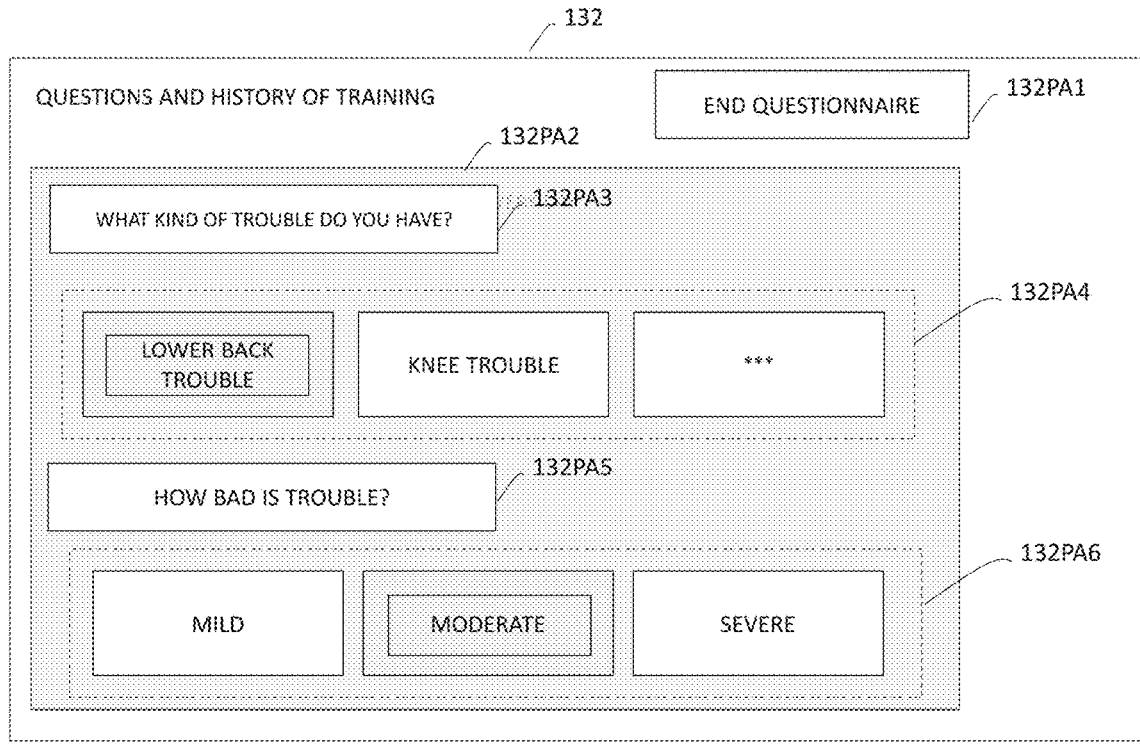
FIG. 25A shows example screens for the user to respond a questionnaire in a situation where the terminal apparatus 10 presents a possible future trouble of the body of the user based on the measurement result and evaluation result of the movement of the body of the user, and proposes an exercise regimen corresponding to the trouble.
Figure 25B:
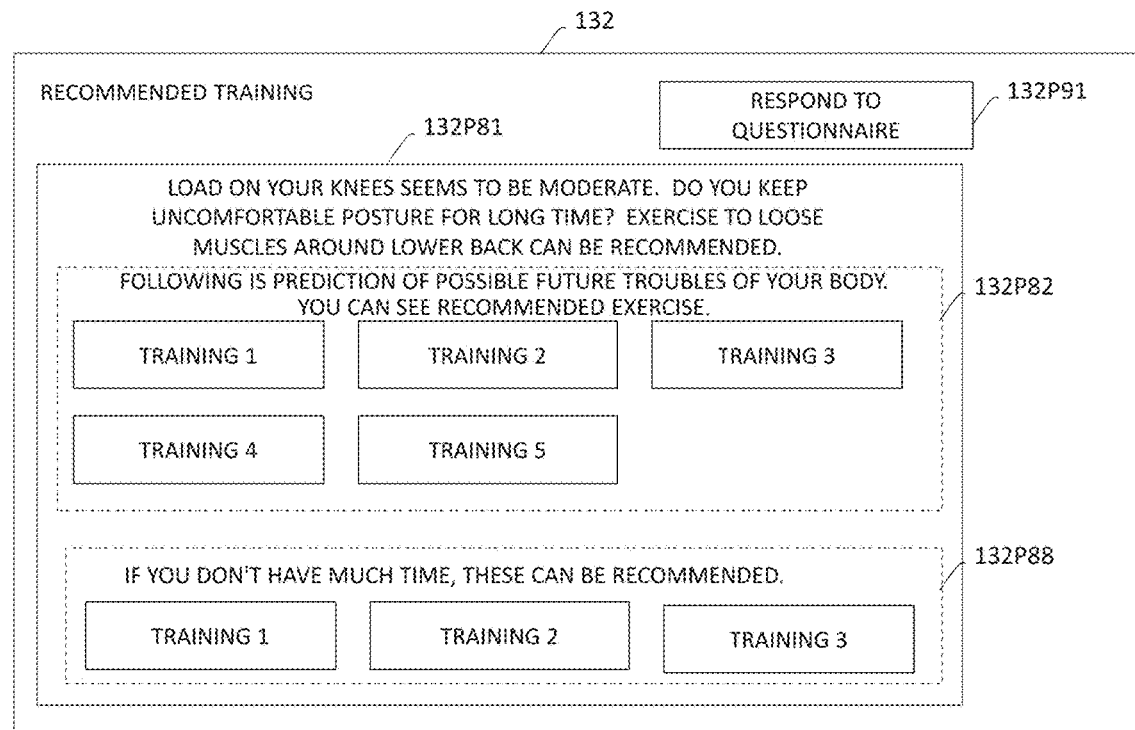
FIG. 25B shows example screens for the user to respond a questionnaire in a situation where the terminal apparatus 10 presents a possible future trouble of the body of the user based on the measurement result and evaluation result of the movement of the body of the user, and proposes an exercise regimen corresponding to the trouble.

FIGS. 25A and 25B show example screens for the user to respond a questionnaire in a situation where the terminal apparatus 10 presents a possible trouble of the body of the user based on the measurement result and evaluation result of the movement of the body of the user, and proposes an exercise regimen corresponding to the trouble. For example, the terminal apparatus 10 displays the screen (display part 132P71) shown in FIG. 21A by accessing the server 20, for example.

At a timing when the screen is displayed (a timing when the terminal apparatus 10 receives information for displaying the screen from the server 20 and displays the screen on a browser or the like), at a timing when a predetermined time has lapsed since the screen was displayed, or in response to a predetermined condition, such as that the user has performed a predetermined operation on the screen, being satisfied, the terminal apparatus 10 displays a display part 132PA2 shown in FIG. 25A to prompt the user to respond the questionnaire.

FIG. 25A shows the display part 132PA2 for the user to respond the questionnaire by overlaying the display part 132PA2 on the screen (display part 132P71 described above with reference to FIG. 21A) in which the result of determination of a possible trouble of the body of the user based on the measurement result and evaluation result of the movement of the body of the user.

In the display part 132PA2, the terminal apparatus 10 displays a question text ("What kind of trouble do you have?") in a display part 132PA3.

The server 20 determines the details of the question text presented to the user in the display part 132PA3. For example, the server 20 retains a plurality of question texts in advance, and retains information on parts of the body of the user and information on candidates of the response to the question text in association with each question text. The server 20 may refer to the measurement result database 287 and the evaluation result database 288 to determine a question text to be presented to the user based on the history of the measurements performed by the user, and make the terminal apparatus 10 display the determined question text. For example, based on the history of the measurements performed by the user with the measurement system 1 (such as the time intervals between the measurements), the server 20 may present the user a question text inquiring whether the user is aware of a disorder of a part of the body (such as "What kind of trouble do you have?") when a certain period has elapsed since the user performed the last measurement.

Furthermore, the server 20 may determine a part of the body included in the question text to be presented to the user based on the measurement results of parts of the body of the user, for example. For example, when a part of the body of the user has not been measured at least for a certain period (when there is no history of measurements of the hips or when a certain period has elapsed since the last measurement, for example), the part of the body may be included in the question text (such as "How is your lower back?").

In the example in FIG. 25A, a display part 132PA4 displays candidates of the response to the question text and receives a selection from the user. In the example shown, in the display part 132PA4, as candidates of the response to the question text, "lower back trouble" for selecting a disorder of the lower back, "knee trouble" for selecting a disorder of the knee, and "***" for requesting display of response candidates relating to the other parts of the body are displayed. The terminal apparatus 10 receives a selection of "lower back trouble" from the user and highlights the candidate so that the user can easily recognize the selection by the user.

In a display part 132PA5, the terminal apparatus 10 displays a question text concerning the degree of the trouble (degree of the disorder of the part of the body).

In a display part 132PA6, the terminal apparatus 10 displays candidates of the response to the question text displayed in the display part 132PA5, and receives a selection from the user. In the example shown, in the display part 132PA6, the terminal apparatus 10 displays "mild", which means that the degree of the trouble is mild, "moderate", which means that the degree of the trouble is moderate, and "severe", which means that the degree of the trouble is severe, as options. The terminal apparatus 10 receives a selection of the option "moderate" from the user, and highlights the selected option.

In a display part 132PA1, the terminal apparatus 10 receives an operation that indicates that the response to the question text is completed from the user. In response to this, the terminal apparatus 10 transmits the response of the user to the server 20. The server 20 receives the response of the user, and updates the user questionnaire information 289. For example, when the user selects information on a part of the body, such as "lower back trouble", as the response, the server 20 updates the user questionnaire information 289 based on the trouble of the user "lower back trouble".

FIG. 25B shows an example screen in a situation where a training regimen is proposed to the user based on the response to the question text from the user and the measurement result and evaluation result of a part of the body of the user.

In the display part 132P81, the server 20 displays information on a trouble of a part of the body of the user (such as information including a part of the body and the degree of the trouble, such as "the load on your knees seems to be moderate") based on the response to the question text from the user (user questionnaire information 289). In the display part 132P81, the terminal apparatus 10 also displays a cause of the trouble of the body of the user (such as "Do you keep an uncomfortable posture for a long time?"). In the display part 132P81, the terminal apparatus 10 also displays a guideline for solving the trouble of the body of the user (such as "loose the muscles around the lower back"), and proposes an exercise corresponding to the guideline.

Other Example Modifications (1) The user is questioned about exercise experience.

In the above description of the embodiment, examples have been described where the server 20 presents a question text to the user and proposes a training regimen based on the response to the question. Alternatively, the server 20 may question the user about exercise experience in the question presented to the user.

For example, the server 20 may presents a question text concerning his or her past sports experience or his or her exercise habit. The server 20 receives a response of the user to the question (such as a sport played by the user in the past or the presence or absence of exercise habit). Based on the response of the user, when the user has relatively little exercise experience (the period for which the user played sports is equal to or less than a certain period, or the frequency of exercise is equal to or less than a predetermine frequency, for example), the server 20 may propose, to the user, a training item the load of which on the body is relatively small or the difficulty of which is relatively low, from among the training items included in the training item information 285. For example, for each training item in the training item information 285, information on the difficulty (if a training can be performed by a person unfamiliar with exercise without any problem, the difficult of the training is low, for example) and the load on the body (different methods of training for different parts (such as upper arm) of the body have different loads on the body, for example) is retained in advance. In this way, a training regimen can be presented based on the exercise experience of the user.

In the example described above, a training regimen that is relatively easy to accomplish is proposed to a user unfamiliar with exercise, so that the user is more likely to feel a sense of accomplishment when performing the training regimen. In this way, the user can be motivated to continue training.

(2) Whether the user is familiar with exercise is evaluated based on the measurement result of the movement of the body of the user.

Furthermore, the server 20 may evaluate the exercise experience of the user based on the measurement result of the movement of the body of the user by the measurement unit 30, and determine a training regimen to be presented to the user based on the evaluation result.

For example, the server 20 retains, in advance, a pattern of the measurement result of one who is unfamiliar with exercise and a pattern of the measurement result of one who is familiar with exercise in association with the measurement result of the movement of the body of the user, such as the joint range of motion, the walking posture, or the balance of the trunk. Based on the measurement result of the movement of the body of the user, the server 20 evaluates the degree of familiarity of the user with exercise. For example, the server 20 compares the measurement result of the movement of the body of the user with the patterns described above to evaluate the degree of agreement, and outputs an evaluation value indicating whether the user is familiar with exercise or not. For example, the server 20 presents a body movement model to the user, and evaluates that the user is familiar with exercise if the user can move his or her body by generally following the body movement model. If the measurement result of the movement of the body of the user deviates from the body movement model, audio may be output to the user to eliminate the deviation. For example, when the position of a hand is different from that in the movement model, audio that prompts the user to make the position of the hand agree with that in the movement model (for example, to move the hand in a predetermined direction) may be output. When the movement of the body of the user agrees with the movement model (that is, the user is moving by properly following the movement model), audio or the like is output to indicate that the movement of the body of the user is proper.

When measuring the movement of the body of the user, the server 20 may output an evaluation value indicating whether the user is familiar with exercise or not based on whether the user is moving by properly following a video or audio guide presented to the user, for example. For example, when the user is moving by properly following an audio output, the server 20 may evaluate that the user is familiar with exercise.

Based on the evaluation value, the server 20 determines the training regimen to be proposed to the user.

As described above, the server 20 may retain a history of measurement results from the measurement unit 30 in the measurement history database 283, and display, to the user, the time and result of the evaluation of whether the user is familiar with exercise or not and the history of the training regimens proposed to the user. In this way, the user can confirm that the user is becoming familiar with exercise and the training regimen is changing, and can have self-efficacy.

(3) The user is questioned about continuing training

Furthermore, the server 20 may present a question about continuing training to the user. For example, a question concerning the personality of the user may be presented, such as whether the user has succeeded in continuing training in the past or periods for which the user was able to continue training.

Based on the response to the question, the server 20 determines a training regimen to be presented to the user. For example, suppose that a problem that can occur in the body of the user is located, and a training regimen relating to the part of the body associated with the problem is presented to the user as described in the above fourth embodiment and the like. When the user responds with a negative response concerning whether the user can continue training (for example, the user tends to quit training), the server 20 may change the training regimen to be proposed to the user according to the problem. For example, if there is a plurality of training regimens relating to the part of the body associated with the problem, another training regimen is proposed to the user. As a result, it can be expected that the user can more easily train without getting bored and continue training.

Based on the measurement history database 283 or the like, the server 20 determines the intervals of times when the user trained. That is, the server 20 determines the frequency of training of the user. Based on the length of the intervals, the server 20 may presents a question about continuing training to the user. For example, when the frequency of training is decreasing, the server 20 can propose another training regimen that can be performed by the user without getting bored, by receiving a response to a question about continuing training from the user. Furthermore, the server 20 may change the training regimen to be proposed to the user based on the length of the intervals. This can allow the user to train without getting bored and continue training.

Fifth Embodiment

<Overview>

In a fifth embodiment, a technique of allowing the user moving his or her body to more easily check whether the user is moving in an ideal way or not will be described.

(1) Visual information on the movement of the body of the user when moving his or her body is reduced to facilitate the user to check his or her movement.

Specifically, when the user makes a particular movement (such as a movement for evaluating the movement of trunk muscles or the joint range of motion, such as lateral arm elevation, or a movement for strength training), the movement of the body of the user is sensed as point cloud data, and an avatar corresponding to the user and an auxiliary line corresponding to the movement of the body of the user are drawn based on the point cloud data and presented to the user. This allows the user to more easily check whether the user is moving parts of his or her body as intended.

(2) A video conferencing tool or the like is used to make it easier for a trainer to instruct a trainee online.

In the fifth embodiment, a situation will be described in which with the technique described above, a trainee (first user) who is instructed how to move his or her body and a trainer (second user) who instructs the trainee how to move his or her body communicate with each other online.

Specifically, an avatar representing the movement of the body of the trainee in the form of point cloud data is displayed on a terminal of the trainer, so that the trainer can check not only the taken image of the body of the trainee but also the movement of the avatar, which provides less visual information than the image. This allows the trainer to more easily advise the trainee how to move his or her body online.

That is, in the fifth embodiment, there will be described a series of techniques for performing various kinds of processing, such as (1) a first processor of a terminal of the trainee (first user) senses the movement of the body of the trainee (first user) as point cloud data by means of the measurement unit 30 or the like and (2) the first processor transmits information based on the point cloud data on the trainee (first user) (such as an image of the avatar of the trainee drawn based on the point cloud data or the point cloud data itself) to a terminal of the trainer (second user).

Here, the terminal apparatus of the trainee (first user) that performs various kinds of processing, such as sensing of the movement of the body of the trainee (first user) as point cloud data, and transmission of information based on the point cloud data on the trainee (first user) to the terminal of the trainer (second user) by the first processor thereof, may be a terminal apparatus of the user, such as a computer, a smartphone, or a tablet terminal.

<Data Structure in Fifth Embodiment>

FIG. 26 is a diagram showing a data structure of a trainee information database 2601, a trainer information database 2602, and a training history database 2603 stored in the server 20 in the fifth embodiment.

Although not shown, in addition to these databases, the server 20 manages a database of information on the types of movements of the body of the user (such as a movement for evaluating the joint range of motion or the like, such as lateral arm elevation, a movement for strength training, such as push-up, a prescribed body movement, such as yoga, or other movements), information on the types of auxiliary lines used when displaying the movement of the body of the user as an avatar in the form of a set of graphic elements based on point cloud data, and information on positions of the auxiliary lines drawn (positions associated with parts of the body of the user represented by the avatar) associated with each other.

The trainee information database 2601 is a database for managing information on the trainee user. The trainer information database 2602 is a database for managing information on the trainer user. The training history database 2603 is a database for managing a history of trainings performed by the trainee under the instruction of the trainer.

As shown in FIG. 26, the trainee information database 2601 includes an item "trainee ID", an item "name", an item "age", an item "sex", an item "weight", an item "body fat percentage", an item "purpose", an item "ideal figure", an item "display on screen", an item "physical fitness level", and an item "remarks", for example.

The item "trainee ID" is information for identifying the user who receives training.

The item "name" is information indicating the name of the user who receives training.

The item "age" is information indicating the age of the user who receives training.

The item "sex" is information indicating the sex of the user who receives training.

The item "weight" is information indicating the weight of the user who receives training.

The item "body fat percentage" is information indicating the body fat percentage of the user who receives training.

The item "purpose" is information indicating the purpose of the user who receives training. Specifically, the purpose of training of a user identified by a user ID "U001" and a name "Mori" is "to get in shape", and the purpose of training of a user identified by a user ID "U002" and a name "Sato" is "to lose weight". In a situation, the user (trainer) who instructs the user (trainee) who receives training can present a training regimen to the user (trainee) according to the purpose. In another situation, the terminal apparatus 10 or the server 20 may determine a training regimen to be presented to the user based on a learned model or the like described later.

The item "ideal figure" is information indicating an ideal figure of the user who receives training. Specifically, the ideal figure of the user identified by the user ID "U001" and the name "Mori" is "not specified", and the ideal figure of the user identified by the user ID "U002" and the name "Sato" is "OO". As the ideal figure, the user can specify an entertainer in real life or a fictitious existence (which may be a cartoon character if the ideal figure of the user is the body shape of the character, for example). In another situation, the server 20 may determine and present a training regimen based on the "ideal figure" and the "purpose".

The item "display on screen" is information indicating the way of display of the user whose image is taken with a camera or the like. The way of display may be as follows: an image of the user is taken with an RGB camera or the like, and the taken image generated by the camera is displayed as it is; or the movement of the body of the user is measured as point cloud data by a sensor capable of distance measurement (such as a depth camera or light detection and ranging (LiDAR)), and an avatar is displayed based on the point cloud data. Specifically, the "display on screen" of the user identified by the user ID "U001" and the name "Mori" is "avatar", which means that when displaying a movie of the user taken with a camera or the like on the screen, the taken movie of the user is not displayed as it is, but an avatar (such as an avatar based on some character) of the user created based on the taken movie is displayed.

In this way, demands of the user who receives training, such as that the user does not want other persons to see his or her face or how he or she trains in the first lesson or that the user wants to keep his or her privacy, can be met, and the user can receive training with peace of mind.

The item "physical fitness level" is information indicating the physical fitness level of the user who receives training, which is a stepwise evaluation of the exercise capacity of the user. Specifically, when sensing the movement of the body of the user who receives training, the physical fitness level of the user, which can be a criterion for determining what kind of exercise the user can do, for example, is determined at the same time based on the information on the movement of the body of the user. The physical fitness level of the user identified by the user ID "U001" and the name "Mori" is "5", and the physical fitness level of the user identified by the user ID "U002" and the name "Sato" is "2". As methods of determining the physical fitness level, after the movement of the body of the user is sensed, the terminal apparatus 10 or the server 20 may determine the physical fitness level of the user based on a leaned model or the like, or the user (trainer) who instructs the user (trainee) who receives training may determine the physical fitness level of the trainee based on the sensing.

In this way, the user can train according to a training regimen appropriate to the physical fitness level of the user, and therefore can continue training without any stress. In a case of a group training, the server 20 can find users of similar physical fitness levels and make a match between users (a trainer and trainees) so that the found users can train together. For example, when users (trainees) of different physical fitness levels train together, the trainer gives different instructions or different training regimens to different trainees, and some users may lose motivation. However, the physical fitness level can be prevented as described above.

The item "remarks" is information indicating circumstances of the user who receives training that are to be specially considered. Circumstances to be specially considered include considerations concerning the safety of training (such as the safety from the medical point of view or the safety of the training regimen itself). For example, when the user is told by a doctor not to train hard because of his or her hypertension, it is entered in the remarks column. Based on the entries in the item "remarks", the server 20 may determine an optimal training regimen for the user who receives training. Furthermore, the terminal apparatus 10B of the trainer may obtain information of the item "remarks" from the server 20 and present the information to the trainee, thereby providing information useful for the trainer to determine the training regimen for the trainee.

In this way, even if the user has a chronic disease, the server 20 or the like can determine the training regimen to be presented to the user based on the item "remarks", or the trainer can select a training regimen based on the item "remarks", so that the user can continue reasonable training with piece of mind.

The trainer information database 2602 includes an item "trainer ID", an item "name", an item "sex", an item "years of experience", an item "specialty", an item "required physical fitness level", an item "lesson type", and an item "remarks", for example.

The item "trainer ID" is information for identifying the user who instructs the user who receives training.

The item "name" is information indicating the name of the user who instructs the user who receives training.

The item "sex" is information indicating the sex of the user who instructs the user who receives training.

The item "years of experience" is information indicating the years of experience of training instruction of the user who instructs the user who receives training. Specifically, the years of experience of a user identified by a trainer ID "T001" and a name "Tanaka" is "5 years", and the years of experience of a user identified by a trainer ID "T003" and a name "Kato" is "10 years".

Therefore, in a situation, when the user (trainee) who receives training selects a user (trainer) who instructs, for example, the user (trainee) can select a user who instructs with reference to the years of experience and therefore can receive training with more peace of mind. By being selected as the user who instructs based on the information, the user (trainer) who instructs can raise his or her name recognition.

The item "specialty" is information indicating a specialty of training of the user (trainer) who instructs the user (trainee) who receives training. Specifically, the user identified by the trainer ID "T001" and the name "Tanaka" has specialties "yoga" and "exercise", and the user identified by the trainer ID "T002" and the name "Saito" has specialties "strength training" and "exercise".

The server 20 or the like may determine the user (trainer) who instructs the user who receives training based on the information of the item "purpose" and the item "ideal figure" in the trainee information database 2601 for the user who receives training. In this way, it is possible to make a match between a trainee and a trainer appropriate to the purpose of training or the like of the trainee can be made. For example, the server 20 or the like can allocate, to a trainee whose purpose is exercise, a trainer who is good at a training appropriate to the purpose as an instructor.

The item "required physical fitness level" indicates a physical fitness level defined for each user (trainer) who instructs a user (trainee) who receives training that is required for receiving training from the user (trainer). Specifically, the required physical fitness level of the user (trainer) identified by the trainer ID "T001" and the name "Tanaka" is "3 or higher". The physical fitness level of the user (trainee) identified by the user ID "U001" and the name "Mori" described above is "5", so that the user (trainee) has achieved the physical fitness level required for receiving instruction from the user (trainer). On the other hand, the physical fitness level of the user (trainee) identified by the user ID "U002" and the name "Sato" is "2", so that the user (trainee) has not achieved the physical fitness level required for receiving instruction from the user (trainer).

In this way, the user who receives training can receive training appropriate to the physical fitness level of the user. The user who instructs the user who receive training can give training to users of a prescribed level or higher, so that variations of training regimens or achievement levels among the users (trainees) can be reduced, and therefore, the users who receive training can be kept motivated. The server 20 or the like may make a match between a trainer and a trainee based on the item "required physical fitness level" for the trainer and the item "physical fitness level" for the trainee.

The item "lesson type" indicates a type of lesson that can be given by the user (trainer) who instructs the user who receive training. Specifically, the lesson type of the user identified by the trainer ID "T001" and the name "Tanaka" is "private" or "group", and the lesson type of the user identified by the trainer ID "T002" and the name "Saito" is only "private".

This item shows whether the user (trainer) who instructs a user who receive training is suitable for private lessons or group lessons. Therefore, when making a match between a trainer and trainee, the server 20 or the like can sort trainers into one-to-one private lessons and one-to-many group lessons based on the "lesson type". Furthermore, the terminal apparatus 10 of the trainee may presents the "lesson type" of the trainer to the trainee.

The item "remarks" is information on special notes or the like on the user (trainer) who instructs the user who receive training. The special notes include information on objective assessment of achievements of the trainer as a training instructor. Specifically, the user identified as the trainer ID "T001" and the name "Tanaka" is a "XXX Grand Prix winner".

Therefore, in a situation, when the user (trainee) who receives training selects a user (trainer) who instructs the user who receive training, if the information of the item "remarks" is presented on the terminal apparatus 10 of the trainee to the trainee, the trainee can select a trainer by taking the information into consideration. By entering the information, the user (trainer) who instructs the user who receives training can expect to increase the possibility of being selected as an instructor.

The training history database 2603 includes an item "training ID", an item "date and time", an item "meeting ID", an item "trainee ID", an item "trainer ID", an item "sensing result", an item "details of instructions", an item "assessment of trainer", and an item "match-making ID", for example.

The item "training ID" is information for identifying a training involving a trainer and a trainee.

The item "date and time" indicates the date and time of the training.

The item "meeting ID" is information for identifying a communication session in a case where the terminal apparatus 10B of the trainer and the terminal apparatus 10A of the trainee communicate with each other for an online training lesson. For example, information for identifying a communication session includes a URL or the like for an online meeting.

The item "trainee ID" is information for identifying the trainer who gives training.

The item "trainer ID" is information for identifying the trainee who receives training instructions from the trainer.

The item "sensing result" indicates a result of measurement (point cloud data) of the movement of the body of the trainer during training by the terminal apparatus 10A with the measurement unit 30 or a video obtaining by rendering the point cloud data in a virtual space based on settings of a virtual camera (the video includes an avatar representing the movement of the body of the trainee in the form of a set of graphic elements based on point cloud data and an auxiliary line drawn according to the way of movement of the body of the trainee (that is, the type of movement of the body presented to the user, such as lateral arm elevation)), for example.

The item "details of instructions" indicates details of instructions concerning how to move the body of the trainee given by the trainer to the trainee. For example, when the trainer tells the trainee how to move his or her body ("How to move his or her body" includes advice to guide the user into a desired posture, such as advice of the trainer to guide the user into a desired posture when a part (arm or leg) of the body is bent compared with the desired posture), the voice including the instruction or a result of analysis of the voice is retained in the item "details of instructions".

The item "assessment of trainer" indicates an assessment of the trainer by the trainee. For example, after an online training, the terminal apparatus 10A of the trainee presents a screen for inputting assessment of the trainer to the trainee, and receives assessment of the trainer by the trainee.

The item "match-making ID" is information for identifying a match between a trainer and a trainee made by the server 20. In response to a match being made, the trainer can start training of the trainee. However, no training may start even if a match is made.

Example Operation in Fifth Embodiment

In the following, there will be described a series of various kinds of processing performed when the first processor of the terminal of the first user (trainee) of the system 1 senses the movement of the body of the first user as point cloud data, and the first processor transmits information based on the point cloud data on the first user to the terminal of the second user (trainer) in the fifth embodiment.

(Sensing of Movement of First User and Transmission to Terminal of Second User)

Figure 27:
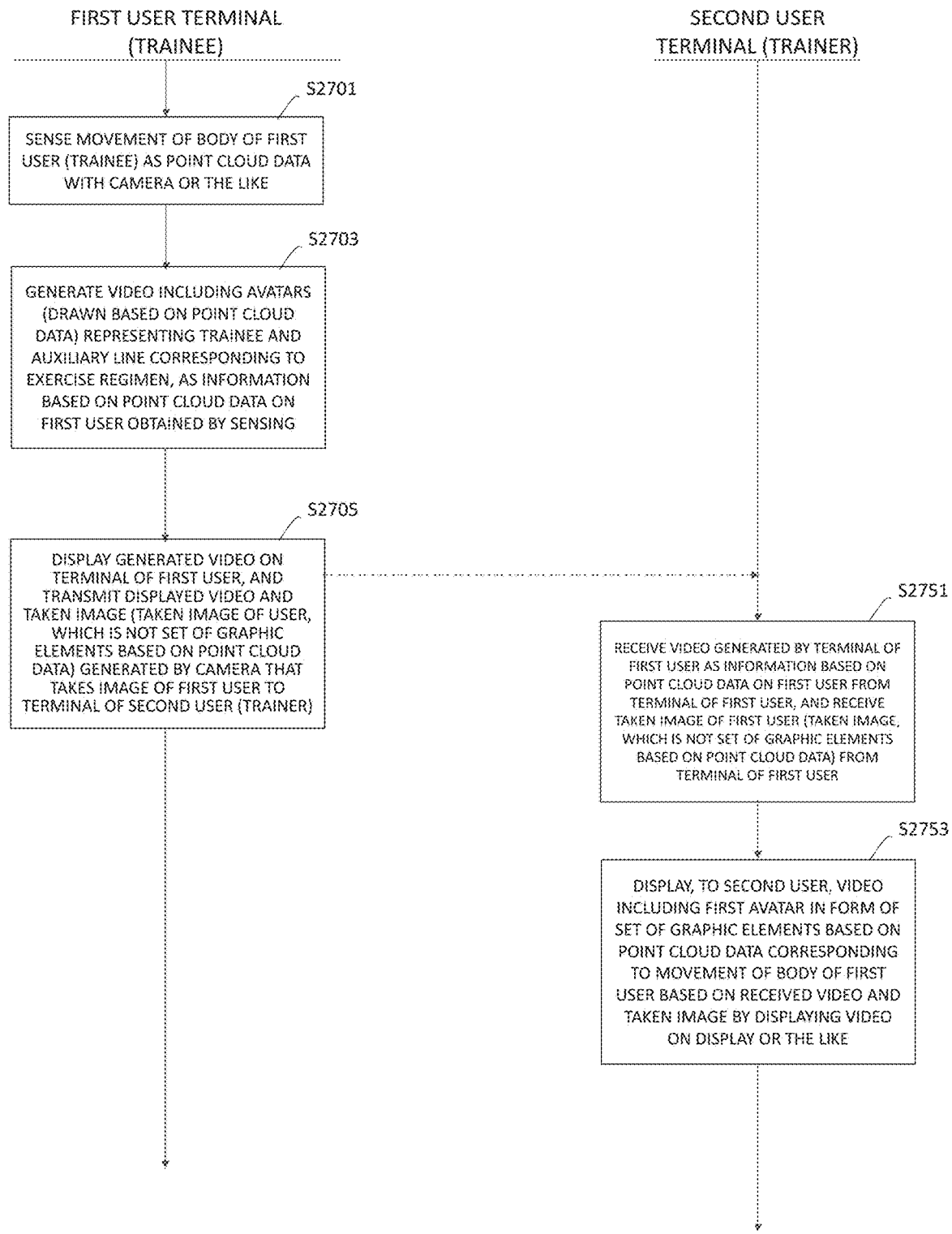
FIG. 27 is a flowchart showing a series of processing in which the movement of the body of a first user is sensed as point cloud data, and information based on the point cloud data on the first user obtained by the sensing is transmitted to a terminal of a second user.

FIG. 27 is a flowchart showing a series of processing in which the movement of the body of the first user is sensed as point cloud data, and information based on the point cloud data on the first user obtained by the sensing is transmitted to the terminal of the second user.

Concerning the terminal apparatus 10 shown in FIG. 1, in the following description, the terminal apparatus 10 of the first user will be referred to as the "terminal apparatus 10A", and a component of the terminal apparatus 10A will be referred to as a "processor 19A" or the like. Similarly, the terminal apparatus 10 of the second user will be referred to as the "terminal apparatus 10B", and a component of the terminal apparatus 10B will be referred to as a "processor 19B" or the like.

In the example in FIG. 27, the terminal apparatus 10A of the first user and the terminal apparatus 10B of the second user transmit and receive video taken with the camera 160 of each terminal and audio picked up by the microphone 141 of each terminal to and from one another by establishing communication therebetween.

For example, the terminal apparatus 10A and the terminal apparatus 10B execute an application for online video meeting, and establish communication based on identification information for participating in the meeting (such as an ID, a URL or the like for the meeting issued by the application).

The terminal apparatus 10A obtains point cloud data on the movement of the body of the first user from the measurement unit 30 or the like. The terminal apparatus 10A puts the point cloud data in a virtual space, performs rendering with virtual cameras arranged in the virtual space at a front position with respect to the body of the first user (along the anteroposterior axis in the description of FIG. 11) and a side position with respect to the body of the first user (along the transverse axis in the description of FIG. 11), and displays the rendering result. The rendering result includes an avatar in the form of the set of graphic elements based on point cloud data representing the first user viewed from the front and an avatar in the form of the set of graphic elements based on point cloud data representing the first user viewed from the side. The terminal apparatus 10A draws an auxiliary line corresponding to the way of movement of the body of the user in association with a region in which the rendering result (the avatar viewed from the front and the avatar viewed from the side) described above is displayed.

The terminal apparatus 10A displays an image of the avatars and the drawn auxiliary lines described above on the screen, and shares the screen with the terminal apparatus 10B through an online video meeting application. In this way, the video of the first user taken by a camera 160A, the audio picked up by the microphone 141, and the image of the avatars and the drawn auxiliary line are transmitted from the terminal apparatus 10A to the terminal apparatus 10B. The second user of the terminal apparatus 10B checks the movement of the body of the first user by watching the video taken by the camera 160A and the image (the image of the avatars and the drawn auxiliary line) on the shared screen, and notifies the first user of an audio or other advice to the first user.

In step S2701, the processor 19A of the terminal apparatus 10A of the first user senses the movement of the body of the first user as point cloud data by means of the measurement unit 30 or the like.

Specifically, the processor 19A displays a regimen for body movements to be performed by the first user to the first user to prompt the first user to make a particular movement (such as a movement of lateral arm elevation or a movement of a training item (such as squats)) for body movement sensing. The processor 19A of the terminal apparatus 10A of the first user takes an image of the particular movement by means of the measurement unit 30 or the like, thereby sensing the movement of the body of the first user as point cloud data.

In step S2703, the processor 19A generates video including the avatar representing the first user (trainee) and the auxiliary line corresponding to the type of the movement performed by the first user (the type of the exercise regimen presented to the first user) as information based on the point cloud data on the first user obtained by sensing by the measurement unit 30 or the like.

In step S2705, the processor 19A displays the video generated in step S2703 on the display 132A of the terminal apparatus 10A. The processor 19A transmits the displayed video (the video including the avatar and the auxiliary line) and a taken image (which is not a set of graphic elements based on point cloud data but an image taken by an RGB camera) generated by the camera 160A taking an image of the first user to the terminal apparatus 10B of the second user.

In step S2751, the processor 19B of the terminal apparatus 10B of the second user receives the video generated by the terminal apparatus 10A (which includes the avatar and the auxiliary line) as information based on the point cloud data on the first user from the terminal apparatus 10A of the first user. The processor 19B receives the taken image of the first user (the taken image that is not a set of graphic elements based on point cloud data) generated in step S2705.

In step S2753, the processor 19B displays, on the display 132B or the like, video including a first avatar in the form of a set of graphic elements based on point cloud data corresponding to the movement of the body of the first user based on the video (which includes the avatar and the auxiliary line) and the taken image received in step S2751. The processor 19B displays the taken image of the first user (which is not a set of graphic elements based on point cloud data) on the display 132B or the like. In this way, the first avatar and the taken image of the first user are presented to the second user as information on the movement of the body of the first user.

In step S2703, the processor 19A may determine various kinds of information on the movement of the first user (such as that what part of the body is easy to move or what part of the body is difficult to move), the physical fitness level of the first user or the like based on the trainee information database 2601 or the like of the server 20. The processor 19A may store the determined information in the storage unit 180 of the terminal apparatus 10A of the first user, or may transmit the determined information to the server 20 so that the information is stored in the trainee information database 2601 of the storage unit 202 of the server 20.

The processor 19A may determine the second user (trainer) to whom the information is transmitted by referring to the trainer information database 2602 based on the result of sensing of the movement of the body of the first user by the measurement unit 30 or the like.

In this way, the user as a trainee can receive training from the optimal instructor based on the information on the movement of his or her body at the start of the training.

In step S2751, the terminal apparatus 10B may receive data of sensing by the measurement unit 30 or the like from the terminal apparatus 10A of the first user, and perform rendering based on the point cloud data in the received information. That is, the terminal apparatus 10B, rather than the terminal apparatus 10A, may render the first avatar representing the movement of the body of the first user based on the point cloud data measured by the terminal apparatus 10A. The terminal apparatus 10B generates video including the first avatar, and displays the generated video on the display 132B or the like. In this processing, the movement of the body of the first user may be drawn from a plurality of points of view, and video including the first avatars drawn from the points of view arranged side by side may be presented to the second user.

In a situation, the terminal apparatus 10B may draw an auxiliary line at a position determined based on a part of the body used for evaluating whether the movement of the body of the first user is ideal or not, and video including the drawn auxiliary line to the second user. For example, when the trainer evaluates whether the movement of the body of the user is ideal or not based on whether the user's back is straightened or not or whether the user's knee is at a predetermined angle with respect to the ground in the exercise being performed by the user, the terminal apparatus 10B displays an auxiliary line corresponding to the shape of the user's body with his or her back straightened in the vicinity of the spine part of the avatar. When evaluating whether the knee is at a predetermined angle with respect to the ground or not, the terminal apparatus 10B displays an auxiliary line bent at the predetermined angle in the vicinity of the knee part of the avatar (or in a region in which the knee part is displayed).

Furthermore, the way of displaying a surface part other than the joints of the body may be modified based on the part of the body used for evaluating whether the movement of the body of the first user is ideal or not, and video modified in the way of displaying a body surface may be presented to the second user.

A surface part other than the joints of the body is a surface recognized as the appearance of the body and is the surface of the abdomen, for example. For example, the terminal apparatus 10B may display different colors for different cases where the movement of the body of the first user is too big compared with the ideal movement and where the movement of the body of the first user is too small compared with the ideal movement. For example, the abdomen is displayed in a warm color when the abdomen is positioned too forward compared with the ideal movement, and is displayed in a cold color when the movement of the abdomen is too small compared with the ideal movement. In this way, the first user or the second user can easily see how the first user should move his or her body in order that the first user can move his or her body in an ideal way. In addition, the user can train by grasping the degree of deviation of the movement of the body of the user from the ideal movement. In addition, since the way of displaying the surface part of the body is modified, in addition to the movements of joints, movements of muscles on the body surface can also be grasped.

In the example described above, concerning the video including the first avatar of the first user displayed on the display 132B or the like, both the image of the first user taken when generating the first avatar and the video of the first avatar are presented to the second user. Alternatively, the terminal apparatus 10B of the trainer may refer to the trainee information database 2601 and display a screen on the display 132 or the like in accordance with the specification in the item "display on screen".

For example, the terminal apparatus 10B may display the movement of the body of the first user as the first avatar (that is, a set of graphic elements based on point cloud data) but may not display the taken image of the first user (which is not a set of graphic elements based on point cloud data). When a plurality of trainees receive training from a trainer, the taken image of each trainee (which is not a set of graphic elements based on point cloud data) may be able to be displayed on the terminal apparatus 10 of the trainer but may not be displayed on the terminal apparatuses 10 of the other trainees who are receiving training from the trainer at the same time. In this way, it is possible that, while both the point cloud data and the taken image of each trainee are disclosed as the sensing result to the trainer, the trainees do not share their taken images, although sharing their avatars (sets of graphic elements based on point cloud data).

In this way, the user can train while keeping his or her privacy.

In another situation, at least any of the processor 19A, the processor 19B, and the processor 29 of the server 20 may define a virtual space, and arrange a first object for displaying the video including the first avatar associated with the first user and a second object for displaying video including a second avatar associated with a third user who trains together with the first user in the virtual space, and the processor 19A or the processor 19B may display video including the first object and the second object in the virtual space on the display 132A or the display 132B or the like.

In this way, when a plurality of users trains together, the users can experience the training in the same virtual space and feel a sense of unity and a sense of accomplishment in the training. Therefore, the motivation of the users can be maintained or improved.

Next, with reference to FIG. 28, a flow of a process in which a trainer instructs a trainee online will be described.

In the following description, an example will be described in which the trainer instructs the trainee with a voice and controls an application running on the terminal apparatus 10 of the trainee with a voice of the trainer, so that the trainer can easily obtain information useful for instruction. Specifically, on the terminal of the trainee, the trainer can control, through voice input, drawing of an avatar based on point cloud data, drawing of an auxiliary line, determination of the type of the movement of the body to be assigned to the trainee and the like.

Figure 28:
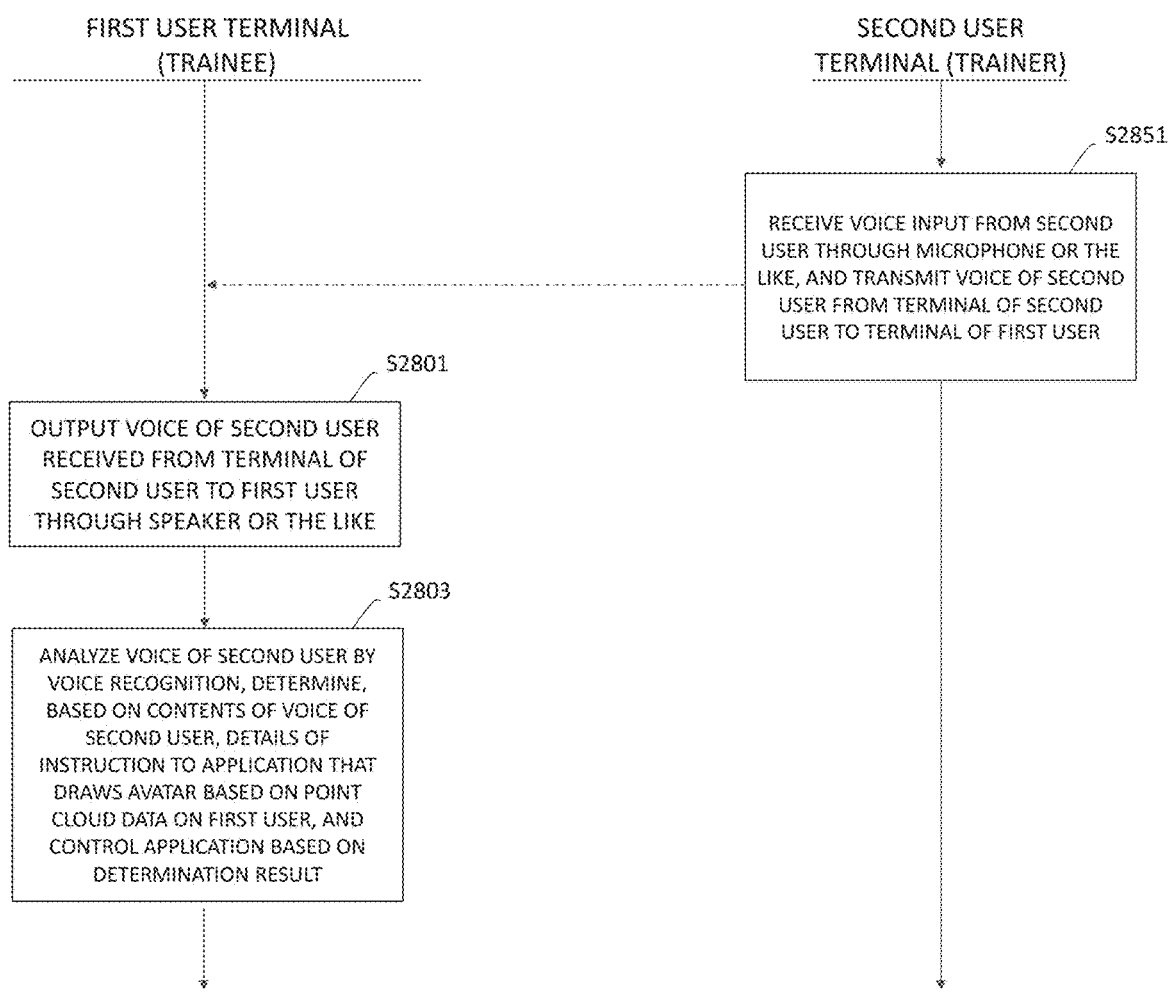
FIG. 28 is a flowchart showing a flow of a process in which a terminal of a trainer receives a voice input from the trainer and transmits the voice input to a terminal of a trainee.

FIG. 28 is a flowchart showing a flow of a process in which the terminal of the trainer receives a voice input from the trainer and transmits the voice input to the terminal of the trainee.

In step S2851, the processor 19B of the terminal apparatus 10B of the second user receives a voice input from the second user through the microphone 141B or the like, and transmits the voice of the second user from the terminal apparatus 10B of the second user to the terminal apparatus 10A of the first user.

In step S2801, the processor 19A of the terminal apparatus 10A of the first user outputs the voice of the second user received from the terminal apparatus 10B to the first user through the speaker 142A or the like.

In step S2803, the processor 19A analyzes the voice of the second user received from the terminal apparatus 10B by voice recognition. The processor 19A determines contents of the voice of the second user based on the result of the analysis by voice recognition. The processor 19A determines an instruction to the application that draws an avatar based on the point cloud data on the first user based on the determined contents of the voice of the second user. The processor 19A controls the application based on the determined instruction to the application.

Specifically, the contents of the voice of the second user determined by the processor 19A include (i) a content for bringing the movement of the body of the first user close to an ideal movement. For example, the processor 19A recognizes a word relating to a part (such as knee, elbow, arm, or shoulder) of the body of the user in the voice of the second user through voice recognition. The processor 19A further recognizes a word (such as "pull your knee toward your chest", "keep your leg horizontal", or "straighten your back") indicating a movement that brings a part of the body of the first user close to an ideal movement in the voice of the second user.

(ii) The contents of the voice determined by the processor 19A include a content indicating a type of movement (such as a training regimen) assigned to the first user for training of the first user.

When the contents of the voice of the second user include a type of movement, the processor 19A sets the type of movement to be assigned to the first user to be the movement specified by the voice of the second user, and selects an auxiliary line associated with the specified type of movement as the auxiliary line associated with the avatar corresponding to the first user. In this way, the second user can more easily evaluate the movement of the body of the first user.

(iii) The contents of the voice determined by the processor 19A include a content that makes the application running on the terminal apparatus 10A that draws the avatar of the first user and the auxiliary line perform particular processing. For example, commands to the application indicated by the voice of the second user include the following.

A command concerning the way of drawing of the avatar (which includes the position of the virtual camera arranged with respect to the point cloud data representing the movement of the body of the first user. That is, the way of drawing of the avatar includes whether the avatar corresponding to the first user is drawn from the front, from the side, or from another direction, for example).

A command concerning the way of drawing of the auxiliary line (which includes drawing the auxiliary line parallel to the movement of the body of the user, drawing the auxiliary line along the shape of the body of the user, or whether to draw an auxiliary line or not, for example).

A command concerning the way of drawing of the avatar in a case where there is a deviation from the ideal movement (for example, a particular part of the body is drawn in different colors when the movement of the particular part is too big or too small compared with the ideal movement).

A command to suspend the application or other commands.

When the processor 19A recognizes the speaker as the trainer through voice recognition (when the speaker is a trainer registered in the trainer information database 2602, for example), the processor 19A may control the application drawing the avatar of the first user based on the voice of the speaker. In this way, the application can be prevented from being accidentally controlled by the other users than the trainer. When the processor 19A communicates with another terminal apparatus, such as the terminal apparatus 10B, through a web conferencing tool or the like, the processor 19A may control the application drawing the avatar of the first user based on information on the speaker identified by the web conferencing tool or the like. For example, the web conferencing tool or the like may display information (such as icons) for identifying the user participating in the meeting, and display the information for identifying the user who is speaking so as to be distinguishable from the information on the other users. When the web conferencing tool or the like is displaying the icon or the like corresponding to the trainer so as to be distinguishable from the icons of the other users, the processor 19A may perform the processing described above by regarding the trainer as the speaker.

For example, when a plurality of trainee receives training from the trainer, depending on the voices of the trainees, the application may be inhibited from performing processing relating to the training (such as processing of changing the type of the movement assigned to the trainees or processing of changing the auxiliary line to be drawn along with the avatar in response to the change of the type of the movement), and the trainer may perform the processing. Then, even if the users speak during training, the users can train as intended by the trainer.

As described above, the second user can change the way of display of the video including the first avatar by instructing the first user with a voice, and can continue instructing the first user based on the changed video including the avatar.

(Sensing of the Movement of the First User and Identification of an Instruction Based on a Learned Model)

Figure 29:
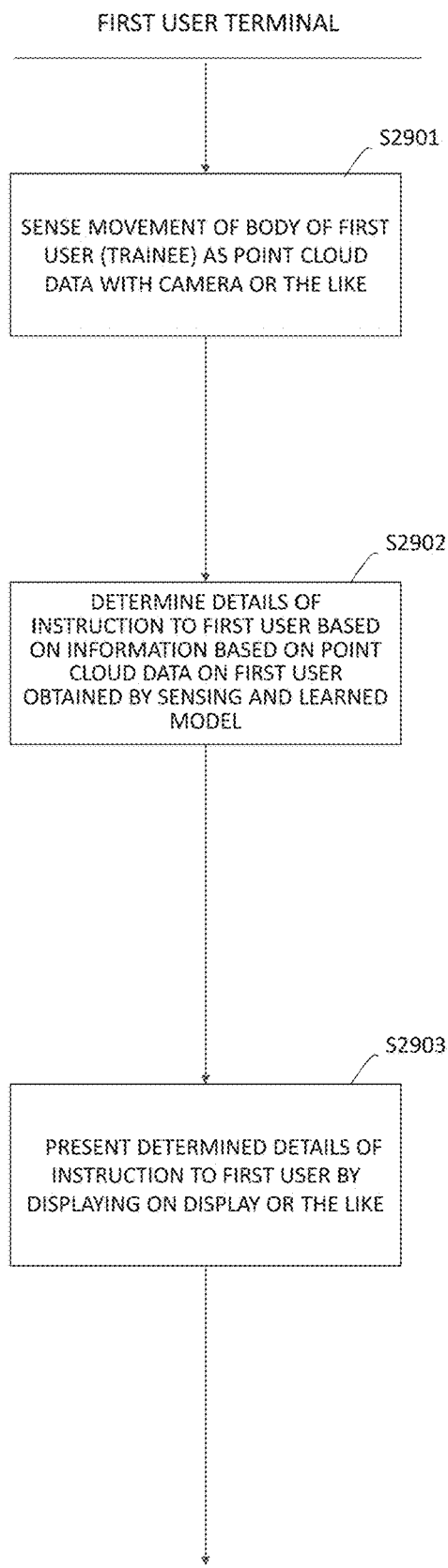
FIG. 29 is a flowchart showing a process in which the movement of the body of the first user is sensed as point cloud data, and an instruction to the first user is identified based on information on the point cloud data on the first user obtained by the sensing and a learned model.

FIG. 29 is a flowchart showing a process in which the movement of the body of the first user is sensed as point cloud data, and an instruction to the first user is identified based on information on the point cloud data on the first user obtained by the sensing and a learned model. Through this process, even if no trainer is present, the trainee can check the movement of his or her body with the learned model.

In step S2901, the processor 19A of the terminal apparatus 10A of the first user senses the movement of the body of the first user as point cloud data by means of the measurement unit 30 or the like.

In step S2902, the processor 19A determines details of instruction to the first user based on information on the point cloud data on the first user and a learned model.

Here, methods of creating a learned model will be described.

(i) For example, information on point cloud data on one or more users is obtained, and then a learned model is created by associating the information on the point cloud data on the one or more users with details of training based on various kinds of information (such as age, weight and purpose), information on the user (trainer) who instructs the user(s) receiving training, and the details of training actually received by the trainee(s), and information on the history of change of the information on the trainee(s) caused by the training, for example.

That is, it can be said that the learned model is a model that learns information on the trainee and details of instruction by the trainer as time-series data and outputs how much the trainee will be changed by training.

The learned model may associate the information based on the point cloud data, which is training data for the learned model, with obtained information on the user (that is, information on the trainee) or information on the trainer who has instructed the trainee. In this way, when selecting a learned model for the trainee, the trainee or trainer can refer to the information on the trainee or the information on the trainer associated with the learned model. Alternatively, the processor 19A or the like may determine the learned model to be proposed to the user as a trainee based on the user information associated with the learned model.

(ii) Alternatively, the learned model may be created using, as training data, time-series data of results of measurement of the movement of the body of the trainee (such as point cloud data and a taken image of the trainee) by the trainer tagging the time-series data (such as a comment concerning the way of moving a part of the body in an ideal manner, the importance of breathing, or that the heartrate is too high and a break is needed).

For example, in a situation, based on the measurement result of the movement of the body of the trainee and the learned model, a training regimen appropriate to the constitution of the user as a trainee, the timing of breathing in the training, the timing when the heartrate rises, the timing of hydration, or the timing of a break can be determined and presented to the user, for example.

For example, in a situation, when the trainee wears a wearable device (such as the watch type, the glasses type, or the ring type) and uses the learned model while the wearable device measures the heartrate, the timing of breathing or the like of the trainee user, the learned model may output details of instruction to be given to the trainee.

In another situation, the exercise intensity (severity of exercise) including calorie consumption may be determined from information concerning the point cloud data on the user to present advice about taking a break or hydration to the user.

(iii) In a method of creating a learned model, a learned model may be created using, as teacher data, the measurement data (measurement history database 283) accumulated as a result of the ROM check described in the first embodiment. For example, a learned model may be created based on the measurement data, a training regimen performed by the user, and a response to a questionnaire or the like input by the user.

In this way, the learned model created based on the measurement data of the ROM check may output the type of exercise to be proposed to the user, details of advice to the user, or the like.

In a method of creating a learned model, a learned model may be created by using, as teacher data, the measurement data (measurement result database 287) accumulated as a result of evaluation of the walking posture of the user described in the second embodiment. For example, a learned model may be created based on the measurement data, a training regimen performed by the user, and a response to a questionnaire or the like input by the user.

In this way, the learned model created based on the measurement data for walking posture evaluation may output the type of exercise to be proposed to the user, details of advice to the user, or the like.

In a method of creating a learned model, a learned model may be created based on measurement data accumulated as a result of estimation of the posture of the user (such as joint positions). Specifically, in a method of the server 20 or the like creating a learned model, a learned model is created based on the result of estimation of the positions of joints of the user, a training regimen performed by the user, and details of advice from the trainer, and the created learned model may be stored.

In this way, the server 20 may determine details of instruction to the user based on information based on the estimation result of the posture of the user and the learned model, and present the determined details of instruction to the user.

Furthermore, the server 20 or the like may store the learned model in association with information on the user whose data has been used as training data for the learned model (the result of estimation of the posture of the user).

Furthermore, the server 20 or the like may determine the exercise intensity of the user in the same manner as described above based on information based on the estimation result of the posture of the user and the learned model. The server 20 may determine details of instruction to the user based on the determination result of the exercise intensity of the user, and present the determined details of instruction to the user.

In step S2903, the processor 19A presents the details of instruction determined by the learned model to the first user by displaying the details of instruction on the display 132A or the like, for example.

Example Screens in Fifth Embodiment

Figure 30:
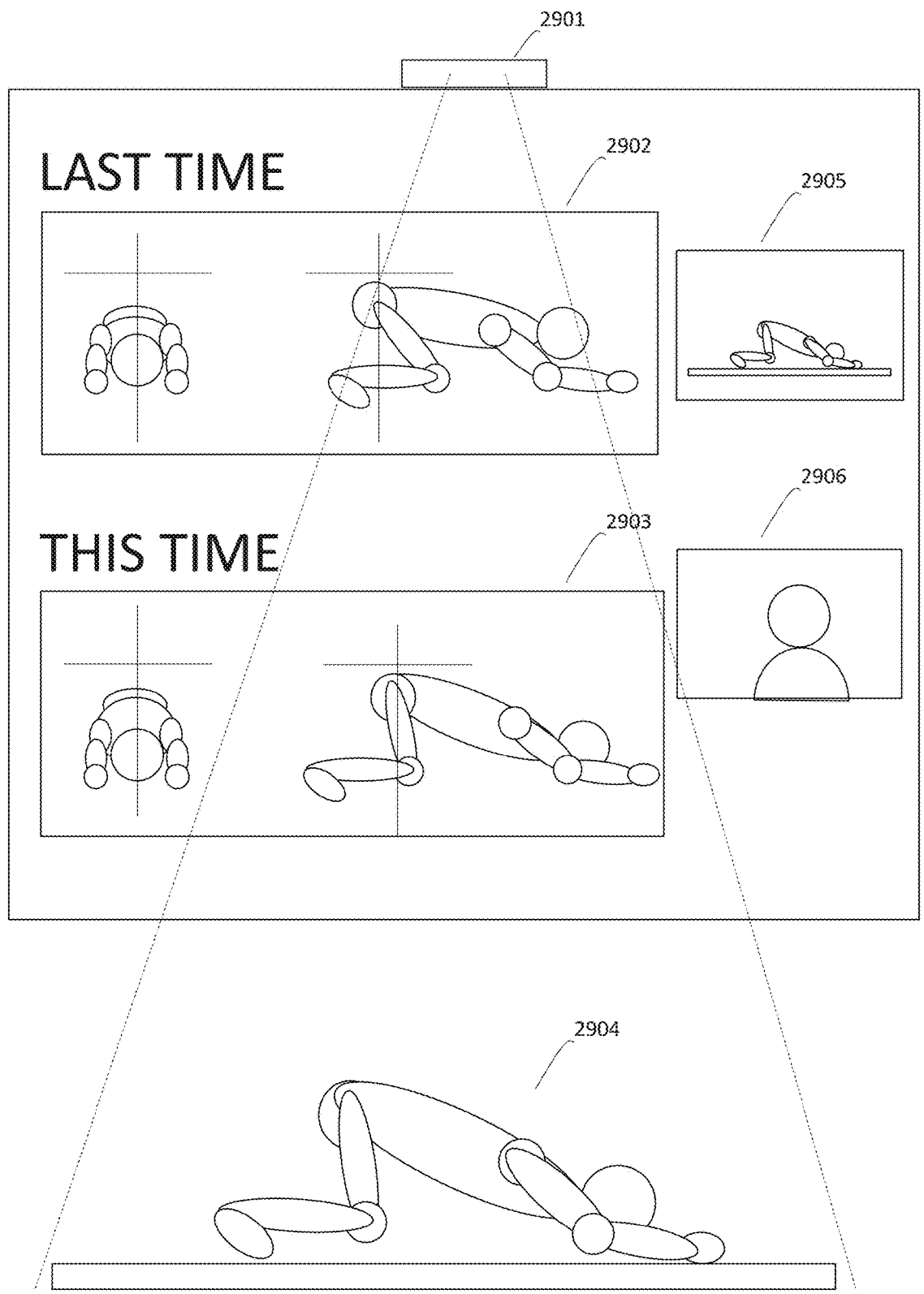
FIG. 30 shows an example screen when a terminal apparatus 10A of the first user senses the movement of the body of the first user as point cloud data and transmits information based on the point cloud data on the first user obtained by the sensing to the terminal of the second user.
Figure 31:
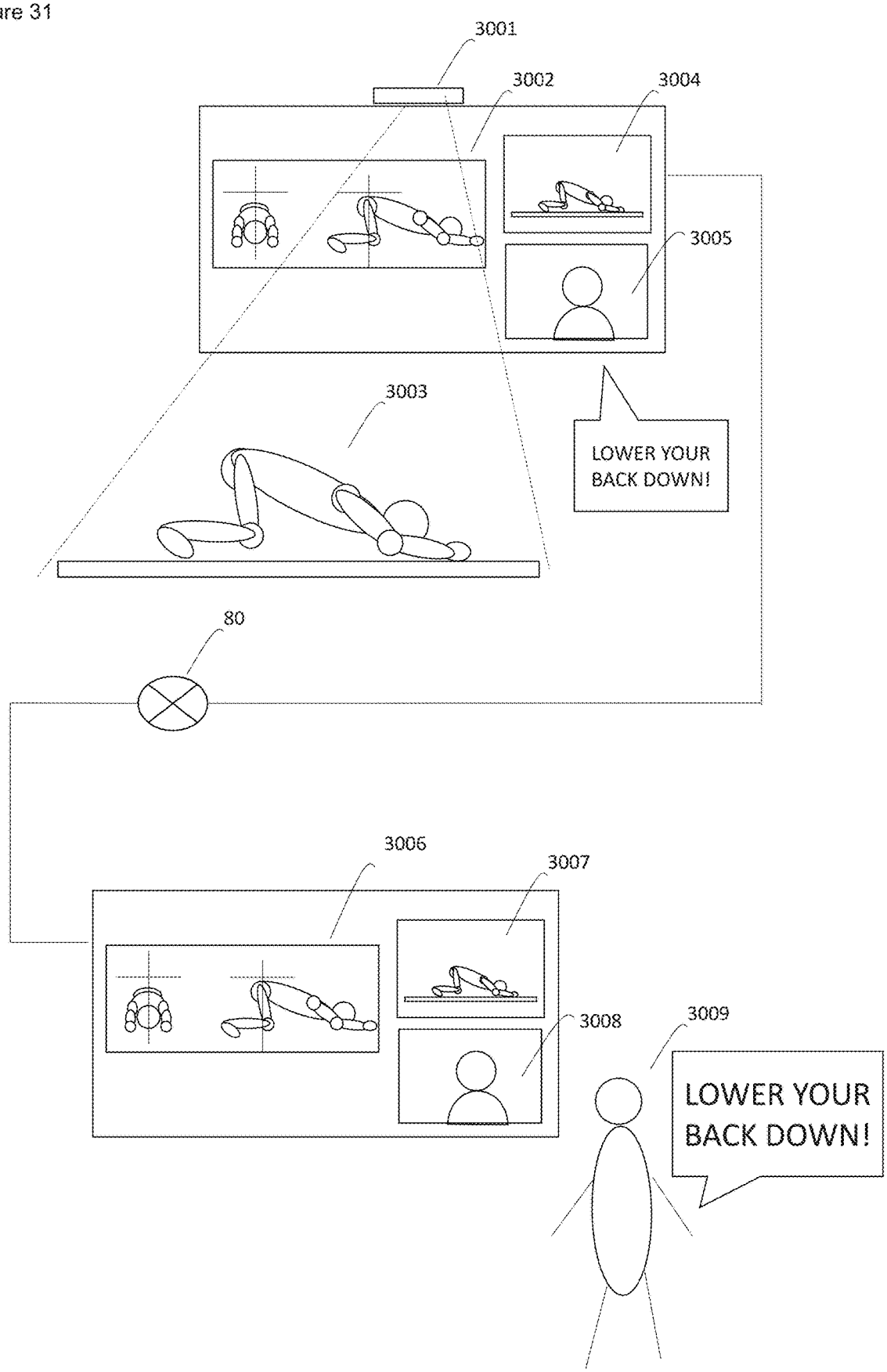
FIG. 31 shows example screens for the first user and the second user and an overall arrangement of the system when the movement of the body of the first user is sensed as point cloud data, and information based on the point cloud data on the first user obtained by the sensing is transmitted to the terminal of the second user.
Figure 32:
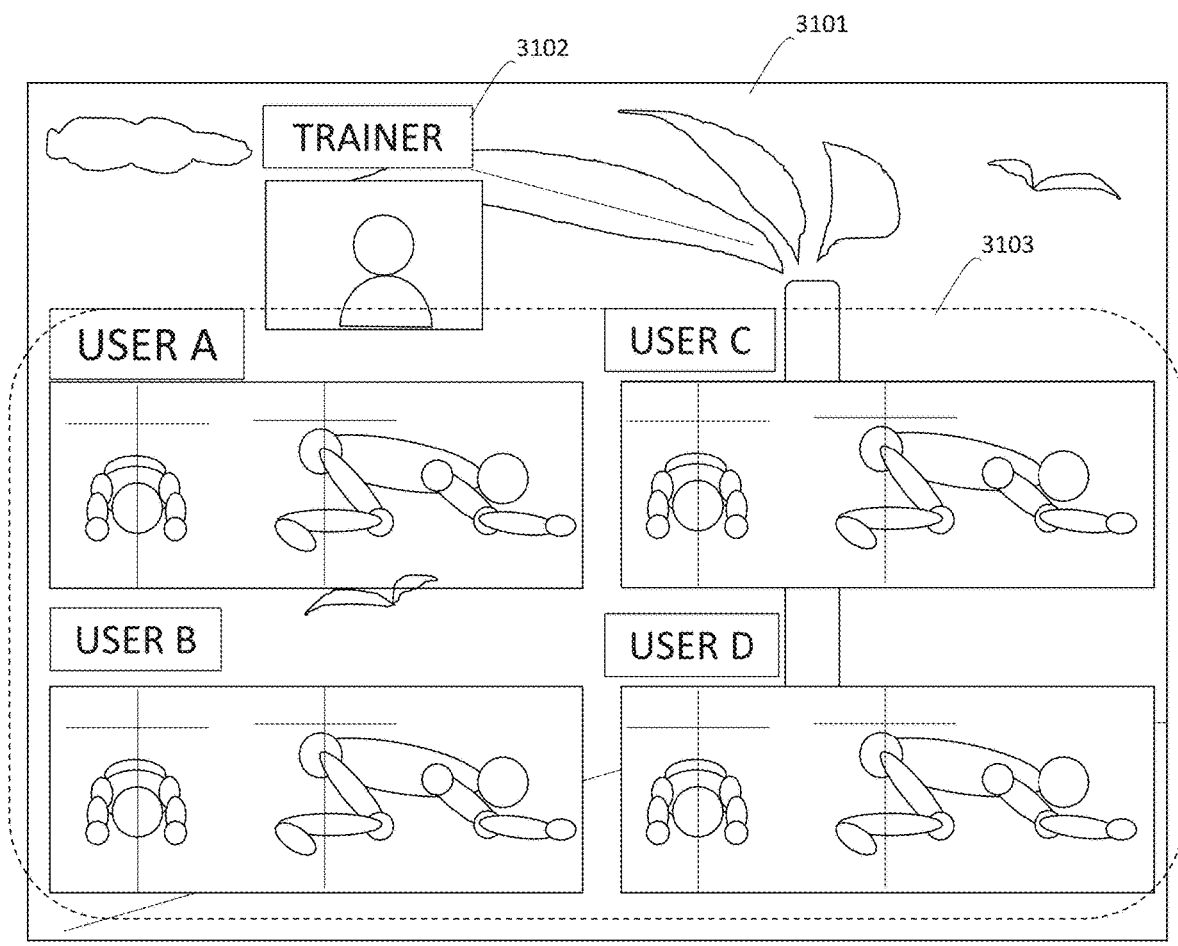
FIG. 32 shows an example screen when the movements of bodies of a plurality of users are sensed as point cloud data, and information based on the point cloud data on the users obtained by the sensing is transmitted to a defined virtual space.

FIG. 30 to FIG. 32 are diagrams showing example screens displayed on the terminal apparatus 10.

FIG. 30 shows an example screen when the terminal apparatus 10A of the first user senses the movement of the body of the first user as point cloud data and transmits information based on the point cloud data on the first user obtained by the sensing to the terminal of the second user.

In FIG. 30, a camera 2901 of the measurement unit 30 is an apparatus for sensing the movement of the body of the first user.

Specifically, the camera 2901 takes an image of the first user through an image-taking part of the camera 2901. The camera 2901 is configured to be capable of measuring distance and direction, and is an RGB-D camera or a camera based on the laser imaging detection and ranging (LIDAR) technology, for example.

A last-time window 2902 is a window for displaying an image including the avatar (that is, an image drawn based on point cloud data) of the first user in the last training of the same type when the first user perform training. For example, the terminal apparatus 10A obtains the point cloud data representing the movement of the body of the user in the past training of the first user by referring to the training history database 2603 of the server 20.

In the example shown, in the last-time window 2902, the avatar of the first user is displayed as a set of figures, such as circles. However, the avatar of the first user may be displayed as a set of graphic elements based on point cloud data measured by the measurement unit 30.

By displaying an avatar based on point cloud data from past training of the first user, the first user and the second user can easily check how much the movement of the body of the first user has been changed by training. For example, when the first user makes a movement of curling up his or her body holding his or her knees to his or her chest, the terminal apparatus 10A displays the last-time window 2902, which is a previous-training window. The first user or the second user can compare what is displayed in a this-time window 2903 described later with the last-time window 2902. Therefore, the first user can check a change of the movement of his or her body.

The terminal apparatus 10A may constantly display the last-time window 2902 or may turn on and off the display of the window in response to an instruction from the first user or the second user. As the avatar of the first user, the terminal apparatus 10A may display images of the first user drawn from a plurality of viewpoints, such as front, side, or above. Furthermore, an auxiliary line can also be drawn at a position based on a part of the body used for evaluating whether the movement of the body of the first user is ideal or not. In the example shown, in the last-time window 2902, auxiliary lines are drawn in association with the region where the avatar of the first user is displayed.

The this-time window 2903 is a window for displaying an image of the avatar of the first user based on the result of sensing by the measurement unit 30 when the first user is performing training.

In the example shown, a first user 2094 is displayed, and the first user is actually performing training on a mat or the like. The terminal apparatus 10A takes an image of the movement of the first user by means of the camera 2901 to obtain information on point cloud data on the first user.

A first user image 2905 is an image of the first user taken by the camera 160 or the like. In the first user image 2905, the first user is not drawn as a set of graphic elements based on point cloud data but as an image taken by a 2D camera or the like. That is, in the first user image 2905, a taken image equivalent to what would be seen in person is displayed.

In this way, the terminal apparatus 10A allows the first user to compare the actual image of the first user with an image based on information on point cloud data. Furthermore, in response to specification by the first user, the terminal apparatus 10 may display an icon, a character string or the like representing the first user that can be identified by the second user or the like while displaying no taken image of the first user as the first user image 2905.

A second user image 2906 is an image of the second user who instructs the user who receive training. The terminal apparatus 10A receives a taken image of the second user from the terminal apparatus 10B of the second user, and displays the taken image of the second user as a second user image 2906. In this way, in the training, the first user and the second user can communicate with each other by seeing each other's image through video call between the terminals via a network 80 or the like.

FIG. 31 shows example screens for the first user and the second user and an overall arrangement of the system when the movement of the body of the first user is sensed as point cloud data, and information based on the point cloud data on the first user obtained by the sensing is transmitted to the terminal of the second user.

In FIG. 31, a camera 3001 is an apparatus for sensing the movement of the body of the first user as point cloud data, as with the camera 2901 in FIG. 30.

This-time windows 3002 and 3006 are windows for displaying an image of the first user as a set of graphic elements based on point cloud data when the first user is performing training, as with the this-time window 2903 in FIG. 30. The this-time window 3002 is displayed on the display 132A or the like of the terminal apparatus 10A of the first user, and the this-time window 3006 is displayed on the display 132B or the like of the terminal apparatus 10B of the second user.

A first user 3003 is shown as being actually performing training on a mat or the like, as with the first user 2904 in FIG. 30.

First user images 3004 and 3007 are not video including an avatar but actual images of the first user taken by the camera 2901, as with the first user image 2905 in FIG. 30. The first user image 3004 is displayed on the display 132A or the like of the terminal apparatus 10A of the first user, and the first user image 3007 is displayed on the display 132B or the like of the terminal apparatus 10B of the second user.

Second user images 3005 and 3008 are images of the second user who instructs the user who receives training, as with the second user image 2906 in FIG. 30. The second user image 3005 is displayed on the display 132A or the like of the terminal apparatus 10A of the first user, and the second user image 3008 is displayed on the display 132B or the like of the terminal apparatus 10B of the second user. In a situation, as shown in this example screen, in response to a voice input operation by the second user, the speaker 142A or the like of the terminal apparatus 10A may output the voice of the second user (such as a voice "Lower your back down!").

The second user 3009 is instructing based on the image of the first user by watching the image displayed on the display 132B or the like of the terminal apparatus 10B. The second user can instruct the first user with a voice. The second user can advise the first user about the movement of the body by checking, as the taken image of the first user, one or both of an image based on point cloud data and an image equivalent to what would be seen in person. The set of graphic elements based on point cloud data is reduced in the amount of information given to the second user compared with the image of the first user actually taken, so that the second user can more easily see the movement of the body of the first user and more easily evaluate the movement and give advice.

FIG. 32 shows an example screen when the movements of a plurality of users are sensed as point cloud data, and information based on the point cloud data on the users obtained by the sensing is transmitted to a defined virtual space.

In FIG. 32, a virtual space 3101 is a space in which one or more users who are receiving training can each put an object for displaying video including an avatar associated with himself or herself.

A trainer image 3102 is an image of the second user who instructs a user who receives training. The terminal apparatus 10B of the second user takes an image of the second user, and transmits the image to a computer that controls the virtual space as required.

A user image region 3103 is a region in which images of the one or more users performing training are displayed. The image displayed in the region may be only video including an avatar in the form of a set of graphic elements based on point cloud data associated with the user or a combination of the video including an avatar and an image of the user actually taken that is different from the video including an avatar.

In this way, each user can put video including an avatar associated with the movement of the body of the user in the virtual space. Since each user can see the images of the avatars of the users put in the virtual space, each user can feel as if the user is performing training in the same place as the other users. This can allow each user to feel a sense of unity and a sense of accomplishment in the training, and can motivate each user to continue training. In response to a match being made between a trainer and trainees who will receive training, the server 20 may enable the terminal of the trainer and the terminals of the trainees to communicate with each other, and build a virtual space in any of the server 20 or the terminal of each user, for example. That is, the computer serving as a host for the communication between the users may be specified by the server 20.

6. Example Modifications

Example modifications of this embodiment will be described. That is, the following implementations are possible.

(1) In the examples in FIG. 31 to FIG. 32 described above, examples have been described in which an avatar based on the result of sensing of a user when the user received training in the past and an avatar based on the result of sensing of the user currently receiving training from a trainer are displayed side by side.

In addition, an avatar of a trainee may be displayed side by side with the avatars based on time-series point cloud data on the trainee obtained by sensing over time during the training with the trainer.

That is, an avatar based on point cloud data obtained by sensing at the timing of start of the training or within a certain time period from the start of the training and an avatar based on the result of real-time sensing in the training under the instruction of the trainer or the result of sensing at the timing when a certain time has elapsed since the start of the instruction by the trainer may be displayed side by side by the terminal apparatus 10A.

In one session of training, if the movement of a part of the body of the trainee has come close to an ideal movement, it may be reflected in the displayed avatar by highlighting the part compared with the other parts. For example, the processor 19A may evaluate how much the movement of the body of the trainee has come close to the auxiliary line drawn along with the avatar, and make a drawing on the screen based on the evaluation result. For example, if the movement of straightening the trainee's knee in a particular direction has come close to an ideal movement, the processor 19A draws an auxiliary line extending in the particular direction. The processor 19A may change the way of drawing of the knee part of the avatar or the auxiliary line associated with the knee part as the movement of the knee comes close to the auxiliary line when the trainee is moving his or her body.

As a result, the trainee can easily check how much the trainee after one session of training is different from the trainee before the training or how much the trainee has changed in the course of the training. Therefore, the trainee can easily check how much the trainee has changed (for example, the trainee has come close to his or her goal). Therefore, the motivation of the trainee to continue training can be further improved.

In the case of online training, the amount of visual information is smaller than in the case of in-person training (since the trainer can see the trainee with his or her own eyes in the case of in-person training, whereas the trainer see a two-dimensional image on the display in the case of online training), so that the quality of communication and experience may be low. In the case of online training, in addition, it is extremely difficult for the trainer to touch the body of the trainee. Therefore, by feeding back the result of training to the trainee as described above, the trainee can be motivated to continue training online.

When the movement of the body of the user has come close to an ideal movement in one session of training as described above, a learned model may be created based on the sensing result.

(2) In the embodiments described above, examples have been described in which an avatar is displayed based on the result of sensing of the movement of the body of a user, and an avatar corresponding to the trainer is displayed to the trainee in online training between the trainer and the trainee.

As an alternative, the trainer and the trainee may not communicate with each other, and the user may train by checking the movement of his or her body through the avatar described above for himself or herself. For example, on the terminal apparatus 10A, the user may set a way of movement of the body, draw an auxiliary line or the like in accordance with the set way of movement of the body, and notify the user of the way of movement of the body (or provide the user with a guide how to move his or her body), and the measurement unit 30 or the like may sense the movement of the body of the user.

(2-1) A Method of Sensing the Movement of the Body of the User

The terminal apparatus 10A presents, to the user, the result of sensing of the movement of the body of the user in the form of an avatar or the like. As described in the first and second embodiments, for example, the terminal apparatus 10A can determine the positions of joints of the body of the user and estimate the skeleton (a set of bones) (FIG. 12).

The terminal apparatus 10A may estimate the posture of the user based on the result of estimation of the positions of joints and the skeleton of the user as described below.

Based on a result of imaging of the user as a subject (a two-dimensional movie), the terminal apparatus 10A estimates the posture of the user in the movie without point cloud data.

That is, the terminal apparatus 10A may take an image of the user by means of a camera that is not configured to optically measure distance to the subject unlike LiDAR or the like, and estimate the positions of joints, the skeleton or the like as the posture of the user in the taken image based on the result of the imaging.

For example, by preparing a learned model that receives the taken image as an input and outputs the posture of the person who is the subject of the taken image, such as the positions of joints or the skeleton of the person, the terminal apparatus 10A may be able to estimate the posture of the user based on the result of imaging of the user and the learned model.

Such a learned model may be created by preparing training data including information on the positions of joints, the skeleton or the like in the taken image of the person who is the subject of the taken image and training a computer with the training data.

As described in other embodiments, the terminal apparatus 10A senses, as point cloud data, the movement of the body of the user by means of a camera installed in the terminal apparatus 10A or the like or the measurement unit 30 or the like, and estimates the positions of joints, the skeleton or the like based on the result of the sensing.

(2-2) Drawing of an Auxiliary Line Based on the Result of Estimation of the Positions of Joints and the Skeleton The terminal apparatus 10A may draw an auxiliary line serving as a reference for the user to move his or her body based on the result of estimation of the posture of the user. The terminal apparatus 10A may draw the auxiliary line based on the result of estimation of the posture of the user as follows.

The terminal apparatus 10A or the like determines the position of an auxiliary line to be drawn based on the type of movement of the body to be presented to the user (such as a movement for evaluating the movement of trunk muscles or the joint range of motion, such as lateral arm elevation, or a movement for strength training), the positions of joints, and the result of estimation of the skeleton.

For example, some types of movement of the body include a movement that involves a certain amount of movement of the body of the user (such as a movement of stepping a foot forward for evaluation of the joint range of motion). The terminal apparatus 10A displays an avatar to the user, and at the same time draws an auxiliary line serving as a guide for the amount of body movement based on the result of estimation of the position of a particular joint of the user.

For example, when the user makes a movement of stepping a foot forward, the terminal apparatus 10A first prompts the user to assume a predetermined posture (for example, to assume an upright posture before stepping a foot forward) through audio, video or the like. Based on the positions of joints (such as the shoulder joints, the hip joints, or the knee joints) in this posture, the terminal apparatus 10A estimates the step length of the user (for example, the required step length of the user can be determined based on the height and the leg length of the user), and determines the position of the auxiliary line to be drawn based on the estimated step length and the result of estimation of the positions of joints.

For each type of movement of the body of the user, the terminal apparatus 10A may store the positions of joints to be referred to when drawing an auxiliary line and the position of the auxiliary line drawn with respect to the positions of joints associated with each other in advance.

Figure 33:
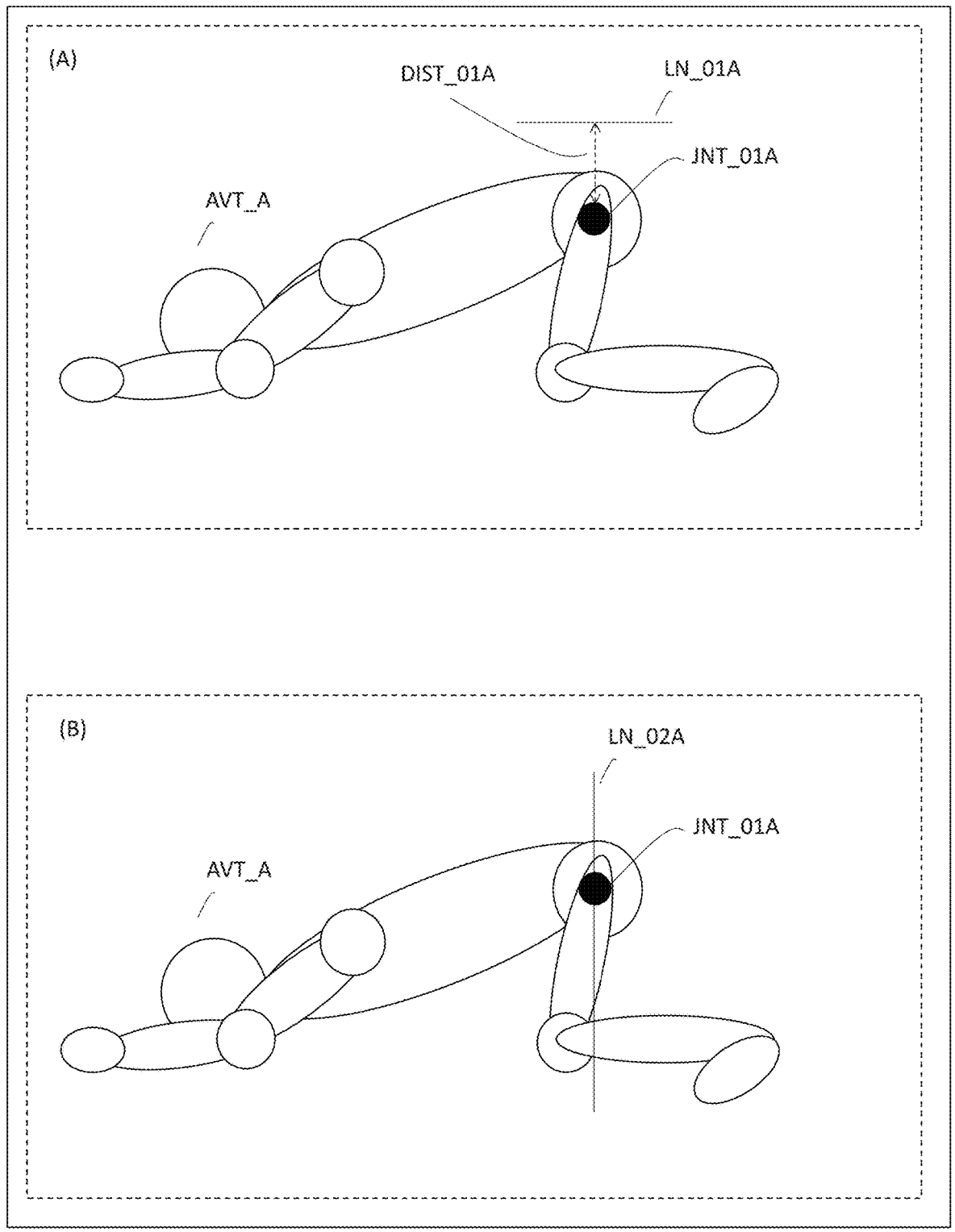
FIG. 33 is a diagram showing a concept of a process in which the terminal apparatus 10A draws an auxiliary line based on the result of estimation of the posture of the user.

FIG. 33 is a diagram showing a concept of a process in which the terminal apparatus 10A draws an auxiliary line based on the result of estimation of the posture of the user.

In the example (A) in FIG. 33, the terminal apparatus 10A senses the movement of the body of the user as point cloud data. Based on the result of sensing, the terminal apparatus 10A stores three-dimensional object data on an avatar AVT_A corresponding to the user. Based on the three-dimensional object data on the avatar AVT_A, the terminal apparatus 10A estimates the positions of joints (such as the joints shown in FIG. 12) of the user represented by the three-dimensional object data. In the example (A), the terminal apparatus 10A determines a joint position JNT_01A, the coordinates of which are the result of estimation of the position of the hips joint of the user represented by the avatar AVT_A when the three-dimensional object data on the avatar is put in a virtual space.

In the example (A) in FIG. 33, in accordance with the type of movement of the body of the user, the terminal apparatus 10A determines to arrange three-dimensional object data on an auxiliary line LN_01A at a position at a distance of a certain distance DIST_01A from the joint position JNT_01A. The terminal apparatus 10A may set the certain distance based on the physique of the user (which is obtained by measuring the height, the siting height, the shoulder width or the like based on the result of sensing of the movement of the body of the user). The reference amount of movement of the body of the user can be determined by the physique of the user. In the example (A), the terminal apparatus 10A puts the three-dimensional object data on the auxiliary line LN_01A in parallel with the ground on which the user moves his or her body.

In the example (B) in FIG. 33, the terminal apparatus 10A puts three-dimensional object data on an auxiliary line LN_02A based on the joint position JNT_01A in such a manner that the auxiliary line LN_02A is overlaid on the joint position JNT_01A and is perpendicular to the ground on which the user moves his or her body.

Figure 34:
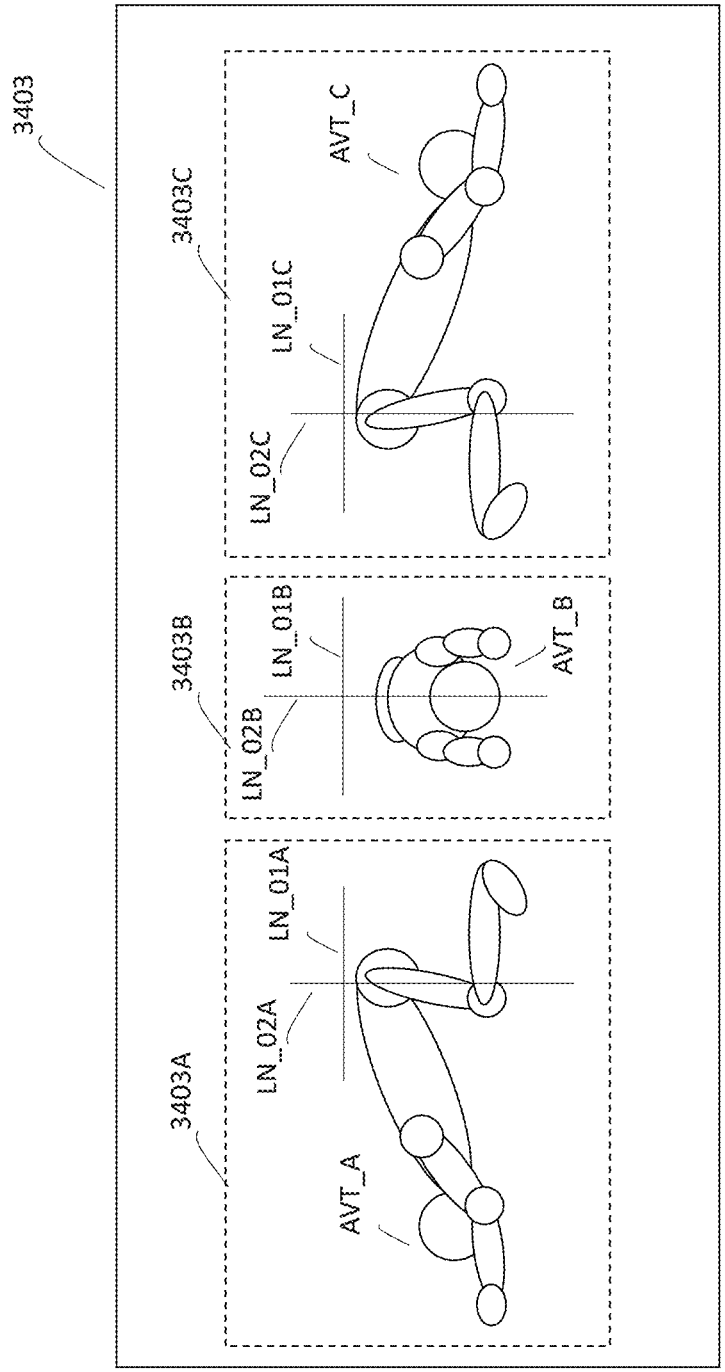
FIG. 34 shows an example screen presented to the user.

FIG. 34 shows an example screen presented to the user.

As shown in FIG. 34, in one screen 3403, the terminal apparatus 10A arranges results of drawing of the avatar corresponding to the user from a plurality of points of view as the result of sensing of the movement of the body of the user, as shown in a left window 3403A, a front window 3403B, and a right window 3403C.

For example, the terminal apparatus 10A arranges three-dimensional object data (what can be recognized as an avatar by the user) corresponding to the result of sensing of the movement of the body of the user (such as point cloud data) in the virtual space. In the virtual space, the terminal apparatus 10A sets a plurality of virtual cameras (such as a virtual camera for the right window, a virtual camera for the front window, and a virtual camera for the left window) with respect to the three-dimensional object data corresponding to the result of sensing of the user. In this way, the terminal apparatus 10A can present the results of drawing of the avatar corresponding to the user from a plurality of points of view to the user.

As shown in the drawing, the terminal apparatus 10A may not present the result of estimation of the skeleton (a set of bones) to the user, while presenting the avatar. For example, the user probably has fewer opportunities to see the result of estimation of the skeleton (a set of bones) with his or her own eyes in daily life than those to see himself or herself in the mirror or the like. Therefore, if the terminal apparatus 10A presents an avatar to the user but does not present the result of estimation of the skeleton (a set of bones), the user will see the avatar, which has a figure similar to that of himself or herself seen with his or her own eyes in daily life, and can feel immersed in the virtual space as if the avatar displayed on the screen was himself or herself.

In the virtual space, the terminal apparatus 10A arranges three-dimensional object data on auxiliary lines LN_01A and LN_02A in association with the three-dimensional object data corresponding to the user. Therefore, the terminal apparatus 10A can display the auxiliary lines along with the avatar corresponding to the user by performing rendering according to the settings of the virtual cameras.

Specifically, in the left window 3403A, the terminal apparatus 10A draws the auxiliary line LN_01A and the auxiliary line LN_02A in association with the avatar AVT_A and displays the auxiliary lines and the avatar to the user. In the front window 3403B, the terminal apparatus 10A draws an auxiliary line LN_01B and an auxiliary line LN_02B in association with an avatar AVT_B and displays the auxiliary lines and the avatar to the user. In the right window 3403C, the terminal apparatus 10A draws an auxiliary line LN_01C and an auxiliary line LN_02C in association with an avatar AVT_C and displays the auxiliary lines and the avatar to the user.

(2-3) Methods of Evaluating the Movement of the Body of the User.

(i) As described above, the terminal apparatus 10A does not display the result of estimation of the skeleton (a set of bones) to the user, although displaying the avatar. In this way, the terminal apparatus 10A makes the user feel as if the avatar was a projection of himself or herself, thereby making the user concentrate on moving his or her body, training or the like. However, in evaluating the movement of the body of the user, the terminal apparatus 10A can use the result of estimation of the skeleton (a set of bones) of the user in order to evaluate whether the posture of the user is desirable or not or whether the movement of the body of the user is ideal or not for a type of movement of the body.

For example, in the example in FIG. 34, if the user desirably bends his or her keens so that the thighs are vertical, the terminal apparatus 10A can determine whether or not the posture of the user is desirable based on the result of estimation of the knees of the skeleton (a set of bones) of the user (that is, based on whether the thighs are vertical or not).

(ii) The terminal apparatus 10A may evaluate the movement of the body of the user based on the three-dimensional object data (such as point cloud data) forming the avatar, which is the result of sensing of the movement of the body of the user, and the three-dimensional object data corresponding to the auxiliary lines.

For example, the terminal apparatus 10A may evaluate whether the movement of the body of the user is ideal or not by determining whether the three-dimensional object data forming the avatar of the user (such as the avatar AVT_A in the left window 3403A) and the three-dimensional object data corresponding to the auxiliary line (such as the auxiliary line LN_01A in the left window 3403A) have collided with each other or come close within a certain distance, for example.

When sensing the movement of the body of the user without using point cloud data (such as when taking a two-dimensional image of the user), the terminal apparatus 10A may generate three-dimensional object data corresponding to the body of the user based on the result of sensing (two-dimensional taken image data). The terminal apparatus 10A may evaluate whether the movement of the body of the user is ideal or not based on whether the three-dimensional object data and the three-dimensional object data corresponding to the auxiliary line have collided with each other or come close within a certain distance, for example.

When sensing the movement of the body of the user without using point cloud data (when taking a two-dimensional image of the user), the terminal apparatus 10A may estimate the posture (the positions of joints or the skeleton) of the user in the two-dimensional image as described above (using a learned model that estimates the posture as described above), and draw an auxiliary line as object data in the two-dimensional image based on the estimation result. For example, from the positions of joints (such as the hip joints or the shoulder joints) of the user to be estimated in the two-dimensional image, the terminal apparatus 10A determines the position of the auxiliary line to be drawn as object data in the two-dimensional image according to the type of the movement of the user. The terminal apparatus 10A may evaluate whether the movement of the body of the user is ideal or not based on whether the two-dimensional image corresponding to the user and the auxiliary line drawn as object data have collided with each other or come close within a certain distance, for example.

(2-4) Example Screens Presented to the User for Measuring Specific Movements of the Body (A) Standing Alignment When the user is in a particular posture, such as a standing posture, the user can keep a good posture by making an adjustment not to lean to the front, rear, left, or right.

Figure 35:
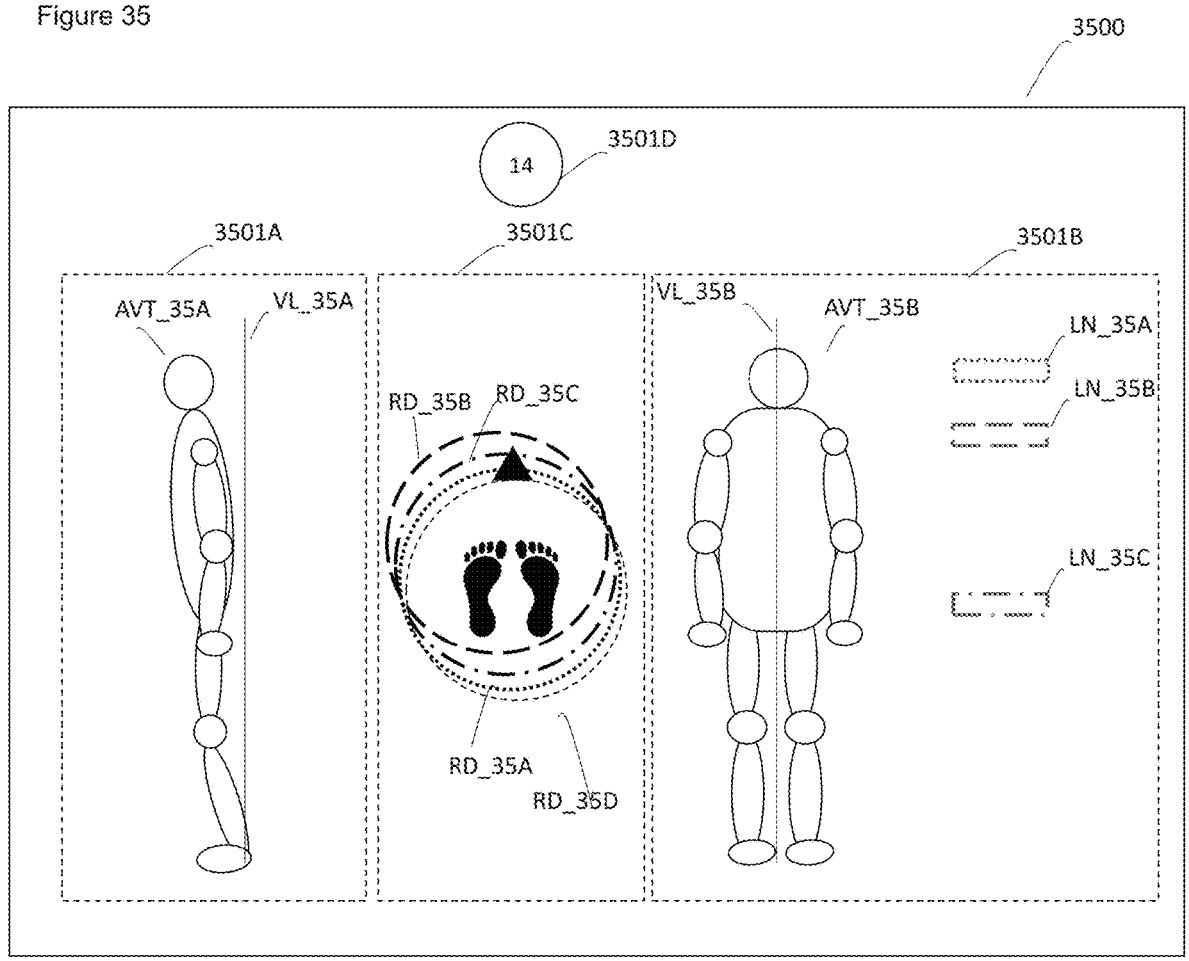
FIG. 35 is a diagram showing an example screen for the user in a standing posture to adjust a forward, backward, left or right leaning of the body, displayed on the terminal apparatus 10A.

FIG. 35 is a diagram showing an example screen for the user in a standing posture to adjust a forward, backward, left or right leaning of the body, displayed on the terminal apparatus 10A.

Figure 36:
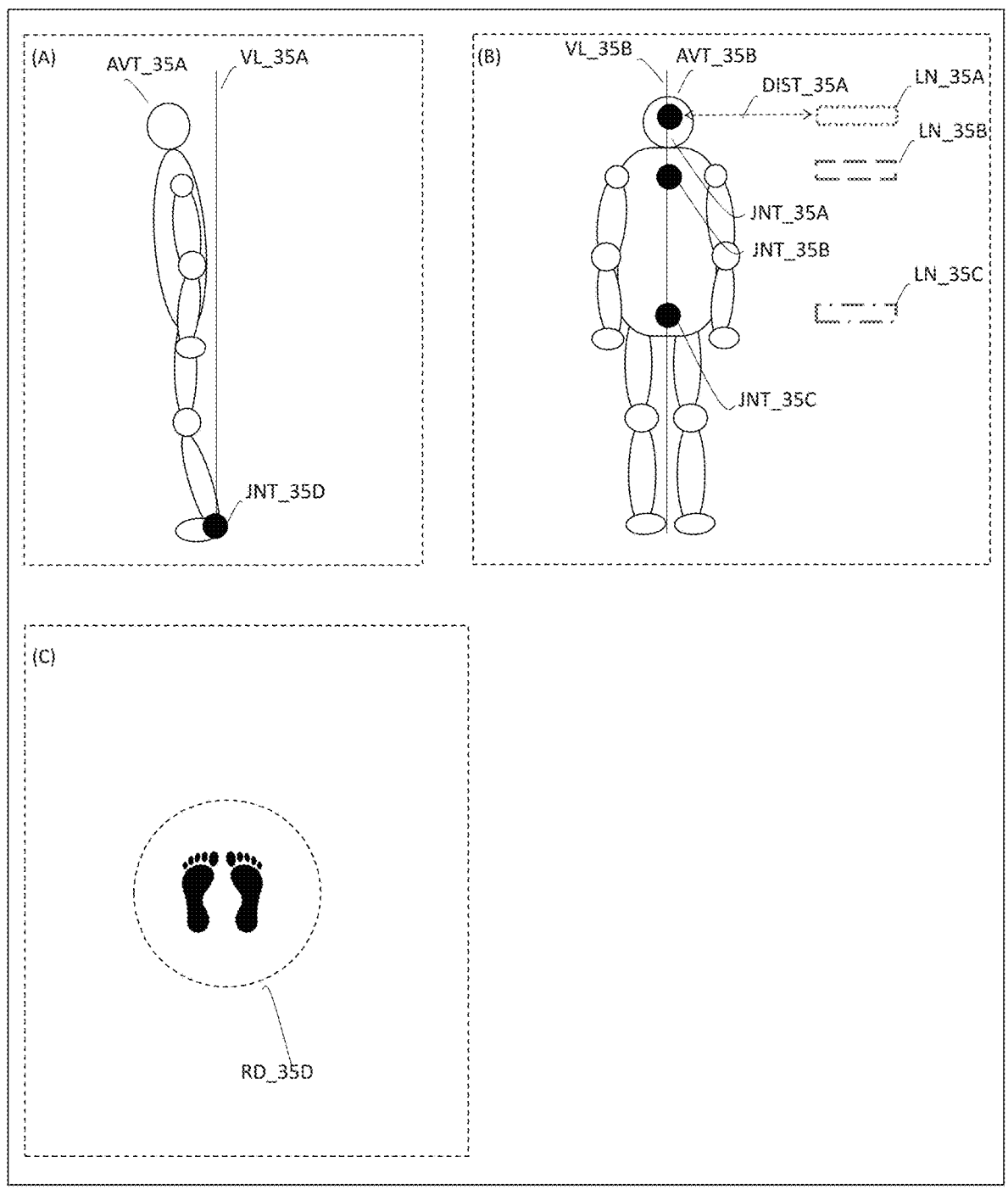
FIG. 36 is a diagram showing a process of determining the position of a figure object to be drawn that serves as a guide for movement of the body of the user based on the result of estimation of the position of a particular part of the user.

FIG. 36 is a diagram showing a process of determining the position of a figure object to be drawn that serves as a guide for movement of the body of the user based on the result of estimation of the position of a particular part of the user.

As shown in FIG. 35, in one screen 3500, the terminal apparatus 10A arranges results of drawing of the avatar corresponding to the user from a plurality of points of view as the result of sensing of the movement of the body of the user, as shown in a left window 3501A and a front window 3501B. In a window 3501C, the terminal apparatus 10A displays the positions of a plurality of parts of the body of the user in such a manner that the positional relationship therebetween in a horizontal plane can be compared with each other.

In the left window 3501A, the terminal apparatus 10A displays an avatar AVT_35A corresponding to the user (which corresponds to the user viewed from the left side). The terminal apparatus 10A displays an auxiliary line VL_35A as a figure object along with the avatar AVT_35A.

Here, a process in which the terminal apparatus 10A draws the auxiliary line VL_35A will be described.

As shown in the example (A) in FIG. 36, the terminal apparatus 10A estimates a position JNT_35D of the ankle (heel) as the particular part of the body of the user.

The terminal apparatus 10A can estimate the positions of the right ankle, the right foot, the right toe, the left ankle, the left foot, and the left toe based on point cloud data obtained by measuring the body of the user (see the example in FIG. 12, for example). For example, the terminal apparatus 10A may determine the position of the auxiliary line VL_35A as a figure object to be drawn so that the auxiliary line VL_35A is perpendicular to the ground and passes through the result of estimation of the position of the left or right ankle based on the result of estimation of the position of the ankle.

In this way, the terminal apparatus 10A can allow the user to recognize the positional relationship to the auxiliary line VL_35A while updating the display of the avatar AVT_35A each time the terminal apparatus 10A obtains the result of sensing of the movement of the body of the user (that is, while drawing the avatar AVT_35A based on the point cloud data obtained by measuring the body of the user in real time). The user can recognize whether his or her body is misaligned to the front, rear, left, or right by comparing the avatar AVT_35A and the auxiliary line VL_35A. For example, if the avatar AVT_35A significantly deviates from the auxiliary line VL_35A, the body of the user may be significantly misaligned to the front, rear, left, or right.

When drawing the auxiliary line VL_35A in such a manner that the user can compare the auxiliary line VL_35A with the avatar AVT_35A viewed from the left side as described above, the terminal apparatus 10A may draw the auxiliary line based on the result of estimation of the position of a part other than the ankle (heel) as the particular part of the body of the user (such as based on the result of estimation of the position of the pelvis).

As shown in the front window 3501B in FIG. 35, the terminal apparatus 10A displays an avatar AVT_35B corresponding to the user (which corresponds to the user viewed from the front). The terminal apparatus 10A displays an auxiliary line LN_35A, an auxiliary line LN_35B, an auxiliary line LN_35C, and an auxiliary line VL_35B as figure objects in association with the avatar AVT_35B.

Here, a process in which the terminal apparatus 10A draws the auxiliary line LN_35A and the like in the front window 3501B will be described.

As shown in the example (B) in FIG. 36, the terminal apparatus 10A estimates a position JNT_35A of the head (the "head" in the example in FIG. 12), a position JNT_35B of the shoulder (the "center between the shoulders" in the example in FIG. 12), and a position JNT_35C of the hips (the "center of the pelvis", the "right half of the pelvis", or the "left half of the pelvis" in the example in FIG. 12) as the particular parts of the body of the user. The terminal apparatus 10A determines the position of the auxiliary line VL_35B to be drawn so that the auxiliary line VL_35B is perpendicular to the ground and passes through any of the position JNT_35A of the head, the position JNT_35B of the shoulder, and the position JNT_35C of the hip. The terminal apparatus 10A may determine the position of the auxiliary line VL_35B to be drawn based on the position of a particular part other than these parts (such as a line perpendicular to the ground that passes through the midpoint between the position of the right heel and the position of the left heel).

Based on the result of estimation of the positions of these particular parts, the terminal apparatus 10A determines the positions of the auxiliary lines LN_35A and the like to be drawn. For example, as the position of the auxiliary line LN_35A to be drawn, the terminal apparatus 10A determines a position at a predetermined distance (a distance DIST_35A in the example in FIG. 36) from the position JNT_35A of the head, which is the result of estimation of the position of the head of the user, in the horizontal direction (provided that the direction perpendicular to the ground is the vertical direction). The terminal apparatus 10A determines to draw the auxiliary line LN_35B at a position at a predetermined distance from the position JNT_35B of the shoulder in the horizontal direction. The terminal apparatus 10A determines to draw the auxiliary line LN_35C at a position at a predetermined distance from the position JNT_35C of the hips in the horizontal direction.

The terminal apparatus 10A draws these auxiliary lines LN_35A, LN_35B, and LN_35C in different ways (such as in different colors or shapes). Since the auxiliary lines are drawn in different ways, the user can easily recognize to which part of the body of the user each auxiliary line corresponds. In the window 3501C, the terminal apparatus 10A draws auxiliary circles RD_35A, RD_35B, and RD_35C in the same ways as the auxiliary lines LN_35A, LN_35B, and LN_35C, respectively.

In the window 3501C, the terminal apparatus 10A draws an auxiliary circle RD_35D, which is a figure object with respect to the positions of the heels of the user. The example (C) in FIG. 36 shows a case where the auxiliary circles RD_35A, RD_35B, and RD_35C are not drawn in the window 3501C in FIG. 35. In the window 3501C, the terminal apparatus 10A draws the auxiliary circle RD_35A corresponding to the position of the head of the user, the auxiliary circle RD_35B corresponding to the shoulders, and the auxiliary circle RD_35C corresponding to the hip. The shape of these auxiliary circles RD_35A, RD_35B, and RD_35C may be the same as or similar to the shape of the auxiliary circle RD_35D. The terminal apparatus 10A displays these auxiliary circles RD_35A, RD_35B, and RD_35C at positions where the head, the shoulders, and the hips are located with respect to the particular reference part in the horizontal plane. In this way, the user can recognize in which direction, such as front, back, left or right, his or her body leans and is prompted to align the plurality of figure objects (the auxiliary circles RD_35A, RD_35B, and RD_35C) corresponding to a plurality of parts of the body with the reference auxiliary circle RD_35D.

As described above, the terminal apparatus 10A sequentially senses the movement of the body of the user as point cloud data or the like, and estimates the positions of at least three particular parts (four parts, the head, the shoulders, the hips, and the heels, in the example shown in FIG. 35 and FIG. 36 described above) of the user based on the result of sensing of the movement of the body of the user. The terminal apparatus 10A designates any one of the at least three particular parts as a reference (the positions of the heels are designated as a reference in the example in FIGS. 35 and 36, although any other part along the body axis, such as the hips, can be designated as a reference), determines the positions where the figure objects indicating the positional relationship between the other parts in the horizontal plane are to be drawn, and displays the figure objects at the determined positions.

In an object 3501D in FIG. 35, the terminal apparatus 10A displays an index of the time left before the expiration of the period for the user to adjust the front-rear or left-right balance of his or her body in the standing posture. In this way, the user is prompted to adjust the front-rear or left-right balance within the remaining time as far as possible, and the posture of the user can be further improved.

(B) Lateral Arm Elevation

The appropriateness of the posture of the user can be evaluated by measuring a movement of the user in the standing posture raising both arms straight out to his or her sides. The movement of lateral arm elevation will be described, provided that the timing when the user in the standing posture has completely raised his or her arms is the timing of a peak of the movement.

Figure 37:
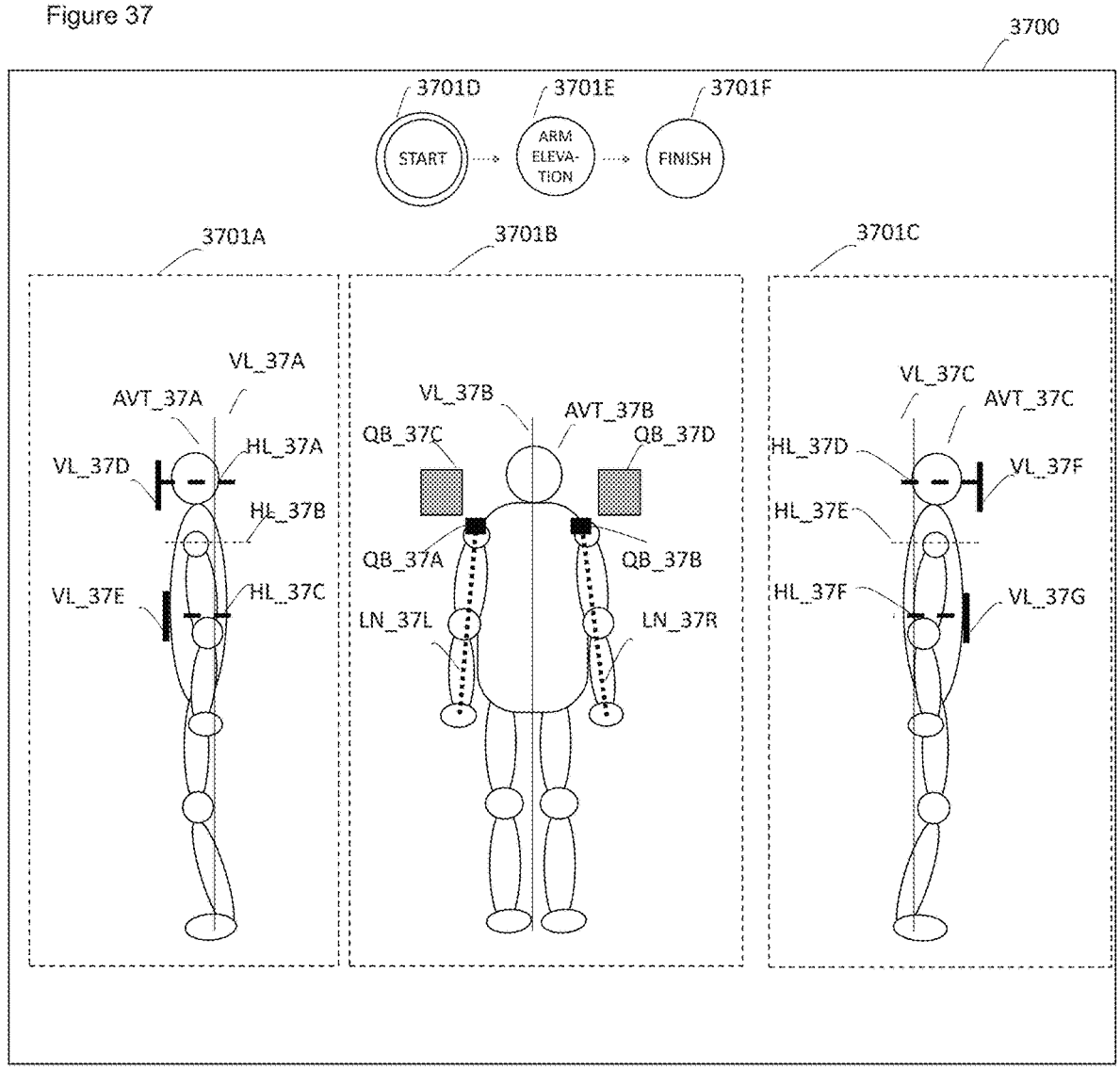
FIG. 37 is a diagram showing an example screen for the terminal apparatus 10A to prompt the user to make a movement of lateral arm elevation.

FIG. 37 is a diagram showing an example screen for the terminal apparatus 10A to prompt the user to make the movement of lateral arm elevation.

Figure 38:
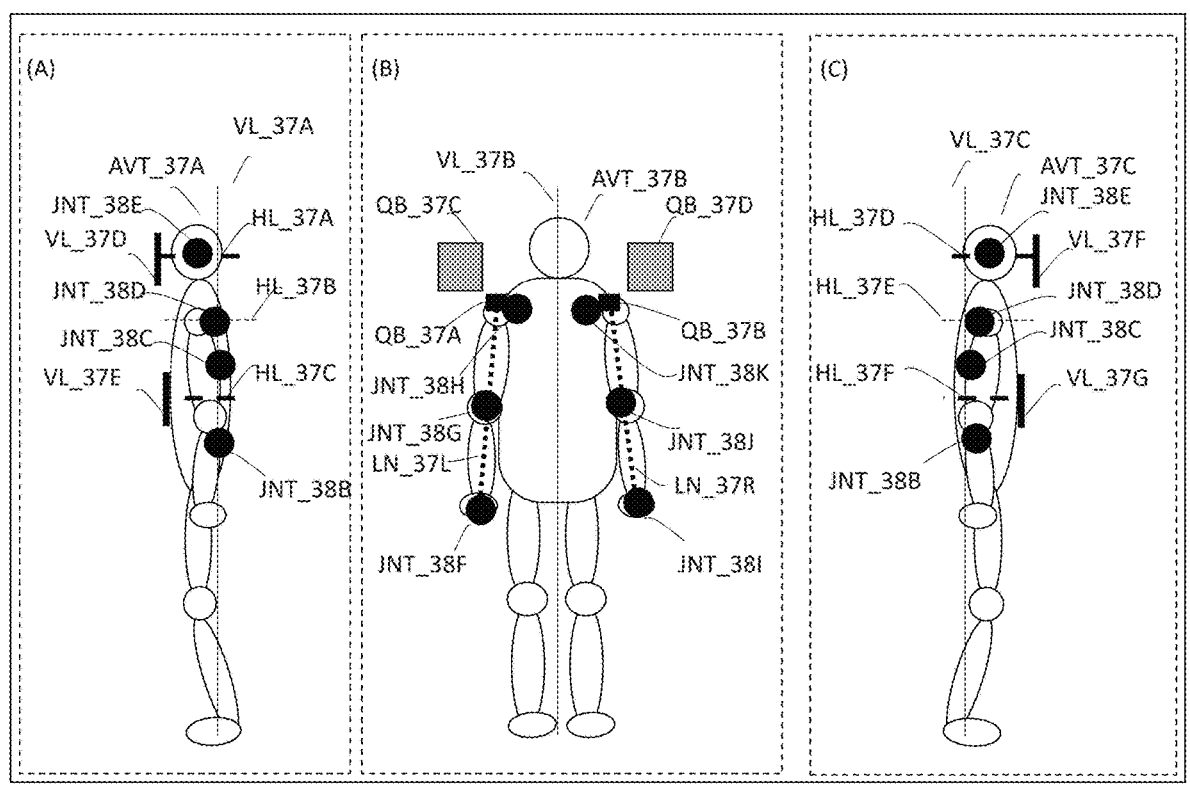
FIG. 38 is a diagram showing a process of determining the position of a figure object to be drawn that serves as a guide for movement of the body of the user based on the result of estimation of the position of a particular part of the user.

FIG. 38 is a diagram showing a process of determining the position of a figure object to be drawn that serves as a guide for movement of the body of the user based on the result of estimation of the position of a particular part of the user.

Figure 39:
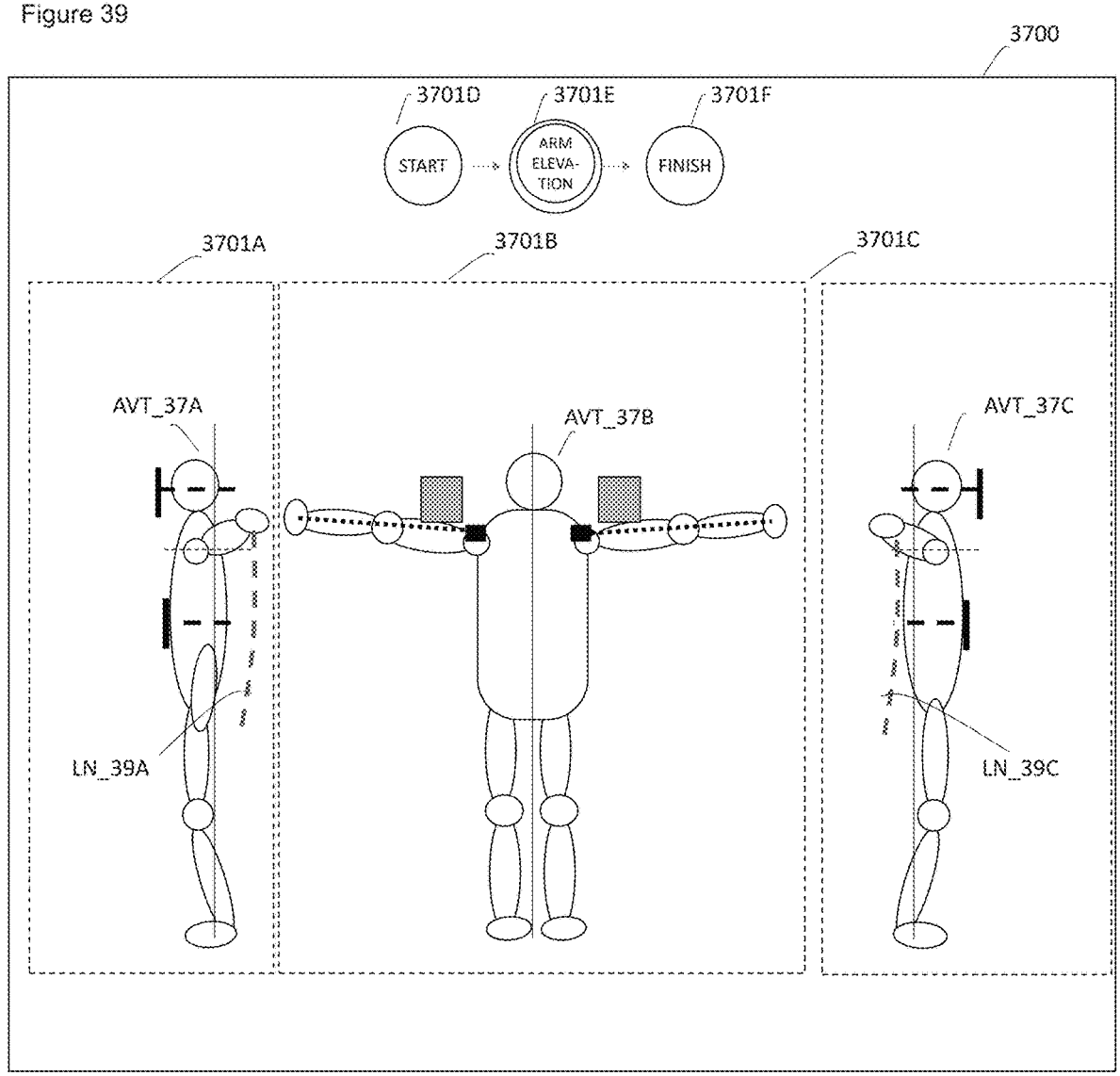
FIG. 39 is a diagram showing a course of movement of the body of the user.

FIG. 39 is a diagram showing a course of movement of the body of the user.

Figure 40:
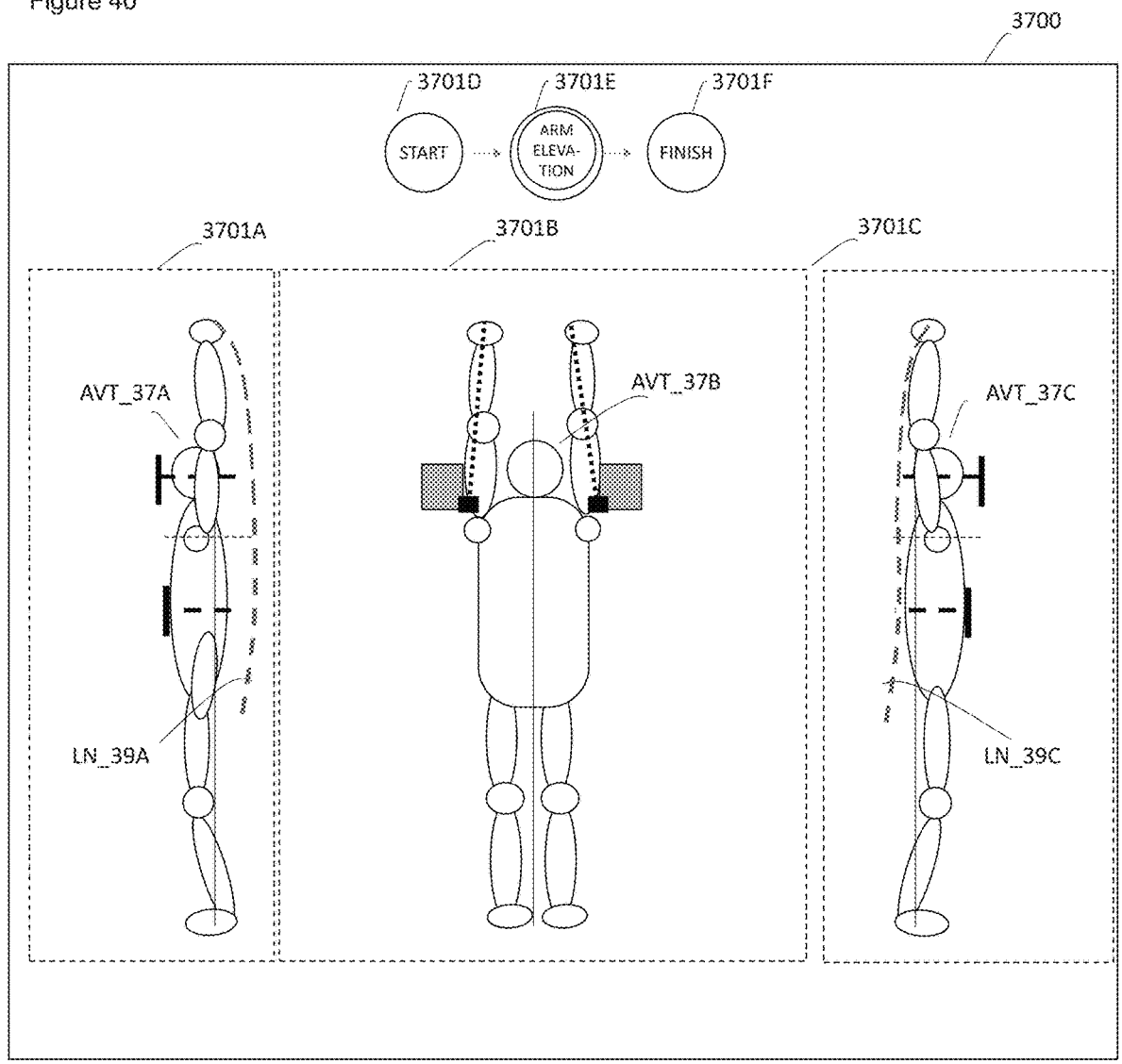
FIG. 40 is a diagram showing a state of the user having completely raised both arms at the timing of a peak of the movement of lateral arm elevation.

FIG. 40 is a diagram showing a state of the user having completely raised both arms at the timing of the peak of the movement of lateral arm elevation.

Figure 41:
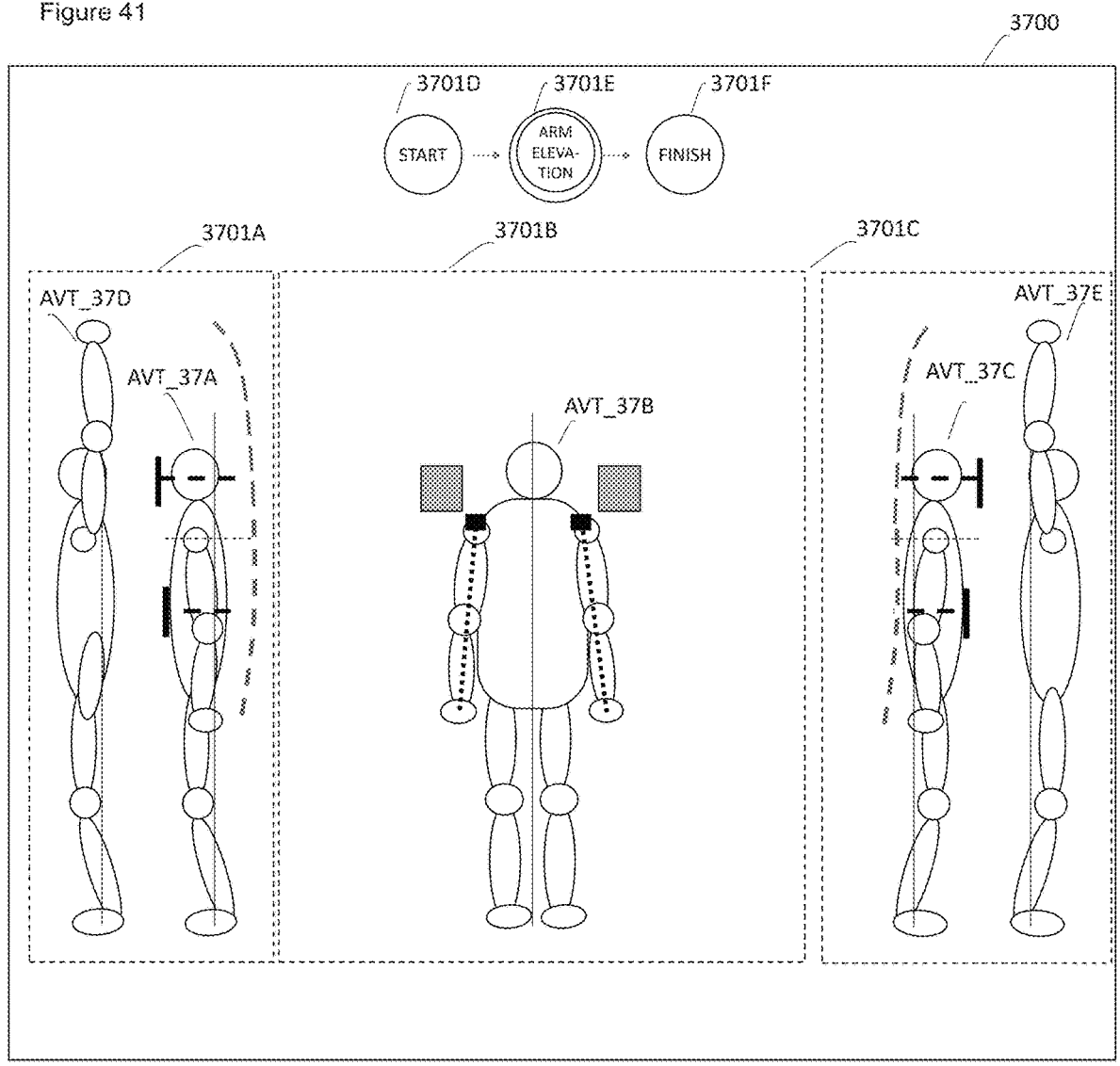
FIG. 41 is a diagram showing an example in which a result of sensing of the user at the timing of the peak of the movement of lateral arm elevation is saved and displayed as an avatar for comparison.

FIG. 41 is a diagram showing an example in which a result of sensing of the user at the timing of the peak of the movement of lateral arm elevation is saved and displayed as an avatar for comparison.

As shown in FIG. 37, before starting the movement of lateral arm elevation, the user assumes an initial posture, which is a standing posture with both arms stuck to the sides of his or her body. The terminal apparatus 10A may notify the user to assume the initial posture through audio or image, for example.

The terminal apparatus 10A draws a figure object based on the initial posture of the user and the result of estimation of the position of a particular part. In the example shown, the terminal apparatus 10A displays an avatar AVT_37A corresponding to the user (which corresponds to the user viewed from the left side) in a left window 3701A of a screen 3700. The terminal apparatus 10A draws the following figure objects in the left window 3701A.

- An auxiliary line VL_37A that is a figure object that makes a front-rear misalignment of the user perceptible. This auxiliary line is fixed and does not move while the user is moving his or her body.
- An auxiliary line VL_37D that indicates the position of the front surface of the head of the user in the initial posture. While the user is making the movement of lateral arm elevation, the user can more easily recognize whether the body of the user is moving forward or rearward by watching the head and perceiving the positional relationship between the avatar AVT_37A, which is the result of sensing of the movement of the body of the user, and the auxiliary line VL_37D. This auxiliary line is fixed and does not move while the user is moving his or her body.
- An auxiliary line VL_37E that indicates the position of the surface of the abdomen of the user in the initial posture. While the user is making the movement of lateral arm elevation, the user can more easily recognize whether the body of the user is moving forward or rearward by watching the abdomen and perceiving the positional relationship between the avatar AVT_37A, which is the result of sensing of the movement of the body of the user, and the auxiliary line VL_37E. This auxiliary line is fixed and does not move while the user is moving his or her body.
- An auxiliary line HL_37A that indicates the distance between the auxiliary line VL_37A and the auxiliary line VL_37D. This auxiliary line is fixed and does not move while the user is moving his or her body.
- An auxiliary line HL_37B that makes the positions of the shoulders of the user in the initial posture more recognizable. This auxiliary line is fixed and does not move while the user is moving his or her body.
- An auxiliary line HL_37C that indicates the distance between the auxiliary line VL_37A and the auxiliary line VL_37E. This auxiliary line is fixed and does not move while the user is moving his or her body.

In a right window 3701C, the terminal apparatus 10A displays auxiliary lines VL_37C, VL_37F, VL_37G, HL_37D, HL_37E, and HL_37F along with an avatar AVT_37C (which corresponds to the user viewed from the right side).

The auxiliary line VL_37C corresponds to the auxiliary line VL_37A.

The auxiliary line VL_37F corresponds to the auxiliary line VL_37D.

The auxiliary line VL_37G corresponds to the auxiliary line VL_37E.

The auxiliary line HL_37D corresponds to the auxiliary line HL_37A.

The auxiliary line HL_37E corresponds to the auxiliary line HL_37B.

The auxiliary line HL_37F corresponds to the auxiliary line HL_37C.

In a front window 3701B, the terminal apparatus 10A displays an avatar AVT_37B (which corresponds to the user viewed from the front). In the front window 3701B, the terminal apparatus 10A displays the following figure objects.

- An auxiliary line VL_37B that is a figure object that makes a left-right misalignment of the user perceptible. This auxiliary line is fixed and does not move while the user is moving his or her body.
- An auxiliary line LN_37L (which corresponds to the left arm of the user) and an auxiliary line LN_37R (which corresponds to the right arm of the user) that are associated with the avatar AVT_37B to make whether the elbow is bent while the user is making the movement of lateral arm elevation perceptible. The terminal apparatus 10A updates the position of each drawn figure object in association with the result of sensing of the movement of the body of the user. That is, the terminal apparatus 10A updates the positions of the drawn auxiliary lines LN_37L and LN_37R in association with the movement of the avatar.
- A polygon QB_37A (which corresponds to the left arm) that indicates the end point of the auxiliary line LN_37L and a polygon QB_37B (which corresponds to the right arm) that indicates the end point of the auxiliary line LN_37R. If the user bends his or her elbow during the movement of lateral arm elevation, the polygon QB_37B or QB_37A is drawn at a position outside the avatar AVT_37B. Therefore, the user can easily recognize a bend of his or her elbow by recognizing the positional relationship between the avatar AVT_37B and the polygon QB_37A or QB_37B.
- A polygon QB_37C (which corresponds to the left arm) and a polygon QB_37D (which corresponds to the right arm) that allow the user to perceive whether the user is shrugging his or her shoulders (that is, whether the user is properly using the shoulder joints to raise his or her arms) when the user has completely raised his or her arms. As described later, if the user is not shrugging his or her shoulders when the user has completely raised his or her arms, the terminal apparatus 10A draws the polygon QB_37C for the left arm at a position where the polygon QB_37C overlaps with the polygon QB_37A and draws the polygon QB_37D for the right arm at a position where the polygon QB_37D overlaps with the polygon QB_37B.

When prompting the user to make the movement of lateral arm elevation, the terminal apparatus 10A displays an icon 3701D that indicates that the user is in the initial posture, an icon 3701E that indicates the user is making the movement of lateral arm elevation, and an icon 3701F that indicates that the measurement has been finished.

A process of drawing these figure objects will be described.

As shown in the example (A) in FIG. 38, as particular parts of the body of the user, the terminal apparatus 10A estimates a position JNT_38B of the hips (such as the "center of the pelvis" in the example in FIG. 12), a position JNT_38C between the hips and the shoulders (such as the "thoracic and lumbar spines" in the example in FIG. 12), a position JNT_37D of the shoulders, and a position JNT_38E of the head.

The terminal apparatus 10A determines the position of the auxiliary line VL_37A to be drawn so that the auxiliary line is perpendicular to the ground and passes through the positions of the position JNT_38B of the hips and the other positions described above.

The terminal apparatus 10A determines the position of the auxiliary line VL_37D to be drawn based on the position where a line passing through the position JNT_38E of the head and extending from the back to the front of the user in the horizontal direction intersects with the front surface of the body of the user. That is, the terminal apparatus 10A determines the position of the figure object to be drawn based on the result of estimation of the positions of parts of the body and the result of sensing of the movement of the body of the user as point cloud data.

The terminal apparatus 10A determines the position of the auxiliary line VL_37E to be drawn based on the position where a line passing through the central position between the position JNT_38B of the hips and the position JNT_38C between the hips and the shoulders and extending from the back to the front of the user in the horizontal direction intersects with the front surface of the body of the user.

The method of drawing each auxiliary line in the example (C) can be the same as that in the example (A).

As shown in the example (B), the terminal apparatus 10A draws the auxiliary line VL_37B based on the result of estimation of the positions of parts of the body of the user, such as the hips and the pelvis. The terminal apparatus 10A may draw the auxiliary line VL_37B based on the result of estimation of the position of the heel of the right foot and the position of the heel of the left foot of the user in such a manner that the auxiliary line VL_37B passes through the central position between these positions and is perpendicular to the ground.

The terminal apparatus 10A determines the position of the auxiliary line LN_37L to be drawn based on the result of estimation of a position JNT_38F of a wrist (left wrist) of the user and a position JNT_38G of an elbow (left elbow) of the user in such a manner that the auxiliary line LN_37L starts at the left wrist and ends at a point (the polygon QB_37A) on the extension of the line connecting the left wrist and the elbow at the same distance from the elbow as the length between the left wrist and the elbow.

The terminal apparatus 10A determines the position of the auxiliary line LN_37R to be drawn based on the result of estimation of a position JNT_38I of a wrist (right wrist) of the user and a position JNT_38J of an elbow (right elbow) of the user in such a manner that the auxiliary line has a length determined in the same manner as the auxiliary line LN_37L.

Based on a position JNT_38H of a shoulder (left shoulder), the terminal apparatus 10A determines coordinates at a predetermined distance from the body of the user in an outward and upward direction. The coordinates are set to correspond to the position of the shoulder at the time when the peak of the movement of lateral arm elevation of the user is reached. The terminal apparatus 10A may determine the coordinates based on the size of body of the user (such as the height or the shoulder width of the user). Based on the determined coordinates, the terminal apparatus 10A determines the position of the polygon QB_37C to be drawn.

In the same manner as that for determining the position of the polygon QB_37C to be drawn, the terminal apparatus 10A determines the position of the polygon QB_37D to be drawn based on a position JNT_38K of a shoulder (right shoulder) of the user.

As shown in FIG. 39, when the user makes a movement of raising his or her arms, the terminal apparatus 10A displays trajectories of movement of the hands as a trajectory LN_39A (a trajectory of movement of the left hand) and a trajectory LN_39C (a trajectory of movement of the right hand) based on the history of the result of sensing of the movement of the body of the user and the history of the determined positions of the wrists.

Suppose that the user has completely raised his or her arms and reached the peak of the movement as shown in FIG. 40. The terminal apparatus 10A detects that the peak of the movement of lateral arm elevation of the user is reached (for example, detects that the user has completely raised his or her arms based on the result of estimation of the position of a particular part of the user), and draws an avatar corresponding to the result of sensing (the posture of the user) at this timing. Here, if the polygon QB_37A drawn and updated in association with the movement of the body of the user and the polygon QB_37C serving as an index of the posture with both arms completely raised are in a particular positional relationship (overlap with each other, for example), at least any of the polygon QB_37A and the polygon QB_37C may be displayed in a different manner than when the polygons do not overlap with each other. In this way, the terminal apparatus 10A can make the user easily perceive that the movement of lateral arm elevation is proper (that the user is not shrugging his or her shoulders, for example). Similarly, when the polygon QB_37B and the polygon QB_37D are in a particular positional relationship, the terminal apparatus 10A can display the polygons in a different manner than when the polygons are not in the particular positional relationship.

As shown in FIG. 41, the terminal apparatus 10A displays a history avatar AVT_37D and a history avatar AVT_37E side by side with the avatar AVT_37A and the avatar AVT_37C drawn and updated in association with the result of sensing of the movement of the body of the user, respectively.

As shown in FIG. 41, since the avatars with the arms completely raised in the movement of lateral arm elevation of the user, the trajectories (the trajectories LN_39A and LN_39C) of the movement of the user raising the arms, and the avatars AVT_37A and AVT_37C representing the posture of the user in real time are displayed side by side, the user can be provided with a material based on which the user can think how to make a movement.

(C) Squat

Figure 42:
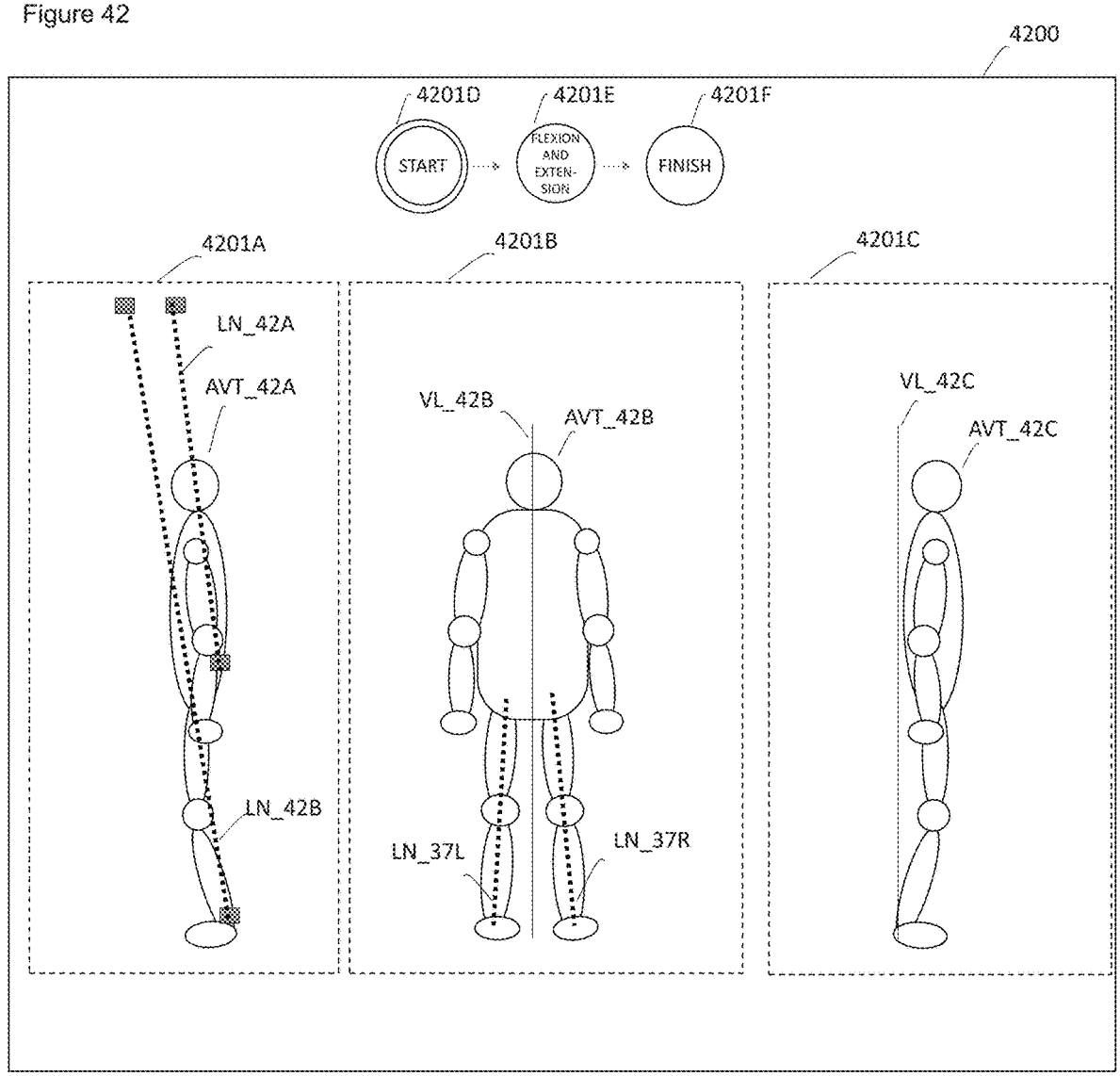
FIG. 42 is a diagram showing an example screen for the terminal apparatus 10A to prompt the user to make a squat movement.

FIG. 42 is a diagram showing an example screen for the terminal apparatus 10A to prompt the user to make a squat movement.

Figure 43:
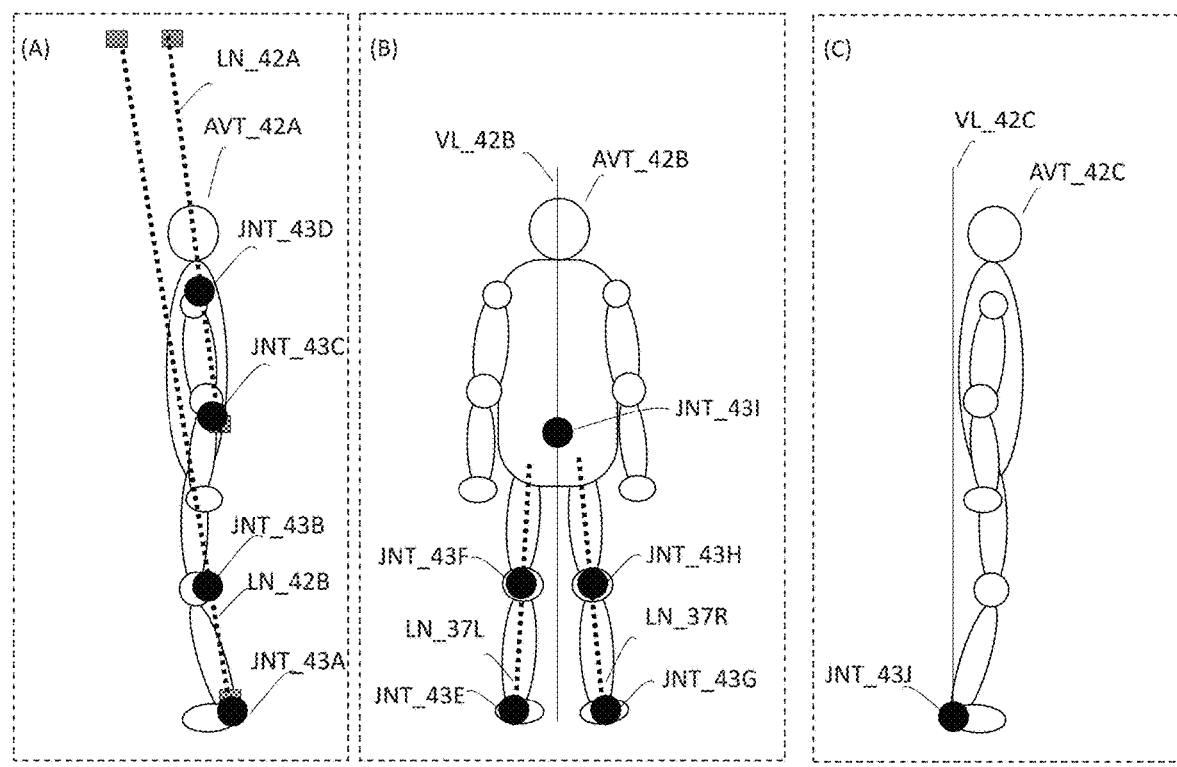
FIG. 43 is a diagram showing a process of determining the position of a figure object to be drawn that serves as a guide for movement of the body of the user based on the result of estimation of the position of a particular part of the user.

FIG. 43 is a diagram showing a process of determining the position of a figure object to be drawn that serves as a guide for movement of the body of the user based on the result of estimation of the position of a particular part of the user.

Figure 44:
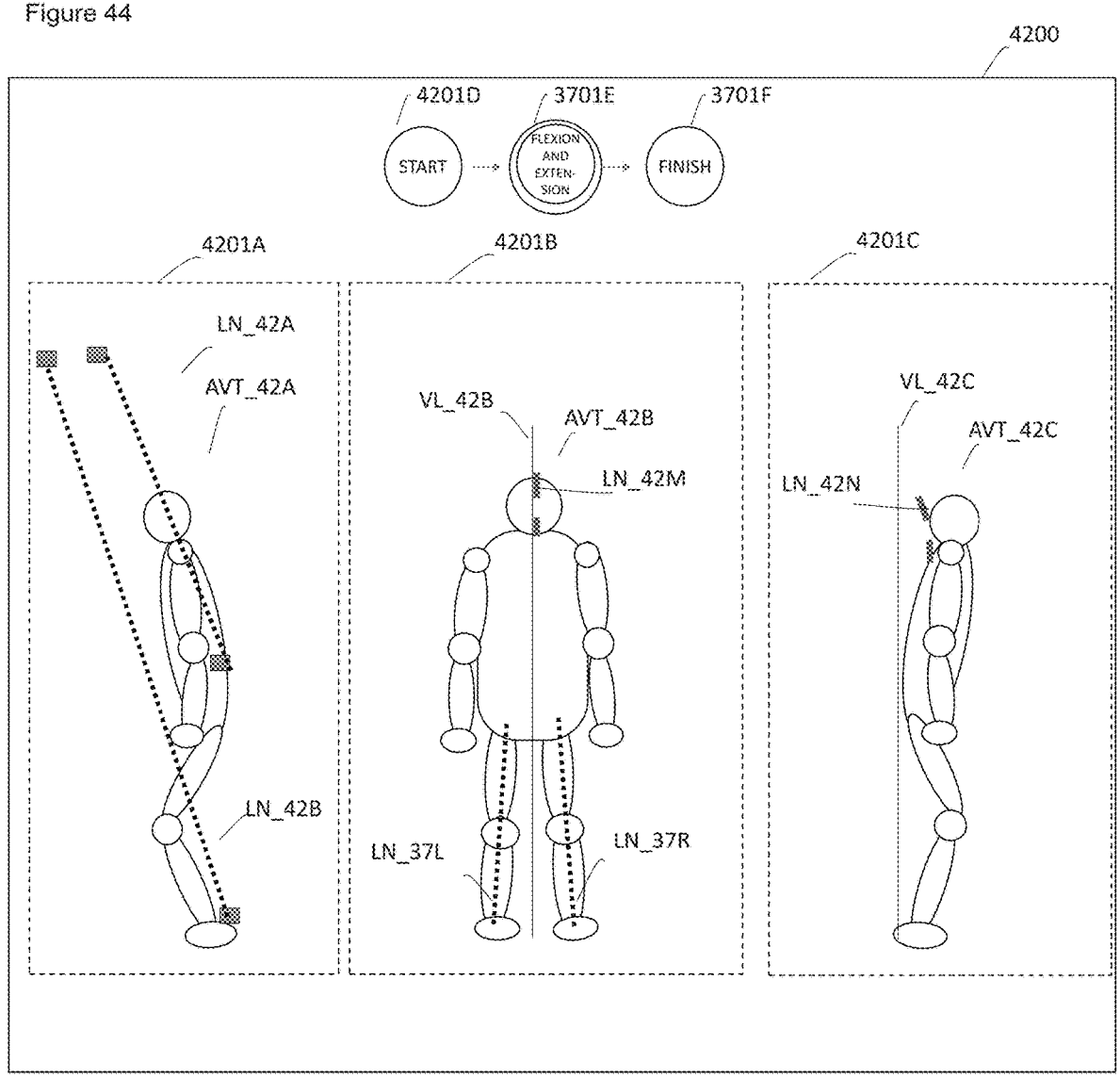
FIG. 44 is a diagram showing a course of movement of the body of the user.

FIG. 44 is a diagram showing a course of movement of the body of the user.

Figure 45:
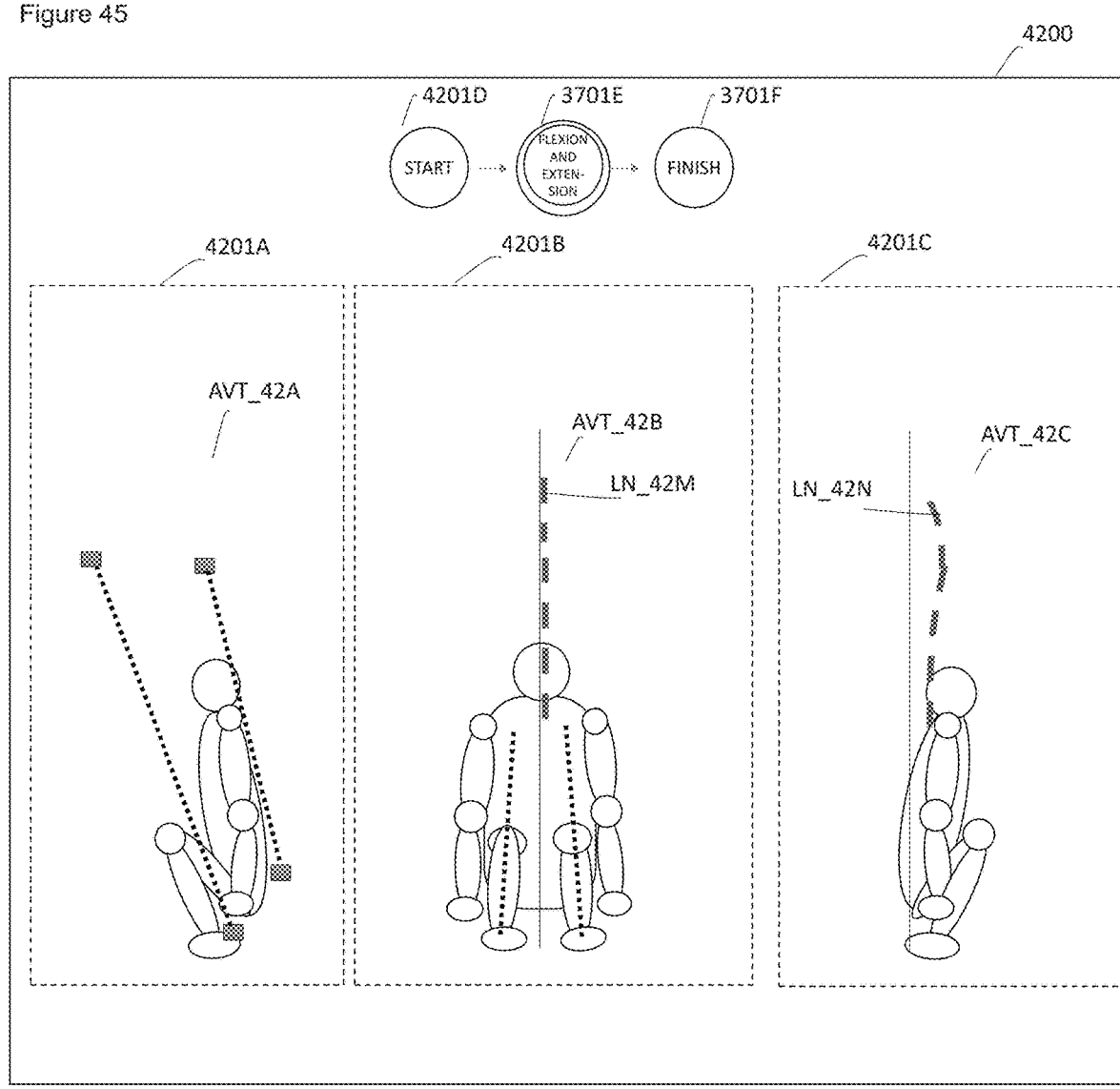
FIG. 45 is a diagram showing a state of the user having completely squatted down at the timing of a peak of the squat movement of the user.

FIG. 45 is a diagram showing a state of the user having completely squatted down at the timing of the peak of the squat movement of the user.

Figure 46:
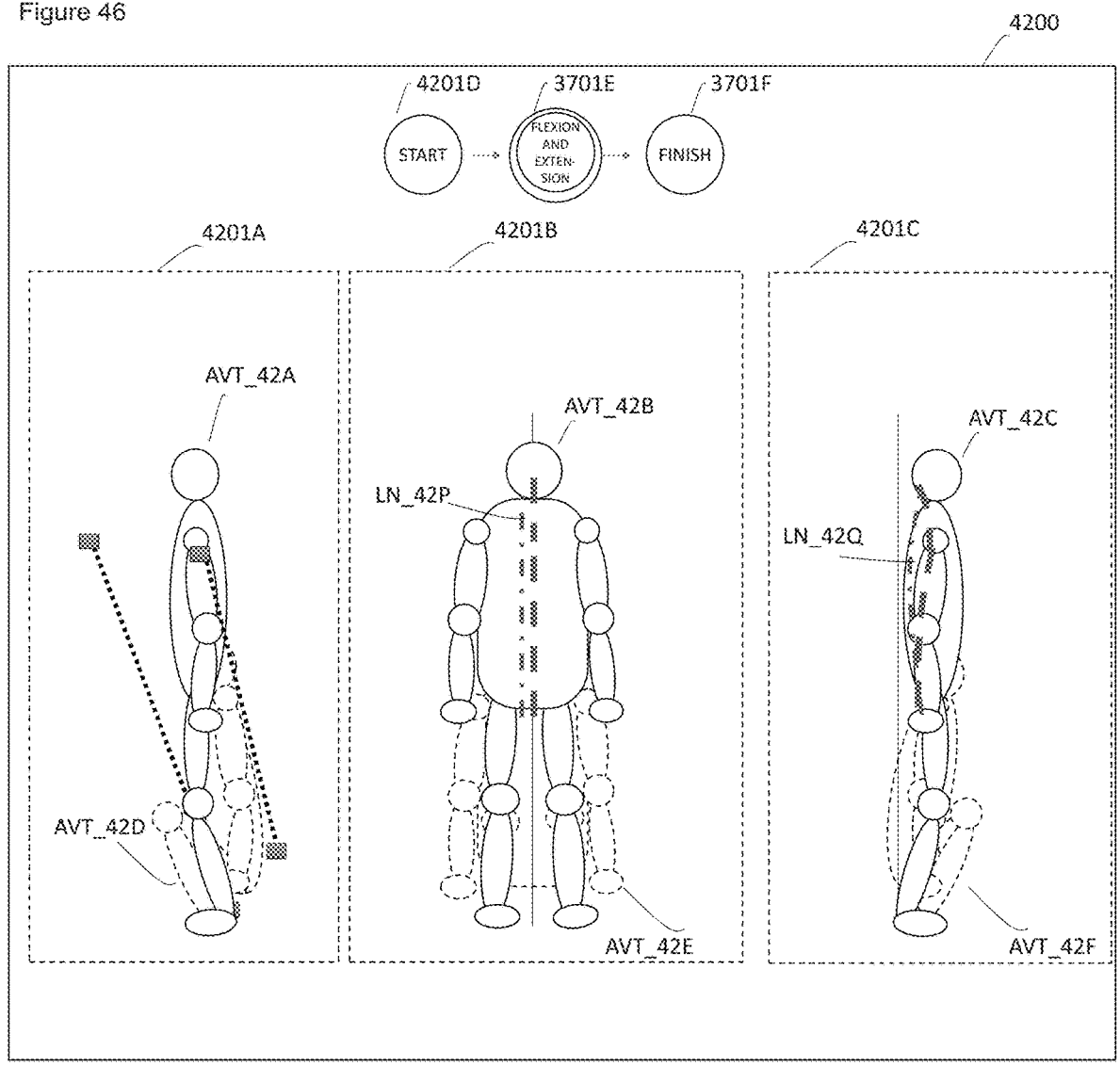
FIG. 46 is a diagram showing an example in which a result of sensing of the user at the timing of the peak of the squat movement is saved and displayed as an avatar for comparison.

FIG. 46 is a diagram showing an example in which a result of sensing of the user at the timing of the peak of the squat movement is saved and displayed as an avatar for comparison.

As shown in FIG. 42, in an initial posture before starting the squat movement, the terminal apparatus 10A draws a figure object based on the initial posture and the result of estimation of the position of a particular part.

In the example shown, in a left window 4201A of a screen 4200, the terminal apparatus 10A draws an avatar AVT_42A and at the same time draws the following auxiliary lines.

An auxiliary line LN_42A for visualizing the angle of the back of the user.

An auxiliary line LN_42B for visualizing the angle of the shank of the user.

In a right window 4201C, the terminal apparatus 10A draws an avatar AVT_42C and at the same time draws the following auxiliary line.

An auxiliary line VL_42C for allowing the user to perceive whether the posture of the user is leaning forward or backward. This auxiliary line is displayed at a fixed position while the movement of the body of the user is measured.

In a front window 4201B, the terminal apparatus 10A draws an avatar AVT_42B and at the same time draws the following auxiliary lines.

An auxiliary line VL_42B for allowing the user to perceive whether the posture of the user is leaning to the left or right. This auxiliary line is displayed at a fixed position while the movement of the body of the user is measured.

An auxiliary line LN_37L for allowing the user to perceive whether the left foot of the user is misaligned to the left or right.

An auxiliary line LN_37R for allowing the user to perceive whether the right foot of the user is misaligned to the left or right.

The terminal apparatus 10A displays an object 4201D indicating a state before starting the squat movement, an object 4201E indicating that the squat movement is being measured, and an object 4201F indicating that the measurement is finished.

As shown in the example (A) in FIG. 43, as the result of estimation of the positions of parts of the user, the terminal apparatus 10A draws, as the auxiliary line LN_42B, a line segment starting at a position JNT_43A of the heel and passing through a position JNT_43B of the knee based on the position JNT_43A of the heel and the position JNT_43B of the knee.

The terminal apparatus 10A draws, as the auxiliary line LN_42A, a line segment starting at a position JNT_43C of the hips and passing through a position JNT_43D of the shoulder based on the position JNT_43C of the hips (such as the pelvis) and the position JNT_43D of the shoulder.

The terminal apparatus 10A may determine the lengths of these auxiliary lines in such a manner that the end points of the auxiliary lines LN_42A and LN_42B are at the same height.

As shown in the example (C), the terminal apparatus 10A determines the position of the auxiliary line VL_42C to be drawn so that the auxiliary line is perpendicular to the ground based on a position JNT_43J of the heel. The terminal apparatus 10A may draw the auxiliary line VL_42C based on the position of the hips or the like, rather than the position JNT_43J of the heel.

As shown in the example (B), based on a position JNT_43E of a heel (left heel) and a position JNT_43F of a knee (left knee), the terminal apparatus 10A determines the position of the auxiliary line LN_37L to be drawn, which starts at the position of the heel and ends at a point on the extension of the line connecting the heel and the knee at the same distance from the knee as the measured length between the heel and the knee.

The terminal apparatus 10A determines the position of the auxiliary line VL_42B to be drawn so that the auxiliary line is perpendicular to the ground and passes through a position JNT_431 of the hip. The terminal apparatus 10A may determine the position of the auxiliary line VL_42B to be drawn based on the positions of the left and right heels (JNT_43E and JNT_43G) so that the auxiliary line is perpendicular to the ground and passes through the midpoint between these positions.

As shown in FIG. 44, when the user starts the squat movement, the terminal apparatus 10A draws a trajectory LN_42M of the squat of the user in the front window 4201B. For example, the terminal apparatus 10A may draw the trajectory LN_42M by retaining the result of estimation of the position of the neck (or the head or the shoulder) of the user as a history.

In the right window 4201C, the terminal apparatus may display a trajectory LN_42N of the squat of the user. For example, the terminal apparatus 10A may draw the trajectory LN_42N by retaining the result of estimation of the position of the neck or the like of the user as a history.

In this way, the user can easily recognize whether the user is squatting without fluctuating to the left or right by comparing the trajectory LN_42M with the auxiliary line VL_42B, and whether the user is squatting without fluctuating to the front or back by comparing the trajectory LN_42N with the auxiliary line VL_42C.

As shown in FIG. 45, when the user has completely squatted down, the peak of the squat movement is reached. In response to detecting that the peak of the squat movement of the user is reached (for example, in response to detecting that the peak is reached by comparing the result of estimation of the position of a particular part with the position of the part in the posture at the time when the peak of the squat movement of the user is reached), the terminal apparatus 10A saves the sensing result (such as point cloud data) at the timing of the peak.

In the state where the user has completely squatted down, the terminal apparatus 10A may determine whether the auxiliary line LN_42B (which indicates the angle of the knee) and the auxiliary line LN_42A (which indicates the angle of the back) are diverging. In the example in FIG. 45, the auxiliary line LN_42B and the auxiliary line LN_42A are diverging with respect to the respective starting points (the heel and the hip), so that it can be determined that the user is not leaning forward and in a good posture. The terminal apparatus 10A may draw the auxiliary lines LN_42B and LN_42A in such a manner that the end points of the auxiliary line LN_42B (starting at the heel) and the auxiliary line LN_42A (starting at the hip) are at the same height from the ground in the state where the user has completely squatted down. The terminal apparatus 10A may determine whether the movement of the user is good based on whether the distance between the end point of the auxiliary line LN_42A and the end point of the auxiliary line LN_42B is equal to or greater than a certain distance (the movement of the user is determined to be good when the distance between the end points is equal to or greater than the certain distance).

As shown in FIG. 46, when the user stands up after completely squatting down, the terminal apparatus 10A displays the result of sensing of the user in the squat position as an avatar AVT_42D in the left window 4201A, as an avatar AVT_42E in the front window 4201B, and as an avatar AVT_42F in the right window 4201C.

In the left window 4201A, the terminal apparatus 10A displays the auxiliary lines LN_42A and LN_42B in the squat position along with the avatar AVT_42D.

In the front window 4201B, the terminal apparatus 10A draws a trajectory LN_42P of the standing up of the user after completely squatting down (that is, after the timing of the peak is reached) (for example, the trajectory is drawn based on the position of the neck).

In the right window 4201C, the terminal apparatus 10A draws a trajectory LN_42Q of the standing up of the user after completely squatting down (that is, after the timing of the peak is reached) (for example, the trajectory is drawn based on the position of the neck).

(D) A movement of lowering the hips while stepping a foot forward.

Figure 47:
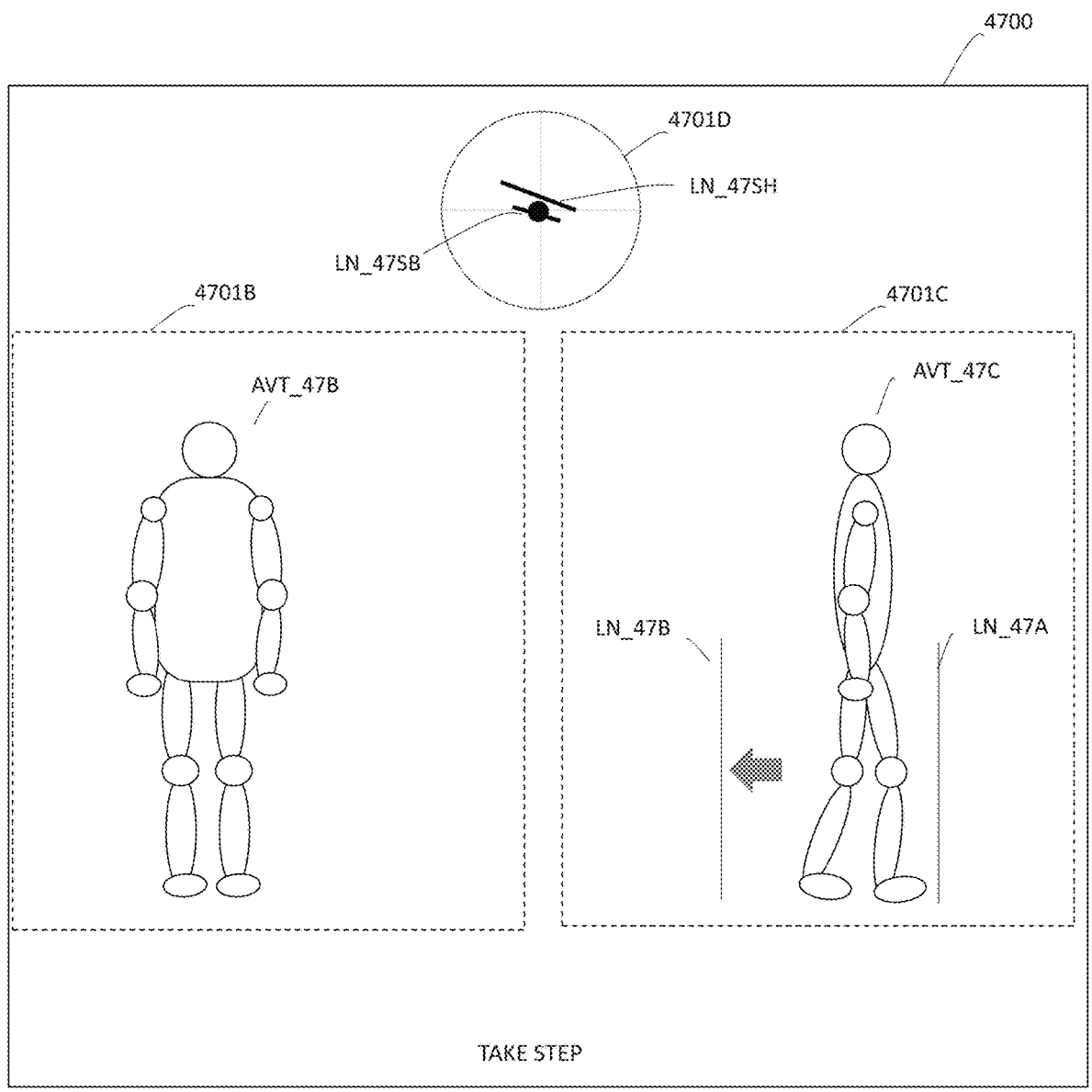
FIG. 47 is a diagram showing an example screen for the terminal apparatus 10A to prompt the user to make a movement of lowering his or her hips while stepping a foot forward.

FIG. 47 is a diagram showing an example screen for the terminal apparatus 10A to prompt the user to make a movement of lowering his or her hips while stepping a foot forward.

Figure 48:
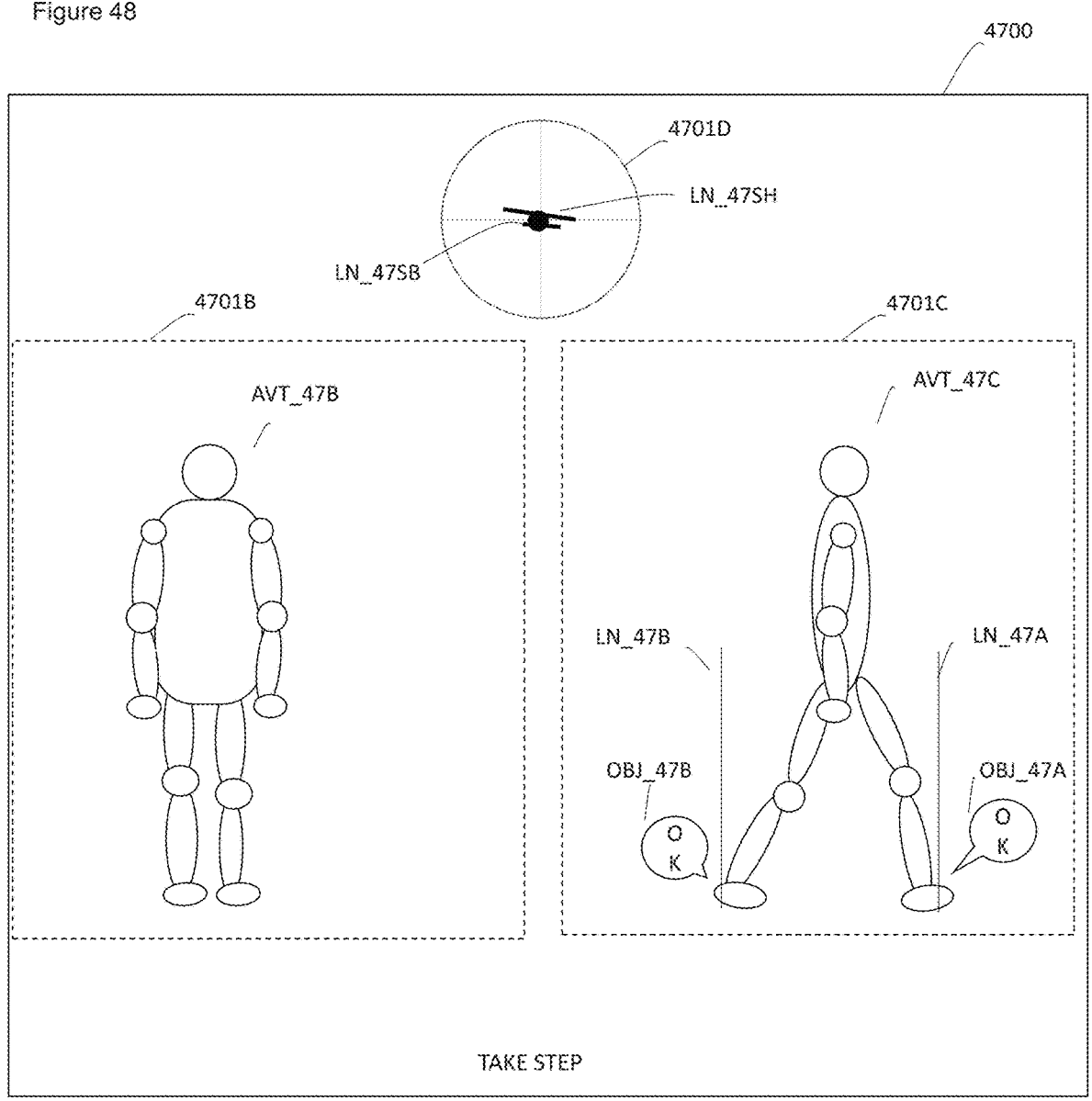
FIG. 48 is a diagram showing an example screen in a situation where it is indicated to the user that the initial posture of the user is proper.

FIG. 48 is a diagram showing an example screen in a situation where it is indicated to the user that the initial posture of the user is proper.

Figure 49:
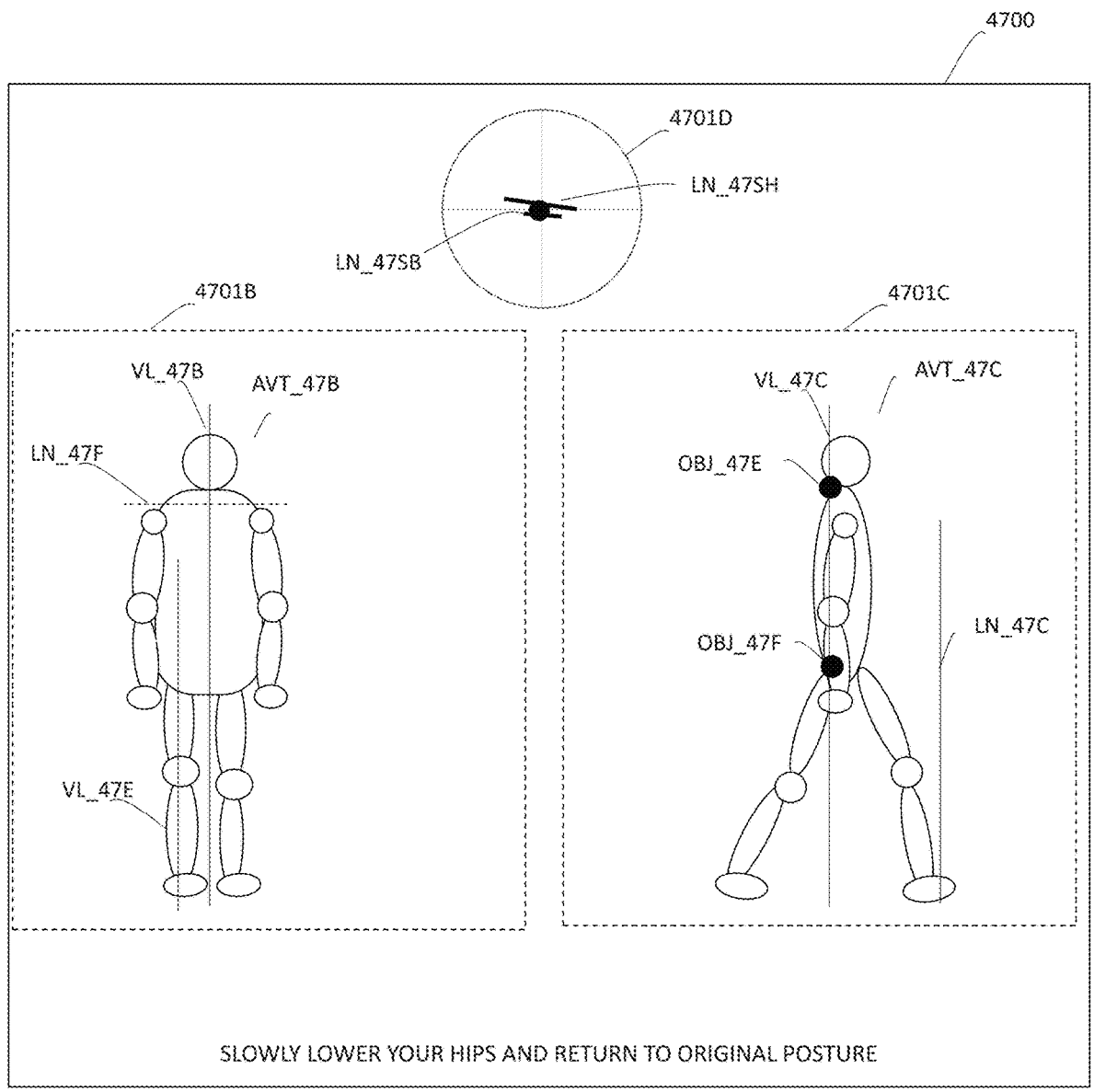
FIG. 49 is a diagram showing a situation where the measurement of the movement of the user is started.

FIG. 49 is a diagram showing a situation where the measurement of the movement of the user is started.

Figure 50:
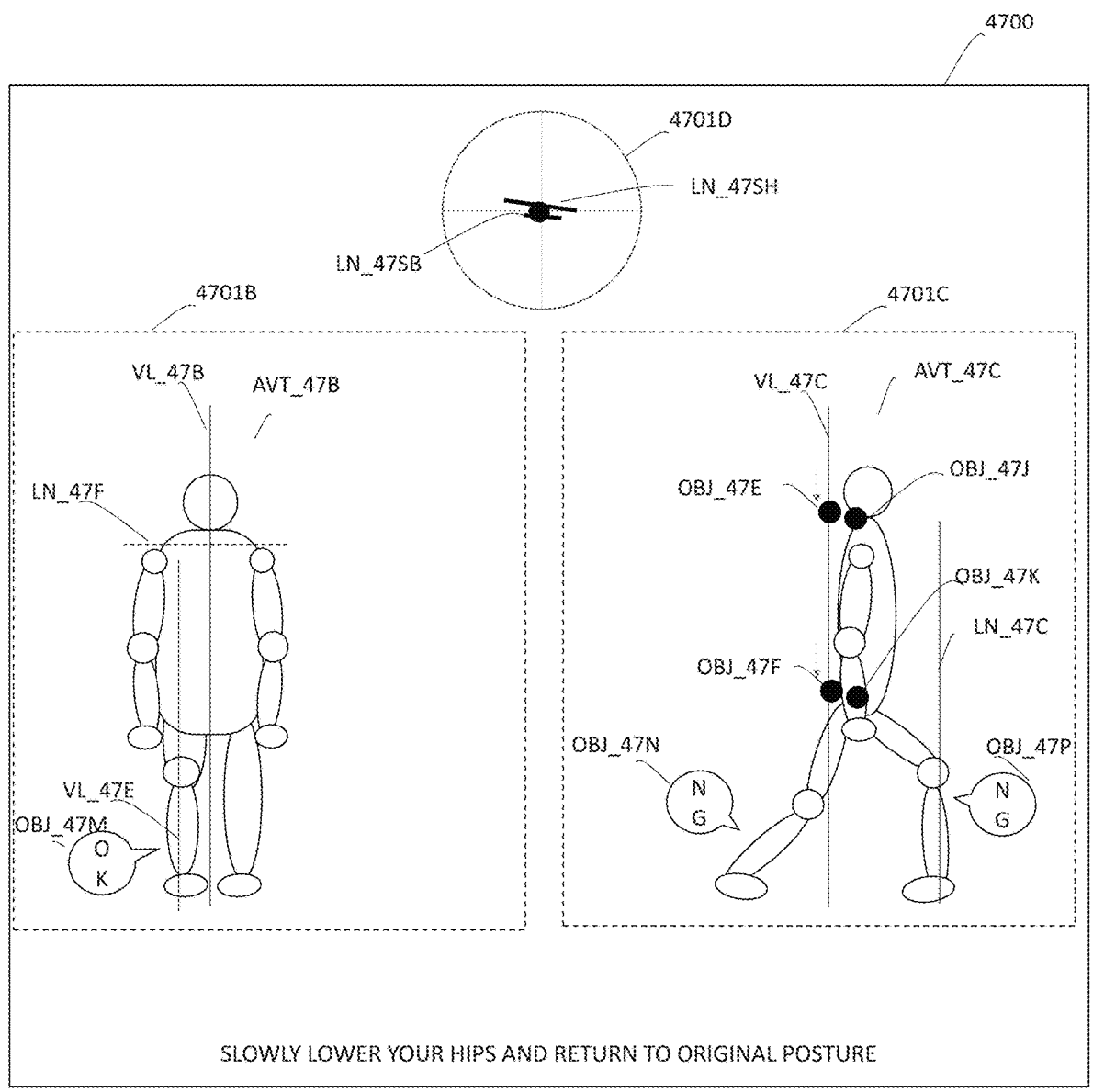
FIG. 50 is a diagram showing a situation where whether the movement of the user is proper or not is determined, and the determination result is presented to the user.

FIG. 50 is a diagram showing a situation where whether the movement of the user is proper or not is determined, and the determination result is presented to the user.

Figure 51:
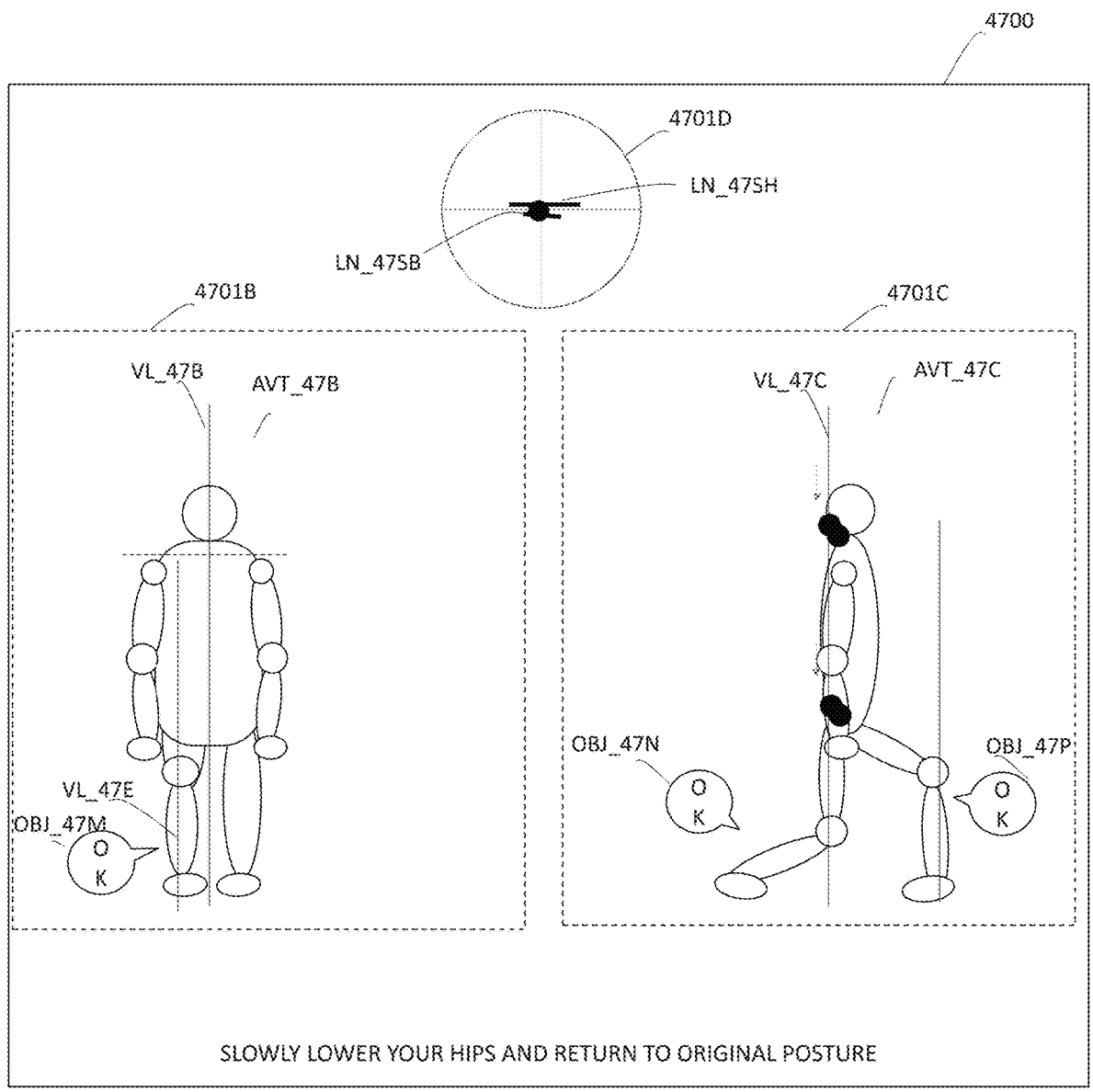
FIG. 51 is a diagram showing a situation where whether the movement of the user is proper or not is determined, and the determination result is presented to the user.

FIG. 51 is a diagram showing a situation where whether the movement of the user is proper or not is determined, and the determination result is presented to the user.

As shown in FIG. 47, in a screen 4700, the terminal apparatus 10A displays an avatar AVT_47B corresponding to the user (which corresponds to the user viewed from the front) in a front window 4701B. In a right window 4701C, the terminal apparatus 10A displays an avatar AVT_47C corresponding to the user (which corresponds to the user viewed from the right) and an auxiliary line LN_47A and an auxiliary line LN_47B serving as a guide for the foot positions of the user.

In the example shown, the terminal apparatus 10A displays an arrow-shaped object that prompts the user to step the back foot backward.

In the example in FIG. 47, the terminal apparatus 10A measures the length of the leg of the user based on the result of estimation of the position of a particular part of the user. For example, the terminal apparatus 10A measures the length of the leg of the user based on the position of the heel and the position of the hips (pelvis) of the user. In this way, the terminal apparatus 10A determines a required step length for the movement of the user. The terminal apparatus 10A may adjust the required step length in accordance with the physique (such as the length of the leg) of the user. The terminal apparatus 10A determines the distance between the auxiliary line LN_47A and the auxiliary line LN_47B based on the result of measurement of the length of the leg of the user, and displays the auxiliary lines in the right window 4701C.

In the example shown, in the screen 4700, the terminal apparatus 10A displays an object 4701D for visualizing the rotation of the hips and the rotation of the shoulders of the user. The terminal apparatus 10A determines the rotation of the hips of the user based on the result of estimation of the position of the pelvis (the positions of the "left half of the pelvis" and the "right half of the pelvis" in the example in FIG. 12). The terminal apparatus 10A determines the rotation of the shoulders of the user based on the result of estimation of the positions of the shoulders (the "left shoulder" and the "right shoulder" in the example in FIG. 12).

In the object 4701D, the terminal apparatus 10A displays an auxiliary line LN_47SB indicating the rotation of the hips and an auxiliary line LN_47SH indicating the rotation of the shoulders with respect to the position of the hips (such as the center of the pelvis), for example. In this way, the user can easily perceive how much the hips and the shoulders are rotating in the movement of lowering the hips while stepping a foot forward.

As shown in FIG. 48, before measuring the movement of the user taking a big step forward, lowering his or her hips, and then moving his or her hips up and down, the terminal apparatus 10A determines whether the user has taken an adequate step or not.

The terminal apparatus 10A may determine that the user has taken an appropriate step or not in the following cases.

A case where the angle formed by the legs (such as the angle formed by a line segment extending from the left knee to the pelvis and a line segment extending from the right knee to the pelvis) based on the result of estimation of the positions of parts of the body of the user is equal to or greater than a predetermined angle.

A case where a particular part (such as the heel) of a foot of the user having taken a step and the auxiliary line LN_47A or LN_47B are in a predetermined positional relationship. For example, a case where the result of estimation of the position of the heel of the front foot of the user and the auxiliary line LN_47A overlap with each other or are within a certain distance. As another example, a case where the result of estimation of the position of the heel of the back foot of the user and the auxiliary line LN_47B overlap with each other or are within a certain distance.

When the front foot and the back foot are at proper positions, the terminal apparatus 10A displays an object OBJ_47A and an object OBJ_47B indicating as such, respectively. If a foot is not at the proper position, the terminal apparatus 10A displays as such (such as "NG") in the object OBJ_47A or the object OBJ_47B.

The terminal apparatus 10A may draw the object OBJ_47A or the object OBJ_47B based on the result of estimation of the position of a particular part of the user. For example, the terminal apparatus 10A may draw the object OBJ_47A in association with coordinates that are the result of estimation of the position of the heel of the user (for example, the object OBJ_47A in the form of a speech bubble may be drawn with respect to the position of the heel of the user).

As described above, in response to detecting that the posture of the user before starting the movement is proper, the terminal apparatus 10A may makes a notification to prompt the user to start the movement (for example, a notification that suggests specific details of the movement to the user, such as "Slowly lower your hips and return to the original posture") through audio, an image or the like. In this way, the user can confirm that his or her posture before starting the movement is proper, and can easily start the movement of moving his or her hips up and down.

As shown in FIG. 49, in a phase where the user makes a movement of moving his or her hips up and down, the terminal apparatus 10A draws auxiliary lines VL_47B and VL_47E in a fixed manner (at fixed positions) regardless of the movement of the user along with the avatar AVT_47B corresponding to the user in the front window 4701B.

The auxiliary line VL_47B is an auxiliary line that allows the user to perceive whether the user is fluctuating to the left or right while the user is making the movement of moving his or her hips up and down. For example, the terminal apparatus 10A draws the auxiliary line VL_47B based on the result of estimation of the position of the hips of the user before the user starts the movement of lowering his or her hips.

The auxiliary line VL_47E is an auxiliary line that allows the user to perceive whether a foot (such as the front foot) of the user is fluctuating to the left or right while the user is moving his or her hips up and down. For example, the terminal apparatus 10A draws the auxiliary line VL_47B based on the result of estimation of the positions of the heel and knee of the front leg of the user before the user starts the movement of lowering his or her hips.

An auxiliary line VL_47F is an auxiliary line that allows the user to perceive whether the shoulders of the user are fluctuating to the left or right while the user is moving his or her hips up and down. The terminal apparatus 10A draws the auxiliary line VL_47F in association with the movement of the user lowering his or her hips.

In the right window 4701C, the terminal apparatus 10A displays auxiliary lines VL_47C and LN_47C in a fixed manner regardless of the movement of the user along with the avatar AVT_47C corresponding to the user.

The auxiliary line VL_47C is an auxiliary line that allows the user to perceive whether the user is vertically lowering his or her hips without fluctuating to the front or back while the user is moving his or her hips up and down. For example, the terminal apparatus 10A draws the auxiliary line VL_47C based on the result of estimation of the position of the pelvis or the like of the user before the user starts the movement of lowering his or her hips.

The auxiliary line LN_47C is an auxiliary line that allows the user to perceive whether the user is lowering his or her hips too deeply in the forward or backward direction (such as whether the front knee is moving too forward) while the user is moving his or her hips up and down. For example, the terminal apparatus 10A draws the auxiliary line LN_47C based on the result of estimation of the position of the heel or the like of the user before the user starts the movement of lowering his or her hips.

The terminal apparatus 10A draws an object OBJ_47E and an object OBJ_47F serving as a guide for the position of a particular part of the body of the user while the user is lowering his or her hips and the speed of lowering of his or her hips in synchronization with the movement of the user moving his or her hips up and down. These objects OBJ_47E and OBJ_47F move along the auxiliary line VL_47C in synchronization with the movement of the user moving his or her hips up and down.

The object OBJ_47E is an object that allows the user to perceive a reference position for the neck or shoulders while the user is moving his or her hips up and down.

The object OBJ_47F is an object that allows the user to perceive a reference position for the hips while the user is moving his or her hips up and down.

Suppose that the user is slightly leaning forward when the user is lowering his or her hips as shown in FIG. 50. As shown in the drawing, in the right window 4701C, the terminal apparatus 10A draws an object OBJ_47J that indicates the actual position of a particular part of the body of the user (the result of estimation of the position of the neck, the shoulder, the head or the like) for comparison with the object OBJ_47E serving as a guide for an ideal movement.

The terminal apparatus 10A draws an object OBJ_47K that indicates the actual position of a particular part of the body of the user (the result of estimation of the position of the hips, the pelvis or the like) for comparison with the object OBJ_47F serving as a guide for an ideal movement.

In order to allow the user to easily perceive whether the user is vertically moving his or her hips up and down, when the object OBJ_47E and the object OBJ_47J are in a predetermined positional relationship (for example, overlap with each other or are within a certain distance), the terminal apparatus 10A may draw the objects in a different manner than when the objects are not in the predetermined positional relationship. Similarly, when the object OBJ_47F and the object OBJ_47K are in a predetermined positional relationship, the terminal apparatus 10A may draw the objects in a different manner than when the objects are not in the predetermined positional relationship. In this way, the user can easily perceive in real time whether the user is moving his or her hips up and down in an ideal manner or whether the user is moving his or her body by following the guide for an ideal movement.

The terminal apparatus 10A determines whether the front leg is properly moving or not, and displays the determination result through an object OBJ_47P. For example, the terminal apparatus 10A may determine whether the front leg is properly moving or not as follows.

Whether the user is properly moving the front leg (such as whether the front leg is not moving too forward) is determined based on the angle of a particular part of the front leg, such as the heel, the knee or the pelvis, of the user.

Whether the result of estimation of the position of a part (such as the heel or the knee) of the lower part of the body of the user and the auxiliary line LN_47C are in a predetermined positional relationship is determined. (For example, if the position of the heel or knee is located backward of the auxiliary line LN_47C, the user is determined to be leaning forward. For example, if a line segment connecting the position of the heel and the position of the knee (that is, the angle of the knee) forms an angle equal to or smaller than a predetermined angle with the auxiliary line LN_47C, the user is determined to be properly lowering his or her hips.)

The terminal apparatus 10A may determine the position of the object OBJ_47P to be drawn based on the result of estimation of the position of a part of the user. For example, the terminal apparatus 10A may draw the object OBJ_47P with respect to the position of the knee of the user. In that case, the drawn object OBJ_47P moves as the user moves his or her body in real time, so that the user can easily perceive whether the user is properly moving his or her body.

The terminal apparatus 10A determines whether the back leg is properly moving or not, and displays the determination result through an object OBJ_47N. The terminal apparatus 10A can determine whether the back foot is properly moving or not in the same manner as with the front leg described above.

The terminal apparatus 10A determines whether the front leg is fluctuating to the left or right or not, and displays the determination result through an object OBJ_47M in the front window 4701B. For example, based on the result of estimation of the positions of the heel and the knee, the terminal apparatus 10A may determine that the front leg is fluctuating to the left or right when the line of the shank is not vertical (for example, when the line of the shank forms an angle equal to or greater than a predetermined angle with the auxiliary line VL_47E). In the example in FIG. 50, the front leg is not fluctuating to the left or right, and "OK" is displayed in the object OBJ_47M.

Referring to FIG. 51, in the right window 4701C, the user is properly moving his or her hips up and down, and "OK" is displayed in the object OBJ_47P and the object OBJ_47N.

(3) APPENDICES

The following appendices are a summary of what has been described in the above embodiments.

Appendix 1

A program that makes a computer operate, wherein the program makes a processor of the computer perform: a step of sequentially sensing a movement of a body of a user; a step of presenting, to the user, an avatar corresponding to the user, rather than a photographed image of an appearance of the user, based on a result of the sensing so that the user perceives a shape of a surface of the body of the user; a step of determining a position of a figure object to be drawn that serves as a guide for movement of the body of the user in association with the avatar based on the result of the sensing; and a step of displaying the figure object at the determined position.

Appendix 2

The program according to Appendix 1, wherein in the step of presenting the avatar, the avatar is presented to the user with a reduced amount of information compared with the photographed image.

Appendix 3

The program according to Appendix 1 or 2, wherein in the step of presenting the avatar, the avatar is presented to the user each time the result of the sensing is obtained.

Appendix 4

The program according to any one of Appendices 1 to 3, wherein in the step of presenting the avatar, an avatar corresponding to the user viewed in a first direction and an avatar corresponding to the user viewed in a second direction that is different from the first direction are drawn side by side and presented to the user.

Appendix 5

The program according to any one of Appendices 1 to 4, wherein in the step of sensing, the movement of the body of the user is sensed as point cloud data, and in the step of presenting the avatar, the avatar is drawn as a set of graphic elements based on point cloud data and presented to the user.

Appendix 6

The program according to any one of Appendices 1 to 5, wherein the program makes the processor further perform: a step of estimating positions of a plurality of particular parts of the user based on the result of the sensing of the movement of the body of the user; and a step of drawing the avatar while not drawing a result of the estimation of the positions of the particular parts, and evaluating a way of movement of the body of the user based on the result of the estimation of the positions of the particular parts.

Appendix 7

The program according to any one of Appendices 1 to 6, wherein in the step of presenting the avatar, the avatar drawn is updated in response to the result of the sensing of the movement of the body of the user, and in the step of displaying, the figure object is displayed at a fixed position regardless of the movement of the body of the user.

Appendix 8

The program according to Appendix 7, wherein the program makes the processor further perform: a step of estimating a position of a particular part of the user based on the result of the sensing of the movement of the body of the user; and a step of drawing, along with the avatar, a time-series history of positions of a first part of the user obtained by the sensing, the first part being a subject of the measurement of the movement of the body of the user.

Appendix 9

The program according to Appendix 7, wherein in the step of determining, it is determined to draw a linear figure object in parallel with a body axis of the user at a fixed position regardless of the movement of the body of the user based on the result of the sensing of the user.

Appendix 10

The program according to Appendix 1, wherein in the step of determining, the position of the figure object to be drawn that serves as a guide for the user to make a particular movement is determined based on a result of sensing of a first posture of the user before starting the particular movement.

Appendix 11

The program according to Appendix 10, wherein the particular movement is a predetermined movement for measurement of the movement of the body of the user, and in the step of determining, the position of the figure object to be drawn that serves as a guide for movement of the body of the user at a predetermined timing in the particular movement is determined based on the first posture.

Appendix 12

The program according to Appendix 10, wherein in the step of determining, the position of the figure object to be drawn that serves as a guide for at least one of a group consisting of a front-rear balance and a left-right balance of the body of the user is determined based on the first posture.

Appendix 13

The program according to Appendix 10, wherein in the step of determining, the position of the figure object to be drawn that serves as a guide for a second posture that can be assumed by the user while the user is making the particular movement is determined based on the first posture.

Appendix 14

The program according to Appendix 13, wherein the particular movement is a movement made by the user in a state where the user has taken a big step forward, and in the step of determining, the position of the figure object to be drawn that serves as a guide for a posture of the user in which the user has stepped a front foot forward is determined based on the first posture.

Appendix 15

The program according to Appendix 14, wherein the program makes the processor further perform a step of estimating a position of a lower limb of the user based on the result of the sensing of the movement of the body of the user, and in the step of determining, the position of the figure object to be drawn that serves as a guide for a step position of the user having taken a big step forward is determined based on the result of the estimation.

Appendix 16

The program according to Appendix 13, wherein the program makes the processor further perform: a step of estimating a position of a particular part of the user based on the result of the sensing of the movement of the body of the user; and a step of evaluating whether the user is properly assuming the second posture based on a positional relationship between the estimated position of the particular part and the position of the figure object.

Appendix 17

The program according to Appendix 16, wherein when it is evaluated that the user is properly assuming the second posture in the step of evaluating, the user is presented as such.

Appendix 18

The program according to Appendix 16, wherein the particular movement involves a body movement made by the user in the second posture, and in response to evaluation that the user is properly assuming the second posture in the step of evaluating, measurement of the particular movement is started, and the start of the measurement is presented to the user.

Appendix 19

The program according to Appendix 1, wherein the program makes the processor further perform: a step of estimating positions of a plurality of particular parts of the user based on the result of the sensing of the movement of the body of the user, and in the step of determining, a position of a linear figure object to be drawn that allows the user to perceive whether the particular parts are properly moving in the movement of the body of the user is determined based on the estimated positions of the particular parts.

Appendix 20

The program according to Appendix 19, wherein in the step of displaying, a line segment that is an extension of a line extending from a peripheral part of a particular part to the particular part is displayed as the figure object along with the avatar.

Appendix 21

The program according to Appendix 20, wherein in the step of displaying, a figure object having a large size compared with a width of the line segment is drawn and displayed at an end point of the line segment.

Appendix 22

The program according to Appendix 21, wherein in the step of displaying, the figure object corresponding to the end point of the line segment is displayed in such a manner that the figure object moves in association with the result of the sensing of the movement of the body of the user, and a way of display of the figure object is changed based on a positional relationship between the figure object arranged in a fixed manner regardless of the movement of the body of the user and the figure object corresponding to the end point.

Appendix 23

The program according to Appendix 19, wherein the program makes the processor further perform: a step of estimating positions of a plurality of particular parts of the user based on the result of the sensing of the movement of the user, and in the step of displaying, a figure object indicating an inclination of a first part of the user and a figure object indicating an inclination of a second part that is different from the first part are drawn and displayed in association with the first part and the second part, respectively.

Appendix 24

The program according to Appendix 19, wherein the program makes the processor further perform: a step of estimating a position of a particular part of the user based on the result of the sensing of the movement of the body of the user, and in the step of determining, the position of the figure object to be drawn is determined based on the estimated position of the particular part and a shape of a body surface of the user.

Appendix 25

The program according to Appendix 1, wherein the particular movement is a predetermined movement for measurement of the movement of the body of the user, and in the step of presenting, the avatar is presented to the user each time the result of the sensing is obtained, the result of the sensing of the user at a predetermined timing at a breakpoint of the particular movement is stored in a storage unit, and an avatar at the predetermined timing arranged side by side with the avatar is presented to the user.

Appendix 26

The program according to Appendix 1, wherein in the step of presenting the avatar, the program makes the processor perform: a step of estimating positions of at least three particular parts of the user based on the result of the sensing of the movement of the body of the user; and a step of determining a position of an object to be drawn that indicates a positional relationship, with respect to any of the at least three particular parts, between others of the particular parts in a horizontal plane to display the object at the determined position, and in the step of determining, the position of the figure object to be drawn in association with the avatar is determined based on a result of the estimation of the positions of the at least three parts.

Appendix 27

A program that makes a computer operate, wherein the program makes a processor of the computer perform: a step of sequentially sensing a movement of a body of a user; a step of estimating positions of at least three particular parts of the user based on a result of the sensing of the movement of the body of the user; and a step of determining a position of a figure object to be drawn that indicates a positional relationship, with respect to any of the at least three particular parts as a reference, between others of the particular parts in a horizontal plane to display the figure object at the determined position.

Appendix 28

The program according to Appendix 27, wherein in the step of displaying the figure object, figure objects representing particular parts that are not the reference are displayed as figure objects having a same shape or similar shapes.

Appendix 29

A method of making a computer operate, wherein a processor of the computer performs: a step of sequentially sensing a movement of a body of a user; a step of presenting, to the user, an avatar corresponding to the user, rather than a photographed image of an appearance of the user, based on a result of the sensing so that the user perceives a shape of a surface of the body of the user; a step of determining a position of a figure object to be drawn that serves as a guide for movement of the body of the user in association with the avatar based on the result of the sensing; and a step of displaying the figure object at the determined position.

Appendix 30

An information processing apparatus, wherein a control unit of the information processing apparatus performs: a step of sequentially sensing a movement of a body of a user; a step of presenting, to the user, an avatar corresponding to the user, rather than a photographed image of an appearance of the user, based on a result of the sensing so that the user perceives a shape of a surface of the body of the user; a step of determining a position of a figure object to be drawn that serves as a guide for movement of the body of the user in association with the avatar based on the result of the sensing; and a step of displaying the figure object at the determined position.

REFERENCE SIGNS LIST 10 terminal apparatus
20 server
30 measurement unit
31 measurement apparatus
32 mat
33 pole
132 display
181 user information
182 measurement item information
183 measurement history information
184 friend list
185 training item information
281 user information database
282 measurement item information
283 measurement history database
284 friend list
285 training item information
287 measurement result database
288 evaluation result database
289 user questionnaire information
290 evaluation result database
2601 trainee information database
2602 trainer information database
2603 training history database

The invention claimed is:

1. An information processing apparatus comprising a processor and a memory with instructions thereon, wherein the instructions upon execution by the processor, cause the processor to:
sequentially sense a movement of a body of a user including a plurality of points of the user;
present, to the user, an avatar corresponding to the user, rather than a photographed image of an appearance of the user, whereby the plurality of points of the user correspond to equivalent points on the avatar corresponding to the user, based on a result of the sensing so that the user perceives a shape of a surface of the body of the user;
determine a position of a figure object to be drawn that serves as a guide for movement of the body of the user in association with the avatar based on the result of the sensing; and
display the figure object at the determined position.

2. The apparatus according to claim 1, wherein in the processor presents the avatar to the user with a reduced amount of information compared with the photographed image.

3. The apparatus according to claim 1, wherein the processor presents the avatar to the user each time the result of the sensing is obtained.

4. The apparatus according to claim 1, wherein in the processor presents the avatar such that an avatar corresponding to the user viewed in a first direction and an avatar corresponding to the user viewed in a second direction that is different from the first direction are drawn side by side and presented to the user.

5. The apparatus according to claim 1, wherein the processor senses the movement of the body of the user as point cloud data, and
the processor presents the avatar such that the avatar is drawn as a set of graphic elements based on point cloud data and presented to the user.

6. The apparatus according to claim 1, wherein the instructions upon execution by the processor, cause the processor to:
estimate positions of a plurality of particular parts of the user based on the result of the sensing of the movement of the body of the user; and
draw the avatar while not drawing a result of the estimation of the positions of the particular parts, and evaluate a way of movement of the body of the user based on the result of the estimation of the positions of the particular parts.

7. The apparatus according to claim 1, wherein the processor presents the avatar such that the avatar drawn is updated in response to the result of the sensing of the movement of the body of the user, and
the processor displays the figure object at a fixed position regardless of the movement of the body of the user.

8. The apparatus according to claim 7, wherein the instructions upon execution by the processor, cause the processor to:

estimate a position of a particular part of the user based on the result of the sensing of the movement of the body of the user; and draw, along with the avatar, a time-series history of positions of a first part of the user obtained by the sensing, the first part being a subject of the measurement of the movement of the body of the user.

9. The apparatus according to claim 7, wherein the processor determines to draw a linear figure object in parallel with a body axis of the user at a fixed position regardless of the movement of the body of the user based on the result of the sensing of the user.

10. The apparatus according to claim 1, wherein the processor determines the position of the figure object to be drawn based on a result of sensing of a first posture of the user before starting a particular movement, the figure object serving as a guide for the user to make the particular movement.

11. The apparatus according to claim 10, wherein the particular movement is a predetermined movement for measurement of the movement of the body of the user, and the processor determines the position of the figure object to be drawn based on the first posture, the figure object serving as a guide for movement of the body of the user at a predetermined timing in the particular movement.

12. The apparatus according to claim 10, wherein the processor determines the position of the figure object to be drawn based on the first posture, the figure object serving as a guide for at least one of a group consisting of a front-rear balance and a left-right balance of the body of the user.

13. The apparatus according to claim 10, wherein the processor determines the position of the figure object to be drawn based on the first posture, the figure object serving as a guide for a second posture that can be assumed by the user while the user is making the particular movement.

14. The apparatus according to claim 13, wherein the particular movement is a movement made by the user in a state where the user has taken a big step forward, and the processor determines the position of the figure object to be drawn based on the first posture, the figure object serving as a guide for a posture of the user in which the user has stepped a front foot forward.

15. The apparatus according to claim 14, wherein the instructions upon execution by the processor, cause the processor to estimate a position of a lower limb of the user based on the result of the sensing of the movement of the body of the user, and the processor determines the position of the figure object to be drawn based on the result of the estimation, the figure object serving as a guide for a step position of the user having taken a big step forward.

16. The apparatus according to claim 13, wherein instructions upon execution by the processor, cause the processor to:

estimate a position of a particular part of the user based on the result of the sensing of the movement of the body of the user; and evaluate whether the user is properly assuming the second posture based on a positional relationship between the estimated position of the particular part and the position of the figure object.

17. The apparatus according to claim 16, wherein when the processor evaluates that the user is properly assuming the second posture, the processor presents that the user is properly assuming the second posture to the user.

18. The apparatus according to claim 16, wherein the particular movement involves a body movement made by the user in the second posture, and in response to evaluation that the user is properly assuming the second posture, the processor starts measurement of the particular movement, and presents the start of the measurement to the user.

19. The apparatus according to claim 1, wherein the instructions upon execution by the processor, cause the processor to estimate positions of a plurality of particular parts of the user based on the result of the sensing of the movement of the body of the user, and the processor determines, a position of a linear figure object to be drawn based on the estimated positions of the particular parts, the linear figure object allowing the user to perceive whether the particular parts are properly moving in the movement of the body of the user.

20. The apparatus according to claim 19, wherein the processor displays a line segment as the figure object along with the avatar, the line segment being an extension of a line extending from a peripheral part of a particular part to the particular part.

21. The apparatus according to claim 20, wherein the processor draws and displays a figure object having a large size compared with a width of the line segment at an end point of the line segment.

22. The apparatus according to claim 21, wherein the processor displays the figure object corresponding to the end point of the line segment in such a manner that the figure object moves in association with the result of the sensing of the movement of the body of the user, and a way of display of the figure object is changed based on a positional relationship between the figure object arranged in a fixed manner regardless of the movement of the body of the user and the figure object corresponding to the end point.

23. The apparatus according to claim 19, wherein the instructions upon execution by the processor, cause the processor to estimate positions of a plurality of particular parts of the user based on the result of the sensing of the movement of the user, and the processor draws and displays a figure object indicating an inclination of a first part of the user and a figure object indicating an inclination of a second part that is different from the first part in association with the first part and the second part, respectively.

24. The apparatus according to claim 19, wherein the instructions upon execution by the processor, cause the processor to estimate a position of a particular part of the user based on the result of the sensing of the movement of the body of the user, and the processor determines the position of the figure object to be drawn based on the estimated position of the particular part and a shape of a body surface of the user.

25. The apparatus according to claim 1, wherein the particular movement is a predetermined movement for measurement of the movement of the body of the user, and the processor presents the avatar to the user each time the result of the sensing is obtained, the result of the sensing of the user at a predetermined timing at a breakpoint of the particular movement is stored in a storage unit, and an avatar at the predetermined timing arranged side by side with the avatar is presented to the user.

26. The apparatus according to claim 1, wherein the instructions upon execution by the processor, cause the processor to:

estimate positions of at least three particular parts of the user based on the result of the sensing of the movement of the body of the user; and determine a position of an object to be drawn that indicates a positional relationship, with respect to any of the at least three particular parts, between others of the particular parts in a horizontal plane to display the object at the determined position, and the processor determines the position of the figure object to be drawn in association with the avatar based on a result of the estimation of the positions of the at least three parts.

27. A method of making a computer execute:

a step of sequentially sensing a movement of a body of a user including a plurality of points of the user;

a step of presenting, to the user, an avatar corresponding to the user, whereby the plurality of points of the user correspond to equivalent points on the avatar corresponding to the user, based on a result of the sensing so that the user perceives a shape of a surface of the body of the user;

a step of determining a position of a figure object to be drawn that serves as a guide for movement of the body of the user in association with the avatar based on the result of the sensing; and a step of displaying the figure object at the determined position.

* * * * *